United States Patent
Hayashi et al.

(10) Patent No.: US 7,142,689 B2
(45) Date of Patent: Nov. 28, 2006

(54) IMAGE PROCESSING APPARATUS FOR DETERMINING SPECIFIC IMAGES

(75) Inventors: Junichi Hayashi, Kawasaki (JP); Keiichi Iwamura, Yokohama (JP); Yoshihiro Ishida, Yokohama (JP); Tomochika Murakami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 650 days.

(21) Appl. No.: 09/771,983

(22) Filed: Jan. 30, 2001

(65) Prior Publication Data
US 2001/0030759 A1   Oct. 18, 2001

(30) Foreign Application Priority Data
Jan. 31, 2000   (JP)   ............................. 2000-021426
Jan. 31, 2000   (JP)   ............................. 2000-021431

(51) Int. Cl.
G06K 9/00   (2006.01)
H04N 1/40   (2006.01)
H04L 9/00   (2006.01)

(52) U.S. Cl. ............... 382/100; 358/3.28; 713/176
(58) Field of Classification Search ............... 382/100, 382/181, 232, 171, 173, 236; 341/50; 345/700; 348/441; 358/1.13, 3.28, 444; 365/200; 375/240.11; 380/201, 203, 205, 252; 705/81, 705/64; 713/100, 153, 176
See application file for complete search history.

(56) References Cited

U.S. PATENT DOCUMENTS

| | | | |
|---|---|---|---|
| 5,561,534 A | 10/1996 | Ishida et al. ................. 358/448 |
| 5,600,720 A | 2/1997 | Iwamura et al. ................ 380/1 |
| 5,644,682 A * | 7/1997 | Weinberger et al. .......... 358/1.1 |
| 5,666,419 A | 9/1997 | Yamamoto et al. ............ 380/28 |
| 5,689,626 A * | 11/1997 | Conley ....................... 358/1.18 |
| 5,694,486 A | 12/1997 | Shigeeda et al. ............ 382/197 |
| 5,712,916 A * | 1/1998 | Windel et al. ................. 380/51 |
| 5,748,777 A | 5/1998 | Katayama et al. ........... 382/199 |
| 5,757,961 A | 5/1998 | Yamakawa et al. .......... 382/197 |
| 5,828,794 A | 10/1998 | Katayama et al. ........... 382/298 |
| 5,917,996 A * | 6/1999 | Thorpe ....................... 358/1.14 |

(Continued)

OTHER PUBLICATIONS

Lee et al., "Adaptive Digital Image Watermaking Using Variable Size of Blocks in Frequency Domain", IEEE 1999 TENCON, pp. 702-705.*

(Continued)

Primary Examiner—Yon J. Couso
(74) Attorney, Agent, or Firm—Fitzpatrick, Cella, Harper & Scinto

(57) ABSTRACT

An image processing method is provided. This method comprises: a first information extraction step of extracting first information, including a registration signal used to correct the geometrical distortion of an image; a determination step of employing results obtained at the first information extraction step to determine whether second information is to be extracted from the image; a division step of dividing the image into at least one block; and a selection step of selecting the block. In this method, the first information and the second information are embedded in the image as invisible or less visible electronic watermarks, and are added to components of said image that are less easily discerned by a human's eyes. Further, the amount of said first information is smaller than the amount of said second information, and the first information is embedded more deeply in the image than is the second information.

29 Claims, 59 Drawing Sheets

U.S. PATENT DOCUMENTS

| | | | |
|---|---|---|---|
| 5,933,520 A | 8/1999 | Ishimoto et al. | 382/135 |
| 5,937,395 A | 8/1999 | Iwamura | 382/296 |
| 6,088,454 A | 7/2000 | Nagashima et al. | 380/286 |
| 6,111,994 A | 8/2000 | Katayama et al. | 382/298 |
| 6,122,403 A * | 9/2000 | Rhoads | 382/233 |
| 6,154,571 A * | 11/2000 | Cox et al. | 382/250 |
| 6,311,214 B1 * | 10/2001 | Rhoads | 709/217 |
| 6,334,721 B1 * | 1/2002 | Horigane | 400/76 |

OTHER PUBLICATIONS

Fridrich, "Image Watermaking for Tamper Detection",IEEE 1998, pp. 404-408.*

Fridricj, "Robust Bit Extraction from Images", IEEE 1999, pp. 536-540.*

Digital Halftoning Technique using a Blue-Noise Mask, T. Mitsa, et al., 1992 Optical Society of America, vol. 9, No. II, pp. 1920-1929, Nov. 1992.

* cited by examiner 0303  0302  0301

FIG.9

|    |    |    |    |    |    |    | 0901 |
|----|----|----|----|----|----|----|----|
| +c | +c | +c | +c | 0  | 0  | 0  | 0  |
| +c | +c | +c | +c | 0  | 0  | 0  | 0  |
| +c | +c | +c | +c | 0  | 0  | 0  | 0  |
| +c | +c | +c | +c | 0  | 0  | 0  | 0  |
| 0  | 0  | 0  | 0  | -c | -c | -c | -c |
| 0  | 0  | 0  | 0  | -c | -c | -c | -c |
| 0  | 0  | 0  | 0  | -c | -c | -c | -c |
| 0  | 0  | 0  | 0  | -c | -c | -c | -c |

FIG.18
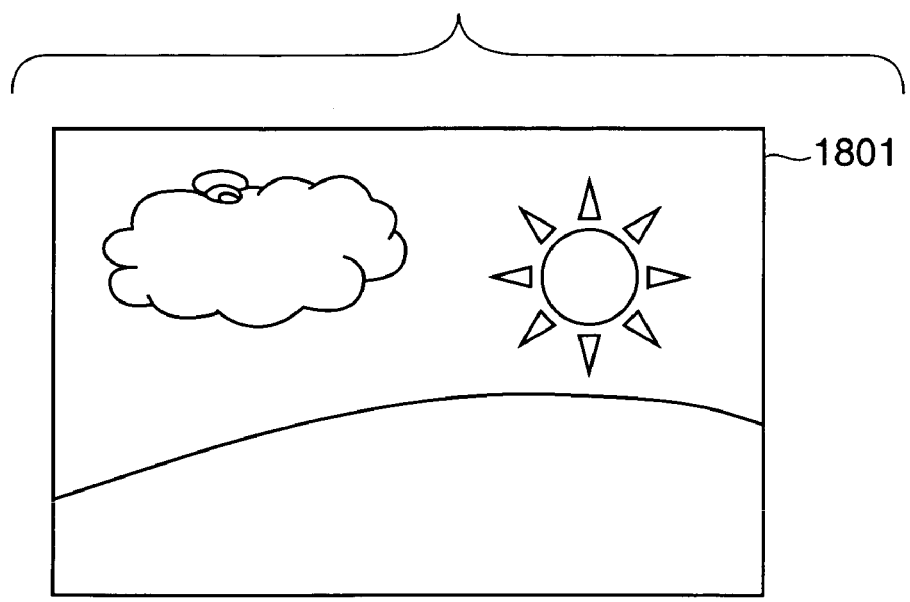
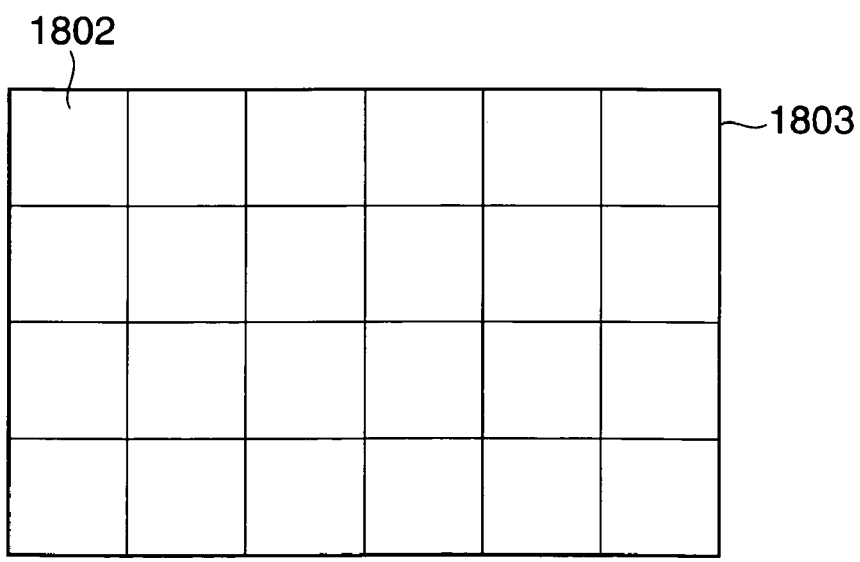

1ST EMBEDMENT POSITION
REFERENCE MASK

2ND EMBEDMENT POSITION
REFERENCE MASK

FIG.37

| 69 | 211 | 9 | 217 | 16 | 35 | 190 | 101 |
|---|---|---|---|---|---|---|---|
| 87 | 197 | 109 | 180 | 117 | 212 | 71 | 114 |
| 166 | 28 | 55 | 143 | 104 | 146 | 85 | 130 |
| 64 | 206 | 179 | 48 | 240 | 232 | 108 | 154 |
| 67 | 40 | 91 | 224 | 37 | 32 | 223 | 194 |
| 203 | 214 | 106 | 231 | 169 | 4 | 208 | 24 |
| 47 | 195 | 27 | 61 | 2 | 155 | 81 | 213 |
| 251 | 84 | 202 | 184 | 170 | 10 | 46 | 138 |

COEFFICIENT ARRANGEMENT
OF BLUE NOISE MASK (PART)

FIG.38

| 73  | 244 | 124 | 207 | 70  | 254 | 117 | 196 |
|-----|-----|-----|-----|-----|-----|-----|-----|
| 38  | 177 | 11  | 132 | 43  | 186 | 4   | 138 |
| 104 | 221 | 93  | 231 | 100 | 211 | 85  | 237 |
| 23  | 151 | 55  | 165 | 26  | 153 | 56  | 172 |
| 67  | 250 | 113 | 193 | 79  | 240 | 123 | 203 |
| 47  | 188 | 1   | 142 | 33  | 183 | 14  | 128 |
| 96  | 215 | 83  | 232 | 111 | 218 | 91  | 227 |
| 28  | 157 | 60  | 171 | 17  | 147 | 51  | 160 |

COEFFICIENT ARRANGEMENT
OF CONE MASK (PART)

MINIMUM ENCODING UNIT (MCU)

FIG.41
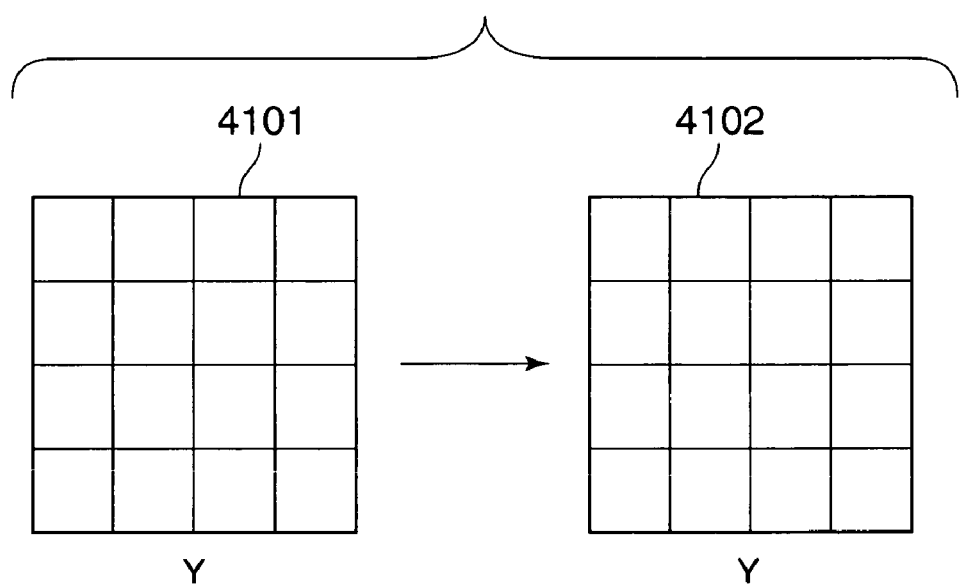
SAMPLING
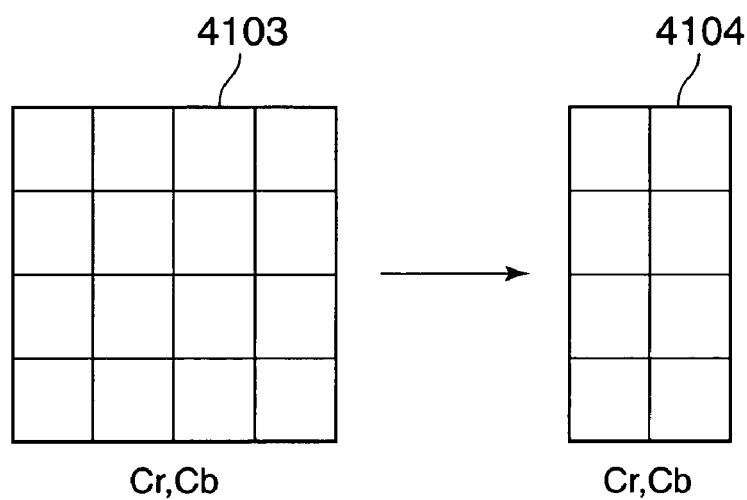

FIG.42

|   |   |   |   |   |   |   |   |
|---|---|---|---|---|---|---|---|
| +c | +c | +c | +c | 0 | 0 | 0 | 0 |
| +c | +c | +c | +c | 0 | 0 | 0 | 0 |
| +c | +c | +c | +c | 0 | 0 | 0 | 0 |
| +c | +c | +c | +c | 0 | 0 | 0 | 0 |
| 0 | 0 | 0 | 0 | −c | −c | −c | −c |
| 0 | 0 | 0 | 0 | −c | −c | −c | −c |
| 0 | 0 | 0 | 0 | −c | −c | −c | −c |
| 0 | 0 | 0 | 0 | −c | −c | −c | −c |

4201 — upper-left block (+c)
4202 — lower-right block (−c)

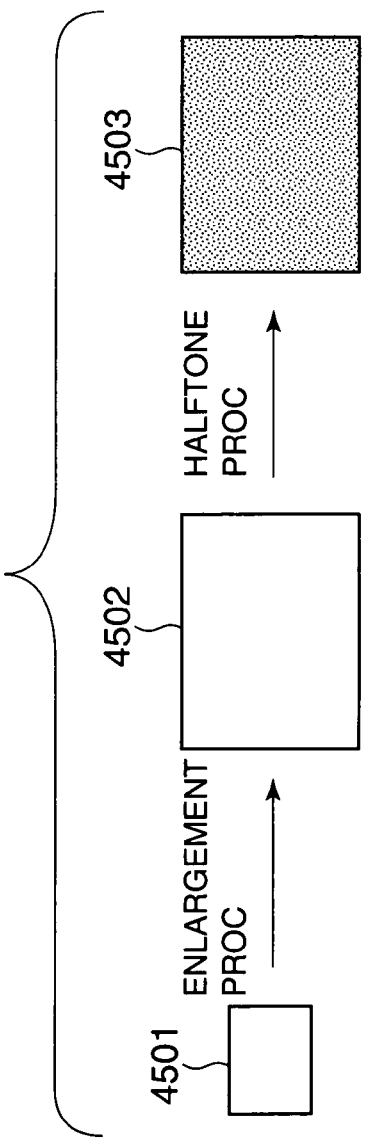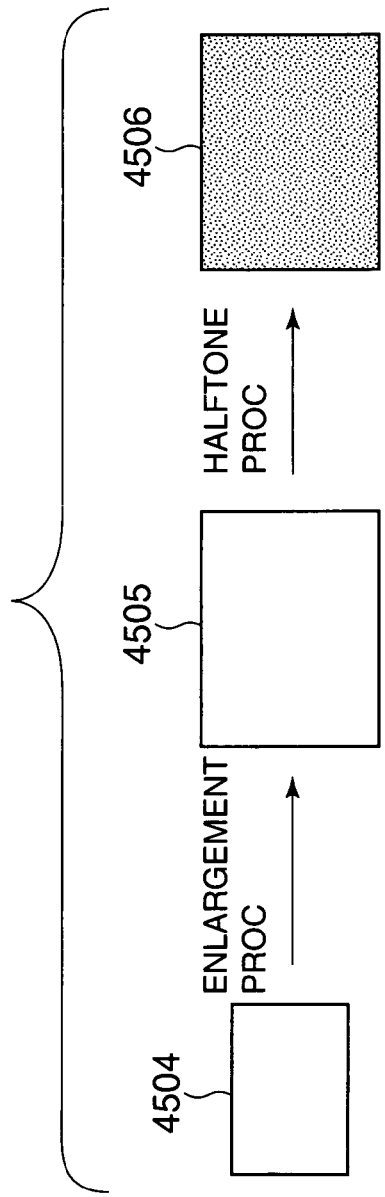

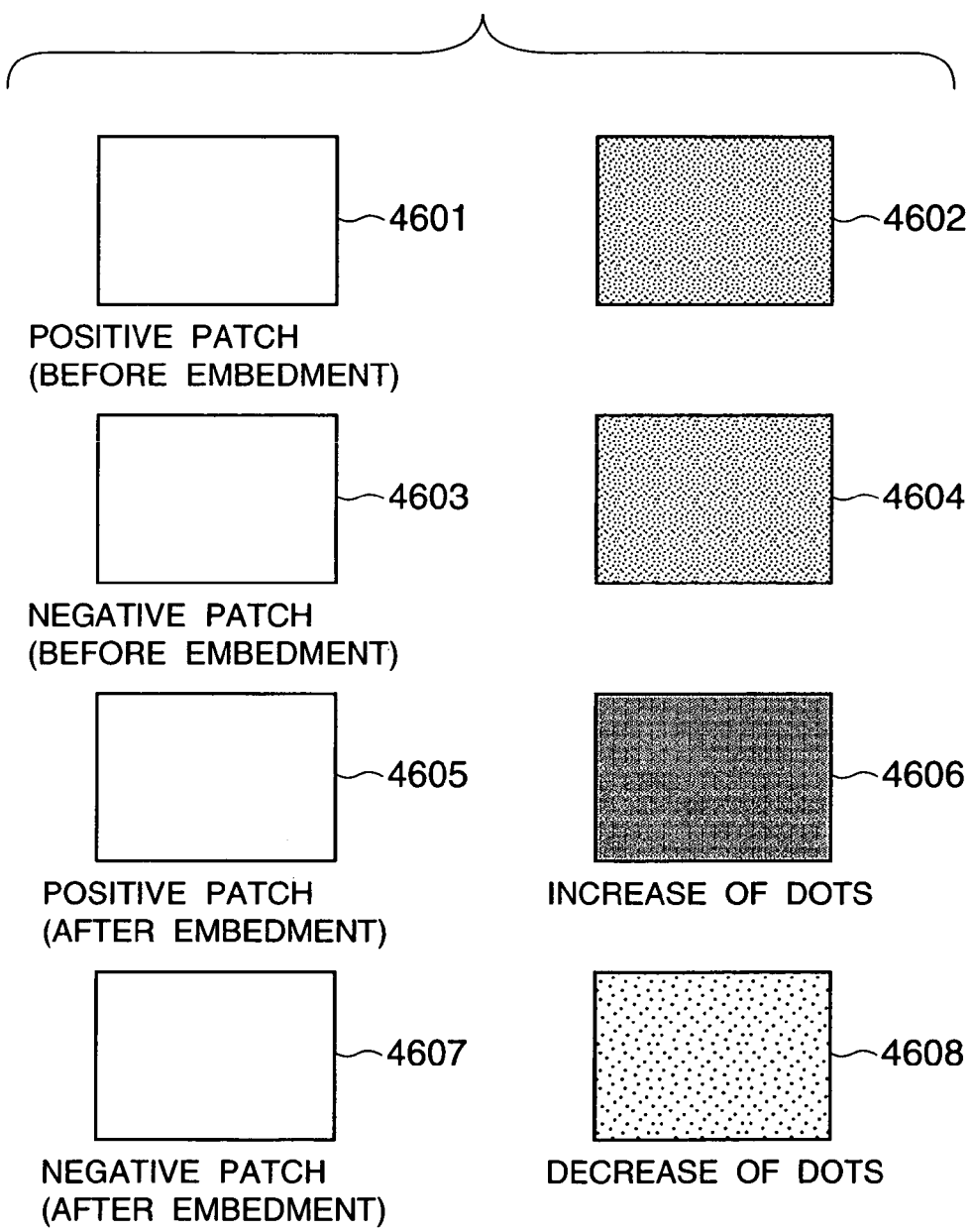

4801    4802

4803  4804

DIFFERENCE OF PATTERN
ARRANGEMENT UNIT

| ISSUE COUNTRY INFORMATION (8 BITS) | AMOUNT INFORMATION (8 BITS) |
|---|---|

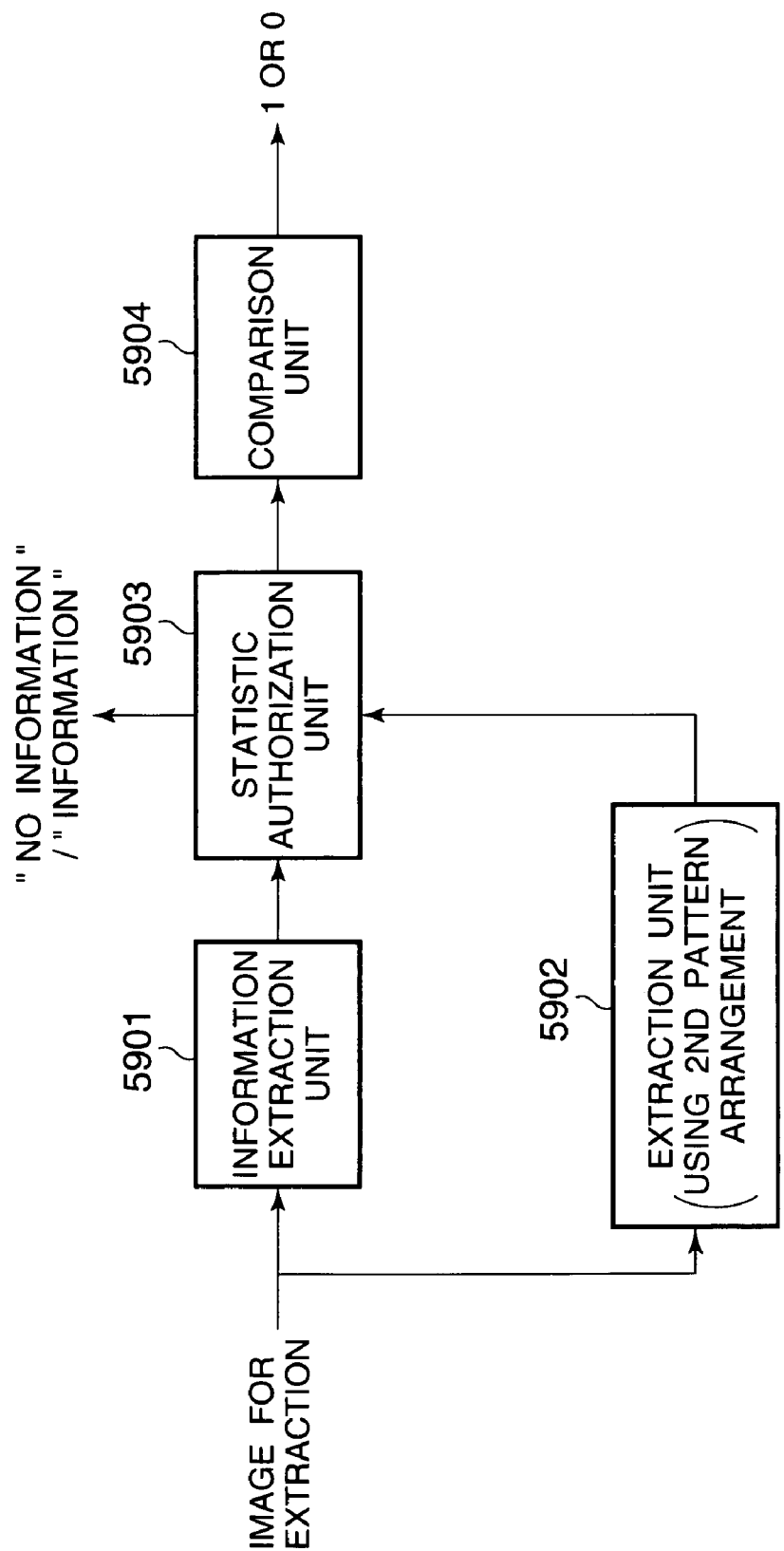

IMAGE PROCESSING APPARATUS FOR DETERMINING SPECIFIC IMAGES

BACKGROUND OF THE INVENTION

1. Field of the Invention

The present invention relates to an image processing apparatus for detecting a specific image for which printing is not permitted.

2. Related Background Art

Recently, because of the phenomenal development and spread of computers and computer networks, various types of data, including character data, image data and speech data, have been or are being digitized. While the use of digital data is preferable, because it does not deteriorate with the passage of time and thus maintains its initial integrity, copying digital data is such a simple, commonly employed practice that the protection of copyrighted material has become a huge problem. Therefore, the availability of security techniques that can be used to protect copyrights is immensely important today.

One means of providing copyright protection is through the application of a technique called "electronic watermarking". Electronic watermarking is a technique whereby the name of a copyright holder and the ID of a purchaser can be embedded in digital image, speech, or character data. Since a form is used that is not discernable by a human being, this technique can be used to track the unauthorized copying and use of digital data.

Further, the electronic watermarking technique can be employed not only to track the unauthorized use of data through illegal copying, but can also be used to detect the illegal printing of specific images, such as paper currencies or securities. For according to this technique, an electronic watermark can be embedded in advance in a specific image, and at the time of printing, the specific image can be detected by extracting the electronic watermark.

A conventional electronic watermark extraction apparatus performs the same process for all received images, regardless of whether electronic watermarks have previously been embedded in them. Since the extraction apparatus performs unnecessary processing for images in which no electronic watermarks have been embedded, the time required to extract an electronic watermark is extended.

In addition, when a specific image in which an electronic watermark has been embedded is to be detected at the time of printing, a conventional electronic watermark extraction apparatus performs an unnecessary process for most images that have not been so specified, and this extends the printing time.

SUMMARY OF THE INVENTION

It is, therefore, one object of the present invention to provide an image processing apparatus and a control method therefor that can solve the problems associated with the above shortcomings.

It is another object of the present invention to provide an image processing apparatus for reducing, to the extent possible, unnecessary electronic watermark extraction processing and the length of time required to determine whether or not a target image is a specific image, and a control method therefor.

It is still another object of the present invention to provide an image processing apparatus for reducing wasted processing time by dividing into multiple steps the process employed to a specific data from an input image, and a control method therefor.

The other objects of the present invention will become apparent during the course of a description given while referring to the following accompanying drawings, and the claims.

BRIEF DESCRIPTION OF THE DRAWINGS

FIG. 9 is a diagram showing a pattern arrangement used for embedding and extracting additional information;

FIG. 18 is a diagram showing an operation for repetitively embedding, in the entire image, the minimum embedment unit for additional information Inf;

FIG. 19 is a diagram for explaining an operation for embedding the additional information Inf;

FIG. 33 is a diagram showing an example pattern arrangement perpendicular to the pattern in FIG. 9;

FIG. 37 is a diagram showing example coefficients in a blue noise mask;

FIG. 38 is a diagram showing example coefficients in a cone mask;

FIG. 41 is a diagram showing luminance sampling and a color difference component according to the JPEG method;

FIG. 42 is a diagram showing positive and negative operating portions (patches) in a pattern arrangement;

FIGS. 45A and 45B are diagrams for explaining a difference for a half tone process performed by a printer in accordance with the resolution of an image;

FIG. 46 is a diagram for explaining ink dot changes in accordance with patch embedment;

FIG. 49 is a diagram showing a pattern arrangement for the embedding of the additional information Inf that corresponds to each resolution of an image;

FIG. 51 is a diagram showing second information for the second embodiment;

FIG. 59 is a block diagram illustrating the arrangement for the third embodiment for obtaining a distribution similar to the appearance frequency distribution for a reliability distance d1.

DETAILED DESCRIPTION OF THE PREFERRED EMBODIMENTS

Figure 1:
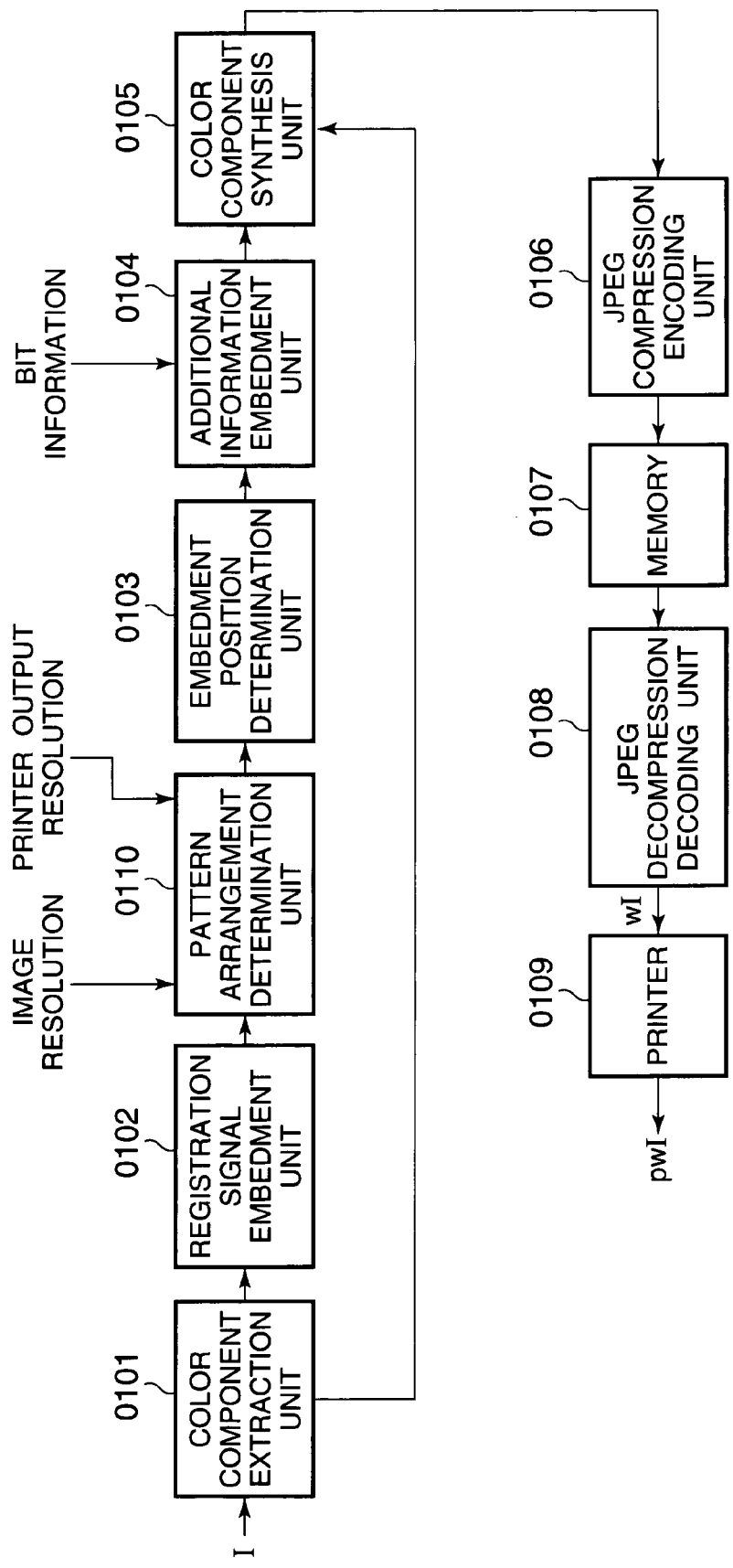
FIG. 1 is a block diagram illustrating the general arrangement of an electronic watermark embedment apparatus according to a first embodiment of the invention.

The preferred embodiments of the present invention will now be described while referring to the accompanying drawings.

[First Embodiment]

(1. Electronic Watermark Embedment Apparatus)

An overview of an electronic watermark embedment apparatus according to this embodiment will now be given while referring to the drawings.

The electronic watermark embedment apparatus for this embodiment is shown in FIG. 1. As is shown in FIG. 1, the electronic watermark embedment apparatus comprises: a color component extraction unit 0101; a registration signal embedment unit 0102; a pattern arrangement determination unit 0110; an embedment position determination unit 0103; an additional information embedment unit 0104; a color component synthesis unit 0105; a JPEG compression encoding unit 0106; a memory 0107; a JPEG decompression decoding unit 0108; and a printer 0109.

Image data I, multi-valued image data wherein predetermined multiple bits are allocated for each pixel, are input to the electronic watermark embedment apparatus.

In this embodiment, the apparatus can cope with the input image data I, regardless of whether the data are gray scale image data or color image data. For the gray scale image data, a pixel has only a single component, while for the color image data, one pixel has three components. In this embodiment, the three components are a red component (R), a green component (G) and a blue component (B), however, other color component combinations can also be employed.

When the image data I are input to the electronic watermark embedment apparatus, they are first transmitted to the color component extraction unit 0101.

There, if the input image data I are color image data, the color component extraction unit 0101 separates the blue component from the color image data, and at the succeeding stage, outputs it to the registration signal embedment unit 0102.

At the succeeding stage, the other color components are output to the color component synthesis unit 0105. That is, only the color component in which the electronic watermark information is to be embedded is extracted and transmitted to the electronic watermarking system.

In this embodiment, the electronic watermark information is embedded in the blue component. This is because, of the three components, red, green and blue, a human's eyes exhibit the least sensitivity to the blue component. Thus, when electronic watermark information is embedded in the blue component, image deterioration due to the presence of the electronic watermark information is less noticeable to human beings than it would be were the electronic watermark information embedded in one of the other color components.

When the image data I are gray scale image data, the color component extraction unit 0101 temporarily converts the gray scale data to pseudo color image data.

In this embodiment, each pixel of pseudo color image data comprises three components (R, G and B), and the three image data components have equal values.

For this embodiment, the gray scale image data are first converted into pseudo color image data; then, the blue component (B) of the color image data is extracted and is output to the registration signal embedment unit 0102.

Subsequently, at the succeeding stage, the other color components are output to the color component synthesis unit 0105. In this manner, relative to the color image data, electronic watermark information is not embedded in all the color components, but only in the blue component.

It should be noted that hereafter an explanation will be given in which, to the extent possible, image data I that are color image data are not distinguished from image data I that are gray scale image data. That is, in the following explanation, the color image data are not distinguished from the pseudo color image data.

A description will now be given for the registration signal embedment unit 0102, for which, as a pre-process for the extraction of electronic watermark information, a registration signal is used to perform a geometrical correction.

The registration signal embedment unit 0102 receives image data, from the color component extraction unit 0101, for the blue component in which it embeds a registration signal, one which is difficult for a human's eyes to discern, using an electronic watermarking technique. Details of this process, including the method used to embed the registration signal, will be described later.

When the registration signal embedment unit 0102 outputs the image data, it includes the embedded registration signal.

The pattern arrangement determination unit 0110 employs an image resolution, represented by the input image data and the output resolution of the printer 109, to determine a pattern arrangement to be used for embedding the electronic watermark information (the additional information), so that the electronic watermark information (the additional information) can be extracted (detected), even after the printer 109 has printed the image data containing the embedded electronic watermark, and even after a density-type tone has been changed to an area-type tone. The method for determining the pattern arrangement will be described later.

For printing, resolution is defined as the number of pixels contained in one inch of an image (a bit-mapped image), and is used when a predetermined size is employed for the printing of an image. Therefore, when predetermined sizes are used to print specific images, the image that has the most pixels has the highest resolution. To indicate the resolution for an image, the pixel/inch is used as a representative unit.

The output resolution is used to designate the number of dots the printer 109 deposits in one inch on a print medium. The printer that prints the most dots in one inch is the printer that has the highest output resolution.

The pattern arrangement determination unit 0110 transmits a selected pattern arrangement with the input image data to the embedment position determination unit 0103.

The embedment position determination unit 0103 determines the position at which the additional information Inf is to be embedded in the image data when the registration signal is embedded.

The embedment position determination unit 0103 outputs, to the additional information embedment unit 0104, control data representing the position at which the additional information Inf is to be embedded in the image data, together with the input image data and the pattern arrangement.

In addition to the image data, the pattern arrangement and the control data, the additional information embedment unit 0104 receives the additional information Inf (multiple bits of information). The method by which the additional information Inf is embedded using the electronic watermark technique will also be described later.

The image data included in the additional information Inf that is to be embedded is output by the additional information embedment unit 0104 to the color component synthesis unit 0105.

The color component synthesis unit 0105 synthesizes the blue component processed at the preceding stage (by the additional information embedment unit 0104) and the red and green components received directly from the color component extraction unit 0101 to obtain the normal color image data.

The color image data obtained by the color component synthesis unit 0105 is transmitted to the JPEG compression encoding unit 0106, whereat the received color image data, which consists of red, blue and green components, is converted into color image data consisting of color difference components, and JPEG compression encoding is performed for the obtained color image data.

The JPEG compression data obtained by the JPEG compression encoding unit 0106 is temporarily stored in the memory 0107, and at the succeeding stage, in accordance with the timing for the transmission to an external device or the printing timing, the JPEG compression data is read from the memory and is transmitted to the JPEG decompression decoding unit 0108. Subsequently, the JPEG decompression decoding unit 0108 decompresses the JPEG compression data and outputs the resultant color image data.

Finally, the color image data wI is transmitted by the JPEG decompression decoding unit 0108 to the printer 109, whereat the input color image data is converted to CMYK color components and a half tone process is performed for the CMYK color components, and the resultant data, as printed material pwI, is printed on a print medium, such as paper.

The possibility exists that the printed material pwI may be obtained by a user other than the user of the apparatus, and an attack, such as geometrical editing like rotation or copying by a copier, is added to the printed material pwI.

Assume that the printed material that may have been altered is pwI'. The printed material pwI' is again digitized by a scanner 2001 in FIG. 2 that will be described later.

Figure 31:
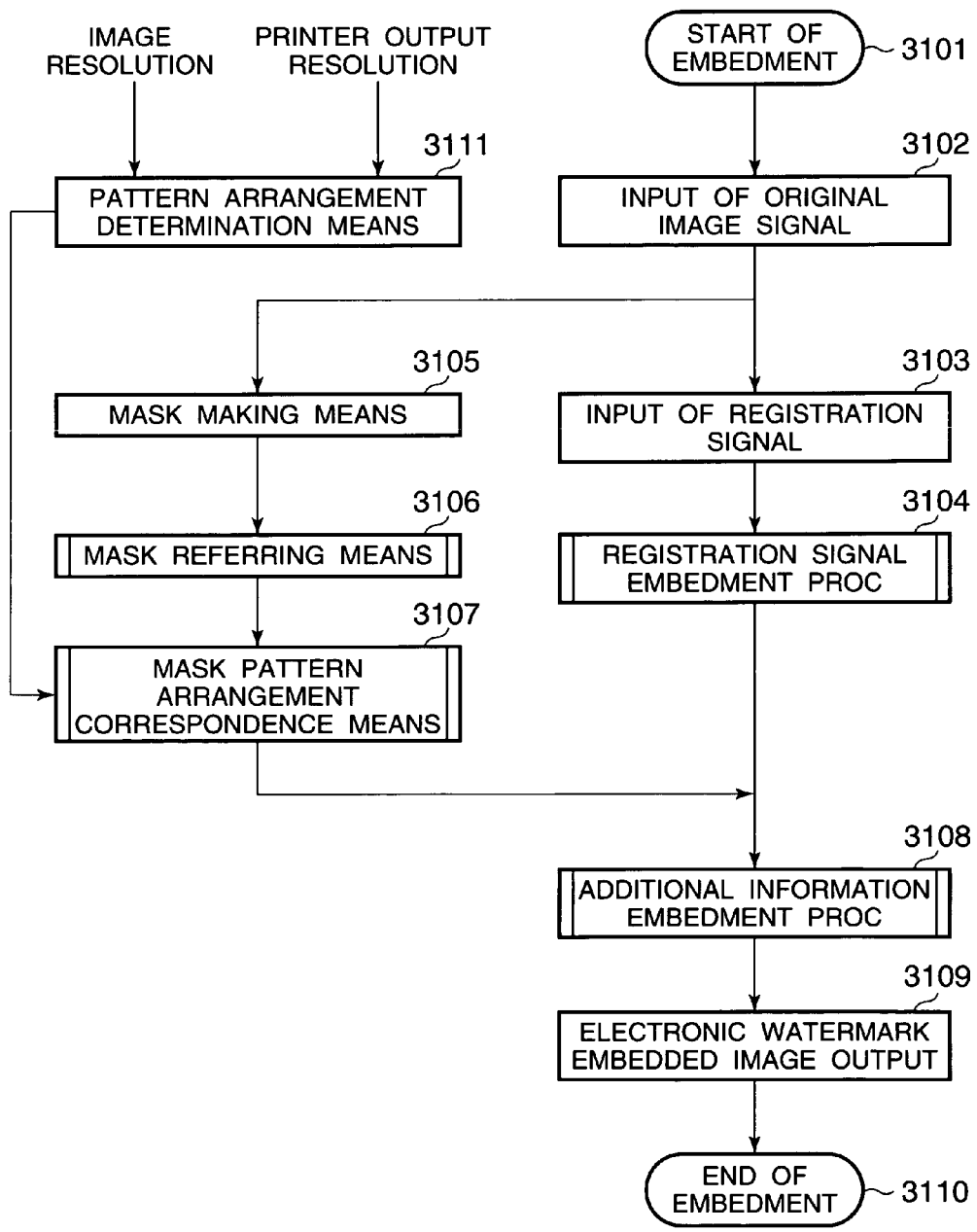
FIG. 31 is a flow chart for explaining the general electronic watermark embedment process.

The general processing performed by the individual units described above will now be described while referring to the flow chart in FIG. 31.

At step 3102 the image data I is input to the color component extraction unit 0101. This process includes a procedure during which a photo and printed material are read by the scanner 2001 to generate image data. In addition, the blue component is separated from the image that has been read, and is used to input a registration signal at the succeeding stage.

A registration signal is generated at step 3103, and is embedded at step 3104. The registration signal embedment process at step 3104 corresponds to the internal processing performed by the registration signal embedment unit 0102 in FIG. 1. A detailed explanation for it will be given later.

At step 3105, a mask is made, and the made mask is input at step 3106 to define the relation between embedded bit information and the embedded position. At step 3107, the pattern arrangement determined at step 3111 is input, and the mask is enlarged while also referring to the input pattern arrangement. A detailed explanation for it will be given later.

At step 3108, the additional information Inf is embedded in the image data in which the registration signal was embedded at steps 3103 and 3104. During the additional information embedment process, the additional information Inf is repetitively embedded by the macro block units. This process will be described in detail while referring to FIG. 10, which will be described later. A macro block is a minimum embedment unit, and all the data for one complete set of additional information Inf is embedded in the image area that corresponds to a macro block.

At step 3109, JPEG compression and encoding is performed for the image data in which the additional information Inf has been being embedded, and the resultant image data is stored in the memory 0107. Further, JPEG decompression and decoding is performed for the image data, and the obtained image data is output as the printed material pwI to the printer 109.

(2. Electronic Watermark Extraction Apparatus)

An overview of an electronic watermark extraction apparatus according to this embodiment will now be given.

Figure 2:
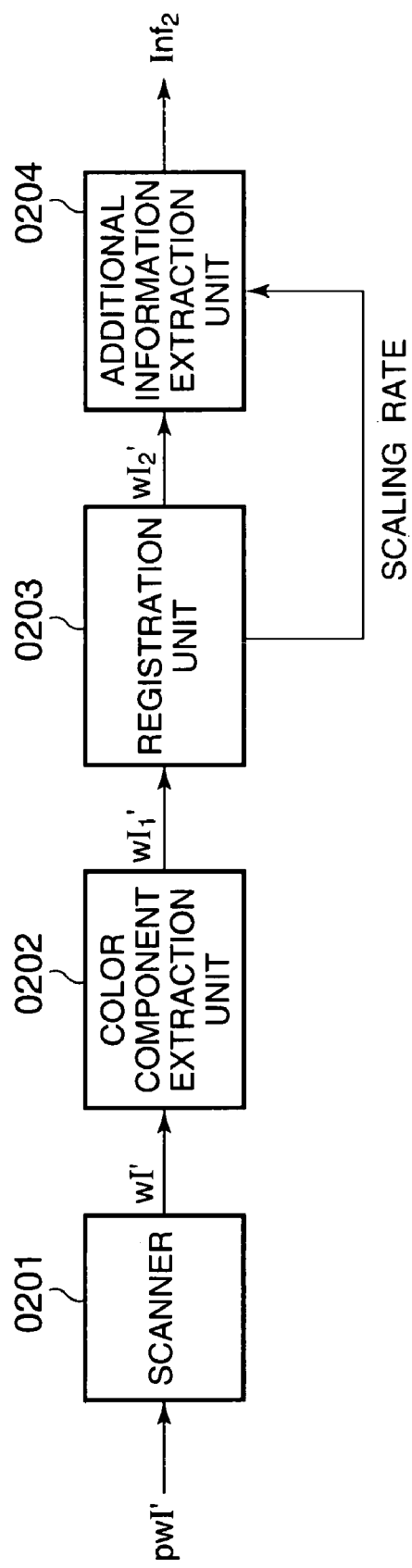
FIG. 2 is a block diagram illustrating the general arrangement of an electronic watermark extraction apparatus according to the first embodiment.

FIG. 2 is a diagram showing the electronic watermark extraction apparatus according to this embodiment. As is shown in FIG. 2, the electronic watermark extraction apparatus comprises: a scanner 0201, a color component extraction unit 0202, a registration unit 0203 and an additional information extraction unit 0204.

First, the printed material pwI' is placed on the document table of the electronic watermark extraction apparatus, and the scanner 0201 scans the printed material pwI' to generate digital image data wI'. As is described above, the printed material pwI' may differ from the printed material pwI in FIG. 1.

The image data wI' receives attacks that cause various geometrical distortions of the image data wI. An attack includes scaling, rotation, printing and scanning, and in this embodiment, at least one attack, accompanied by printing and scanning, is {mounted against the image data.

Therefore, although ideally the image data wI' and wI will have the same contents, in some cases the contents of these two image data sets will differ greatly.

The color component extraction unit 0202 receives the image data wI' and extracts the blue component, and transmits the image data for the blue component to the succeeding registration unit 0203. Of the image data wI', color components other than the blue component, i.e., the red and the green components, are not necessary and are abandoned at this time.

The registration unit 0203 receives the image data wI1' for the blue component, which was obtained by the color component extraction unit 0202. The image data wI1' for the blue component is then employed to generate image data wI2', for which geometrical distortion has been corrected.

As is described above, while there is a possibility that the image data wI' will have a scale different from that of the image data wI, the image data wI2' always has the same scale as the image data wI. The reason this is true, and the process employed for matching the scales of the image data wI2' and the image data wI will be described in detail later.

When the additional information extraction unit 0204 performs a predetermined process that corresponds to the embedment process performed by the additional information embedment unit 0103, it extracts and outputs the additional information Inf embedded in the image data wI2'.

The general processing performed by the above described units will now be explained while referring to the flow chart in FIG. 32. First, at step 3202 the image data wI' is input. The image data wI' is obtained by the scanner 0201 when it scans the image data that is predicted to be the printed material pwI'.

First, only the blue component of the image data wI' is extracted, for use at the next step. At step 3203, the scale of the extracted blue component image data wI1' is corrected. The scaling process used here, an internal process of the registration unit 0203 in FIG. 2, will be described in detail later.

At step 3211, the scaling rate output at step 3203 is employed to determine what pattern arrangement was used to embed the additional information Inf.

At step 3204, the offset of the image data wI1' in the blue component is corrected.

Then, at step 3206, for the extraction process using the first pattern arrangement, and at step 3205, for the extraction process using the second pattern arrangement, the embedded additional information set Inf is extracted from the image data wI2', for which the scale and the offset have been already corrected.

At statistic authorization step 3207, calculations are performed to determine the reliability of the extracted additional information set Inf. If it is ascertained that the correct additional information sets Inf have not been extracted, program control returns to step 3202, and the image wherein the additional information Inf is assumed to have been embedded is again input. When it is ascertained that the additional information sets Inf are sufficiently correct, at step 3208 the additional information Inf is extracted by performing a comparison process for the two information sets, and at step 3210, information indicating the reliability of the data is displayed using a reliability index D that will be described later.

The above described pattern arrangement determination process, offset adjustment process, extraction process using the first pattern arrangement and extraction process using the second pattern arrangement, statistic authorization process, and comparison process are performed internally by the additional information extraction unit 0203 in FIG. 2, and a detailed explanation for them will be given later.

(3. Detailed Explanation for the Individual Units)

The individual units will now be described in detail.

First, an explanation will be given for the registration process performed at step 3203 by the registration unit 0203 of the electronic watermark extraction system.

The registration process is a pre-process for the extraction of the electronic watermark, and is performed so that the additional information Inf can be extracted from the image data wI' received by the electronic watermark extraction apparatus. Generally, the term "registration process" includes not only the scale adjustment process but also the position adjustment process. However, in this embodiment, since the position information embedded as a part of the additional information Inf is employed for the position adjustment process, this process, together with the additional information extraction unit 0204, will be explained later.

An explanation will now be given for the change applied to the image data that is processed by the printing system, and for the registration process for the change that is performed by the printing system.

Here we will discuss that portion of this embodiment wherein the image data wI is printed by an ink-jet printer loaded with yellow (Y), magenta (M), cyan (C) and black (K) inks, and the printed material is scanned by the scanner 0201.

At this time, when the output resolution of the printer 0109 differs from the input resolution received from the scanner 0201, the scale of the original color image data wI differs from the scale of the image data wI' obtained by scanning. Therefore, there is only a small possibility that the electronic watermark information will be correctly extracted from the obtained image data wI'. Thus, means for correcting the difference in the scales is required.

In this embodiment, since both the input resolution and the output resolution are already known, the ratio of the scales can be calculated from the ratio of the resolutions. When, for example, the output resolution is 600 dpi (dots per inch) and the input resolution is 300 dpi, the ratio of the scale of an image before printing to the scale of an image after scanning is doubled. Therefore, the scaling is performed for the image data wI' at the obtained scale ratio using an appropriate scaling algorithm As a result, the same scale can be used to represent the image for the image data wI and the image for the image data wI'.

However, the output resolution and the input resolution are not already known in all cases. And when the two resolutions are not known, the above method can not be employed. In this case, in addition to means for correcting the difference between the scales, means is required for obtaining the scale ratio.

Figure 3:
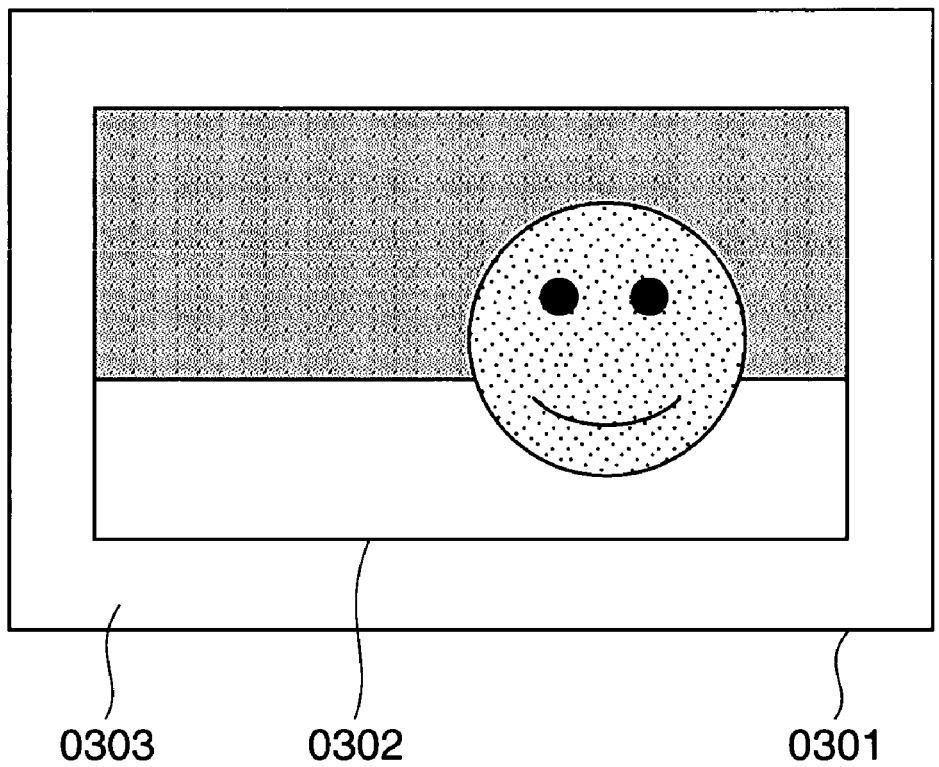
FIG. 3 is a diagram showing example image data generated by the extraction side during the printing process.

When the image that is the source of the image data wI processed by the printing system is scanned by the scanner 0201, the obtained image is as shown in FIG. 3. In FIG. 3, a complete image 0301 is represented by the image data wI'. The image 0301 consists of an original image 0302, represented by the image data wI, and a white margin portion 0303. This margin is rendered incorrect when a user employs a mouse to cut and paste the image. And the position adjustment process for the position shift caused by scanning is performed by the additional information extraction unit 0204 during the offset adjustment process.

It is assumed that the above described points will be present in the image data wI' obtained through the printing system. For when the image data wI is processed by the printing system, these points must be resolved.

An explanation has been given for a case wherein the image data is obtained after the printing process, as a pre-process for the extraction of an electronic watermark, has been performed at least once. This state can occur in the manual editing process.

An explanation will now be given for the registration signal embedment unit 0102 and the registration unit 0203, which are provided in order to resolve the problem that arises due to a difference in the scales, while assuming the ratio of the input and output resolutions is unknown.

(3-1. Registration Signal Embedment Process)

First, the registration signal embedment unit 0102 (step 3104) will be described in detail.

The registration signal embedment unit 0102 is positioned at the stage preceding the additional information embedment unit 0104. The registration signal embedment unit 0102 embeds, in advance, in the original image data a registration signal that is referred to for the registration of the image data wI' by the registration unit 0203. The registration signal is embedded in the image data (in this embodiment, the blue component of the color image data) as electronic watermark information that it is almost impossible for a human's eyes to discern.

Figure 4:
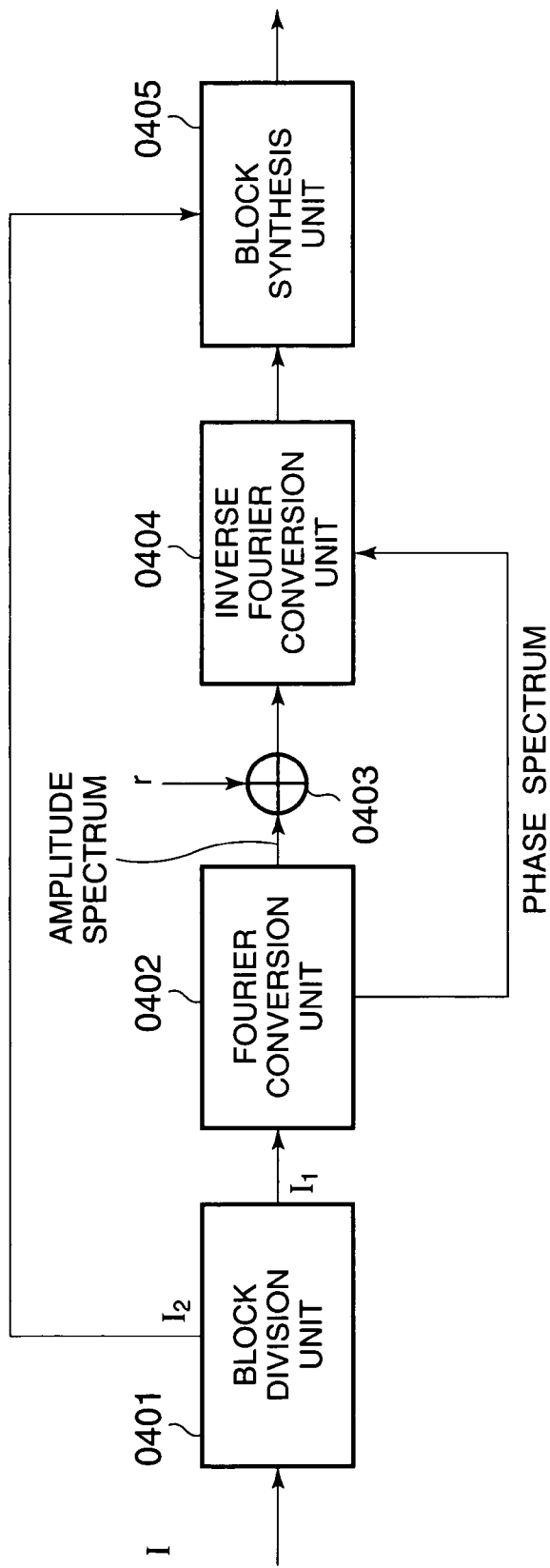
FIG. 4 is a block diagram illustrating a registration signal embedment unit.

FIG. 4 is a diagram showing the internal arrangement of the registration signal embedment unit 0102. In FIG. 4, the registration signal embedment unit 0102 comprises a block division unit 0401, a Fourier conversion unit 0402, an addition unit 0403, an inverse Fourier conversion unit 0404, and a block synthesis unit 0405. These individual units will now be described in detail.

The block division unit 0401 divides the input image data into multiple blocks that do not overlap each other. The block size is defined as a power of 2 in this embodiment. Actually, other sizes can be employed; however, when the block size is a power of 2, the Fourier conversion unit 0402 provided at the succeeding stage of the block division means 0401 can perform fast processing.

The blocks obtained by the block division unit 0401 are sorted into two sets, I1, which is transmitted to the succeeding Fourier conversion unit 0402, and I2, which is transmitted to the succeeding block synthesis unit 0405. In this embodiment, of those blocks that are obtained by the block division unit 0401, the block in the image data I that is positioned nearest the center is selected as I1, and other blocks are selected as I2.

This can be implemented in this embodiment by using a single block, and as there are fewer blocks, the processing time can be reduced. However, the implementation of the present invention is not thus limited, and two or more blocks may be selected.

Further, information concerning block size, which is used when dividing the image data, and information concerning the selection of a block, in which the registration signal is embedded, must be used in common by the electronic watermark embedment apparatus and the electronic watermark extraction apparatus.

Part I1, of the image data obtained by the block division unit 0401, is transmitted to the Fourier conversion unit 0402.

The Fourier conversion unit 0402 performs a Fourier conversion for the input image data I1. The original data form for the input image data I1 is called the spatial domain, while the data form provided by a Fourier conversion, which is performed for all the input blocks, is called the frequency domain. In this embodiment, since the size of the input block is a power of 2, a fast Fourier conversion is employed to increase the processing speed.

A fast Fourier conversion is a conversion algorithm that can be executed using (n/2) log 2(n) calculations, while a Fourier conversion requires n×n calculations, wherein n is a positive integer. A fast Fourier conversion and a Fourier conversion differ only in the speed employed to obtain calculation results, and the same results can be acquired using either conversion. Therefore, in the explanation for this embodiment, no distinction is made between a fast Fourier conversion and a Fourier conversion.

The image data in the frequency domain obtained by a Fourier conversion is presented by using the amplitude spectrum and the phase spectrum, of which only the amplitude spectrum is transmitted to the addition unit 0403, while the phase spectrum is transmitted to the inverse Fourier conversion unit 0404.

The addition unit 0403 will now be described. The addition unit 0403 receives a signal r, called a registration signal, separately from the amplitude spectrum. An example registration signal is an impulse signal, shown in FIG. 5.

Figure 5:
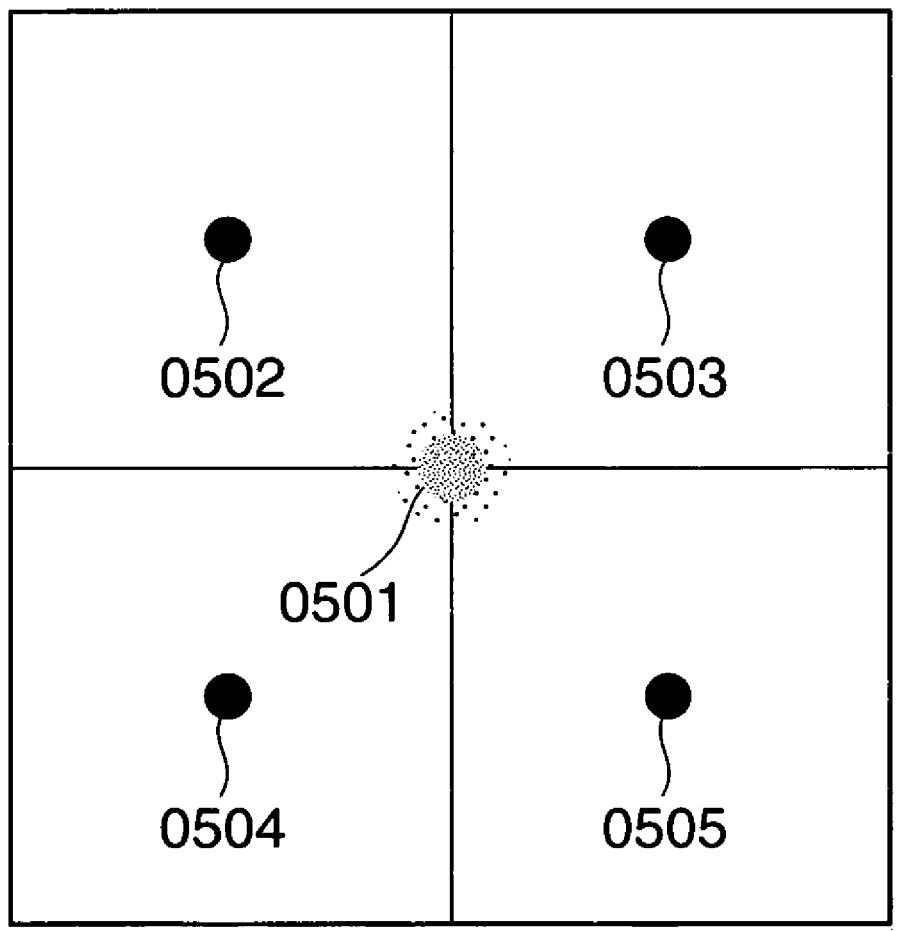
FIG. 5 is a diagram for explaining a registration signal.

In FIG. 5 the amplitude spectrum is shown for the two-dimensional spatial frequency components obtained by a Fourier conversion. The center represents the low frequency component, and the surrounding areas, the high frequency component. An amplitude spectrum 0501 represents a signal component included in the original image component, and for signals corresponds to a natural image, such as a photograph, wherein many large signals are concentrated in the low band.

In the explanation for this embodiment, it is assumed that the process sequence is performed for a natural image. However, the present invention is not thereby limited, and a process sequence may also be performed in the same manner for a document image and for computer graphics (CG). It should be noted that the embodiment of the invention is especially effective for processing a natural image having comparatively many portions and an intermediate density.

In the example in FIG. 5, impulse signals 0502, 0503, 0504 and 0505 are added to the horizontal and vertical Nyquist frequency components of signals in the frequency domain of the signal 0501 of the original natural image. As is shown in this example, it is preferable that the registration signal be an impulse signal, because the electronic watermark extraction apparatus that will be described later can easily extract only the registration signal.

In FIG. 5, the impulse signals are added to the Nyquist frequency components of the input signal; however, the application of the present invention is not thereby limited. That is, all that is required is that the registration signal not be removed, even when the image in which the electronic watermark information is embedded is attacked. Thus, when the impulse signals are embedded in the high frequency components that are to be compressed, the registration signal may be removed by data compression or decompression.

When the impulse signals are embedded in the low frequency component, compared with when they are embedded in the high frequency components, the impulse signals tend to be perceived as noise because of the visual characteristics of human beings. Therefore, in this embodiment, the impulse signals are embedded in a frequency at an intermediate level, equal to or higher than a first frequency, at which visual identification is difficult for human beings, and equal to or lower than a second frequency, that is not easily removed by irreversible compression and decompression. The registration signal is added to the blocks (one block in this embodiment) transmitted to the addition unit 0403.

The addition unit 0403 adds the registration signal to the amplitude spectrum of the image data in the frequency domain, and outputs the resultant signal to the inverse Fourier conversion unit 0404.

The inverse Fourier conversion unit 0404 performs an inverse Fourier conversion, for all the input blocks, to obtain the image data for the input frequency domain. Since as for the above Fourier conversion unit 0402 the size of the input block is a power of 2, a fast Fourier conversion is employed to increase the processing speed. The signal in the frequency domain input to the inverse Fourier conversion unit 0404 is converted by an inverse Fourier conversion into a signal in the spatial domain, and the obtained signal is output.

The image data at the spatial domain output by the inverse Fourier conversion unit 0404 is transmitted to the block synthesis unit 0405.

The block synthesis unit 0405 performs a process that is the inverse of the division performed by the block division unit 0401. Thus, as a result of the process performed by the block synthesis unit 0405, the image data (blue component) is re-constructed and output.

The registration signal embedment unit 0102 in FIG. 1 has been described in detail.

While referring to FIG. 4, an explanation has been given for the method used to embed a registration signal in a Fourier conversion domain. But there is also a method that is used for embedding the registration signal in the spatial domain. This method will now be described while referring to FIG. 29.

Figure 29:
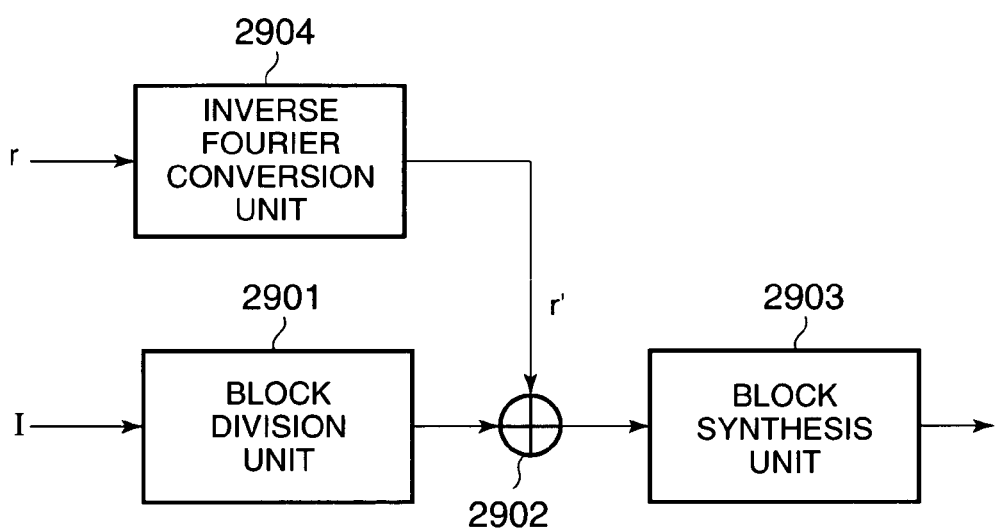
FIG. 29 is a block diagram showing a registration signal embedment unit in a spatial area.

The circuit shown in FIG. 29 comprises a block division unit 2901, an addition unit 2902, a block synthesis unit 2903 and an inverse Fourier conversion unit 2904.

The block division unit 2901 and the block synthesis unit 2903 respectively perform the same operations as those performed by the block division unit 0401 and the block synthesis unit 0405 in FIG. 4. The image data input to the registration signal embedment unit 0102 is first transmitted to the block division unit 2901, which divides the image data into multiple blocks that it transmits to the addition unit 2902. The registration signal r, which here is the signal in the frequency domain, as described in FIG. 5, is transmitted to the inverse Fourier conversion unit 2904, whereat an inverse Fourier conversion is used to convert it into a signal r'. The addition unit 2902 receives the blocks from the block division unit 2901 and the signal r' from the inverse Fourier conversion unit 2904, and adds them together. The signal from the addition unit 2902 is then transmitted to the block synthesis unit 2903, and the image data (blue component) is re-constructed and output.

In the spatial domain, the configuration in FIG. 29 performs the same process as is performed by the configuration in FIG. 4. But since, unlike the configuration in FIG. 4, this configuration does not require the Fourier conversion unit, the processing can be performed rapidly.

Further, in FIG. 29, the signal r' is an independent signal for the input image data I. Thus, the calculation of the signal r', i.e., the operation of the inverse Fourier conversion unit 2904, need not be performed each time the image data I is input, and the signal r' can be generated in advance. In this case, the inverse Fourier conversion unit 2904 can also be removed from the configuration in FIG. 29, and in addition, the registration signal can be embedded at high speed. The registration process referring to the registration signal will be described later.

<<Patchwork Method>>

In this embodiment, a principle called the patchwork method is employed in order to embed the additional information Inf. The principle of the patchwork method will be first described.

According to the patchwork method, the embedment of the additional information Inf is implemented by generating a statistic deviation for an image.

Figure 30:
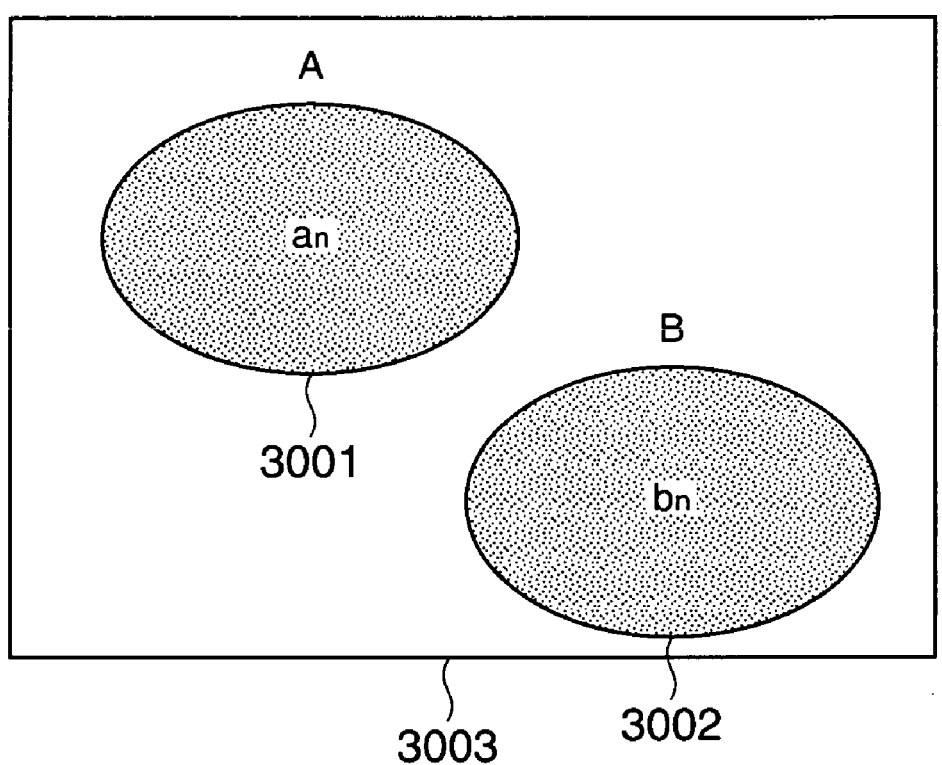
FIG. 30 is a diagram for explaining two sets used for a patchwork method.

This will be described while referring to FIG. 30. In FIG. 30, pixel subsets 3001 and 3002 and the complete image 3003 are shown, and two subsets, A3001 and B3002, are selected from the complete image 3003.

So long as the two selected subsets do not overlap each other, the patchwork method can be used to embed the additional information Inf. It should be noted that the sizes of the two subsets and the selection method employed greatly affect the robustness of the additional information Inf embedded using the patchwork method, i.e., the resistance that ensures the additional information Inf will not be lost as a consequence of an attack mounted on the image data wI. This will be described later.

Assume the subsets A and B each consist of N elements represented by A={a1, a2, . . . , aN} and B={b1, b2, . . . , bN}. The elements ai and bi of the subsets A and B are pixel values, or sets of pixel values. In this embodiment, a subset corresponds to a part of the blue component in the color image data.

The index d is defined as follows.

$$d = 1/N\Sigma(ai - bi)$$

This represents the expectation value of a difference between the pixel values of the two sets.

When appropriate subsets A and B are selected for a general natural image, and the index d is defined, the characteristic d≈0 is obtained. Hereinafter, d is called a reliability distance.

As the operation for embedding the individual bits that consist of the additional information Inf, $$a'i = ai + c$$

$$b'i = bi - c$$

is performed. This operation is performed to add a value c to all the elements of the subset A and to subtract a value c from all the elements of the subset B.

Then, as in the previous case, the subsets A and B are selected from an image in which the additional information Inf has been embedded, and the index d is calculated.

$$d = 1/N\Sigma(a'i - b'i)$$
$$= 1/n\Sigma\{(ai + c) - (bi - c)\}$$
$$= 1/n\Sigma(ai - bi) + 2c$$
$$= 2c$$

is established, where d is not 0.

That is, since the reliability distance d is calculated for a specific image that is provided, it can be ascertained that when d≈0, the additional information Inf has not been embedded, and that when the d is a value separated from 0 by a distance equal to or greater than a specific value, the additional information Inf has been embedded.

The basic principle of the patchwork method has been explained.

In this embodiment, information consisting of multiple bits is embedded by using the principle of the patchwork method. According to this method, the selection method employed for the subsets A and B is defined by using the pattern arrangement.

According to the above method, the embedment of the additional information Inf is carried out by the addition or subtraction of the elements of the pattern arrangement relative to a predetermined element of the original image.

An example simple pattern arrangement is shown in FIG. 9. In the pattern arrangement in FIG. 9, a change in the pixel value for the original image is represented when 8×8 pixels are referred to in order to embed one bit. As is shown in FIG. 9, the pattern arrangement is formed of pattern elements composed of positive values, pattern elements composed of negative values, and pattern elements of 0.

In the pattern in FIG. 9, the positions designated by the pattern elements +c indicate those whereat the pixel values of corresponding positions are incremented by c, and correspond to the position of the subset A. The positions designated by the pattern elements −c indicate those whereat the pixel values of corresponding positions are decremented by c, and correspond to the position of the subset B. The positions designated by 0s indicate those other than the subsets A and B.

In this embodiment, in order to avoid changing the overall density of an image, the number of positive pattern elements equals the number of negative pattern elements. That is, the sum of all the elements in one pattern element is 0. This condition is always required for the extraction of the additional information Inf, which will be described later.

The operation for embedding bit information sets that consist of the additional information Inf is performed by using the above pattern arrangement.

In this embodiment, the pattern in FIG. 9 is arranged multiple times in areas that differ from each other in the original image data, and the pixel values are incremented or decremented, so that information for multiple bits, i.e., the additional information Inf, can be embedded. In other words, the additional information Inf for multiple bits is embedded while assuming not only a combination of the subsets A and B, but also multiple combinations of subsets A' and B', subsets A" and B", . . . .

It should be noted in this embodiment that when the original image data is large the additional information Inf is repetitively embedded. This is because, since the patchwork method employs the statistic characteristic, an appropriate number of data is required in order for the statistic characteristic to appear.

In addition, in this embodiment, the relative positions whereat the pattern arrangement is used for the mutual bits are determined in advance, so that areas wherein the pixel values are changed using the pattern arrangement do not overlap each other when multiple bits are to be embedded. That is, an appropriate relationship is determined for the position in the pattern arrangement for embedding the first bit information of the additional information Inf, and for the position in the pattern arrangement for embedding the second bit information.

When, for example, the additional information includes 16 bits, the positional relationship for the first to 16th bits in the 8×8 pixel pattern is relatively provided, so that image deterioration is reduced in an area larger than the 32×32 pixel pattern.

Furthermore, when the image data is large, the additional information Inf (the information consisting of constituent bits) is repetitively embedded, as many times as possible. This is because each bit of the additional information Inf should be correctly extracted. Especially in this embodiment, since the statistical measurement is performed by using the repetitious embedment of the same additional information Inf, information embedment repetition is important.

The above described selection of the embedment position controls the embedment position determination unit 0103 in FIG. 1.

The method for determining the subsets A and B will now be described.

(3-2. Pattern Arrangement Determination Unit)

In the patchwork method, the determination of the subsets A and B greatly affects the robustness of the additional information Inf and the quality of an image in which the additional information Inf has been embedded.

In this embodiment, in FIG. 1, the additional information Inf is embedded, the image data wI, which has been processed using JPEG compression and decompression, is output by the printer 0109 and is read by the scanner 0201 in FIG. 2, and the image data wI' is obtained. Between the processes for generating the image data wI and wI', various attacks, including printing and scanning, are mounted against the data.

Here we will discuss how the additional information Inf embedded using the patchwork method obtains the robustness to resist an attack associated with printing.

According to the patchwork method, the shape of the pattern arrangement and the values of elements are parameters for determining a tradeoff between the embedding robustness of the additional information Inf and the image quality of the image data wI. Therefore, whether the additional information Inf can be extracted from the image data, against which the above attack has been mounted, can be optimized by manipulating the parameters. Later, this will be described in a little more in detail.

In this embodiment, the basic positional relationship for the patchwork method between the element ai of the subset A and the element bi of the subset B is fixed by the example matrix shown in FIG. 9.

It should be noted that the elements ai and bi are not limited to one pixel value, but may also be constituted by sets of multiple pixel values.

Multiple pattern arrangements are allocated in the image, so that they do not overlap, and the pixels allocated in the image are changed based on the values of the elements in the pattern arrangement.

Assuming that the subset of the pixels that are changed to the positive value (+c) of the pattern arrangement is defined as A, and that the subset of the pixels that are changed to the negative value (−c) of the pattern arrangement is defined as B, it can be understood that the principle of the patchwork method is employed.

In the following explanation, the pixels (corresponding to the positions of the elements ai of a subset) having the positive value (+c) of the pattern arrangement are called positive patches, and the pixels (corresponding to the positions of the elements bi of a subset) having the negative value (−c) of the pattern arrangement are called negative patches.

Hereinafter, a case is presented wherein the positive patches and the negative patches are employed without being distinguished from each other, and a patch in this case indicates either a positive or a negative patch.

When the size of each patch in the pattern arrangement in FIG. 9 is increased, the value of the reliability distance d according to the patchwork method is increased, as is the robustness of the additional information Inf, but the quality of the image in which the additional information Inf has been embedded is greatly deteriorated, when compared with the original image.

When the value of each pixel in the pattern arrangement is reduced, the robustness of the additional information Inf is also reduced, but the quality of the image in which the additional information Inf has been embedded is not much deteriorated, when compared with the original image.

As described above, the optimization of the size of the pattern arrangement in FIG. 9 and of the values of the elements (±c) of the patches in the pattern is very important for robustness and for the quality of the image data wI.

First, the size of a patch will be explained. When a patch is enlarged, the robustness of the additional information Inf embedded using the patchwork method is increased. And when a patch is made smaller, the robustness of the additional information Inf embedded using the patchwork method is reduced. This is because that the irreversible compression and the printing process provide low-pass filter effects for the overall processing. When a patch is large, a signal that is biased for the embedding of the additional information Inf is embedded as a low frequency signal. Whereas, when the patch is small, a signal that is biased for the embedding of the additional information Inf is embedded as a high frequency signal.

When the additional information Inf embedded as a high frequency signal is processed by the printing system, a low-pass filter process is performed for the additional information Inf, and the additional information Inf may be deleted. Whereas, even though the printing process is performed, the probability is high that when the additional information Inf is embedded as a low frequency signal, it can be maintained and can be extracted.

As a result, in order to increase the robustness of the additional information Inf, it is preferable that a large patch be used. However, an increase in the patch size is inversely equal to the addition of a low-frequency signal to the original image data, and this causes the image quality of the image data wI to deteriorate. This is because the visual characteristics of human beings includes the VTF characteristic 1301 shown in FIG. 13. As is apparent from the VTF characteristic 1301 in FIG. 13, a human's eyes are comparatively sensitive to noise at a low frequency, and comparatively less sensitive to noise at a high frequency. Therefore, it is preferable that the patch size be optimized in order to determine the resistance of the additional information Inf embedded by the patchwork method and the image quality of the image data wI.

The element values (±c) of the patch will now be described.

The value (±c) of each element constituting the patch is called a "depth". When the depth of the patch is increased, the robustness of the additional information Inf embedded using the patchwork method is increased. But when the depth of the patch is decreased, the robustness of the additional information Inf embedded using the patchwork method is reduced.

The depth of the patch is closely related to the reliability distance d used to extract the additional information Inf. The reliability distance d is a value used to extract the additional information Inf, a process which will be described later. Generally, when the depth of the patch is increased, the reliability distance d is increased and the additional information Inf can easily be extracted. But when the depth of the patch is reduced, the reliability distance d is reduced and the additional information Inf can not easily be extracted.

As a result, the depth of the patch is also an important parameter when determining the robustness of the additional information Inf and the image quality of an image in which the additional information Inf has been embedded, and is preferably optimized. When patches having an optimal size and an optimal depth are constantly employed, it is possible to embed additional information Inf that has a satisfactory robustness and that can resist an attack, such as irreversible compression or printing, and that causes little deterioration of the image quality.

Specific path depths and path sizes used for this embodiment will now be described.

In order to simplify the explanation, a simple printing system process, a gray level transformation using a halftone process, is employed as an example printing process.

As is described above, the halftone process is a modification method for representing tone. Before and after the halftone process, a human's eyes perceives the same tone. However, since the input unit, such as the scanner 0201, does not have ambiguous perception like that possessed by human beings, it does not always "perceive" the same tone before and after the halftone process.

That is, the scanner itself can not determine whether the tone represented by the area-type tone reproduction includes the tone information represented by the original density-type tone reproduction. Thus, here we will discuss which halftone process should be performed, so that the tone represented by the density-type tone reproduction can be represented by the area-type tone reproduction.

First, the relationship between the density-type tone representation and the area-type tone representation provided by the halftone process will be explained.

Figure 43:
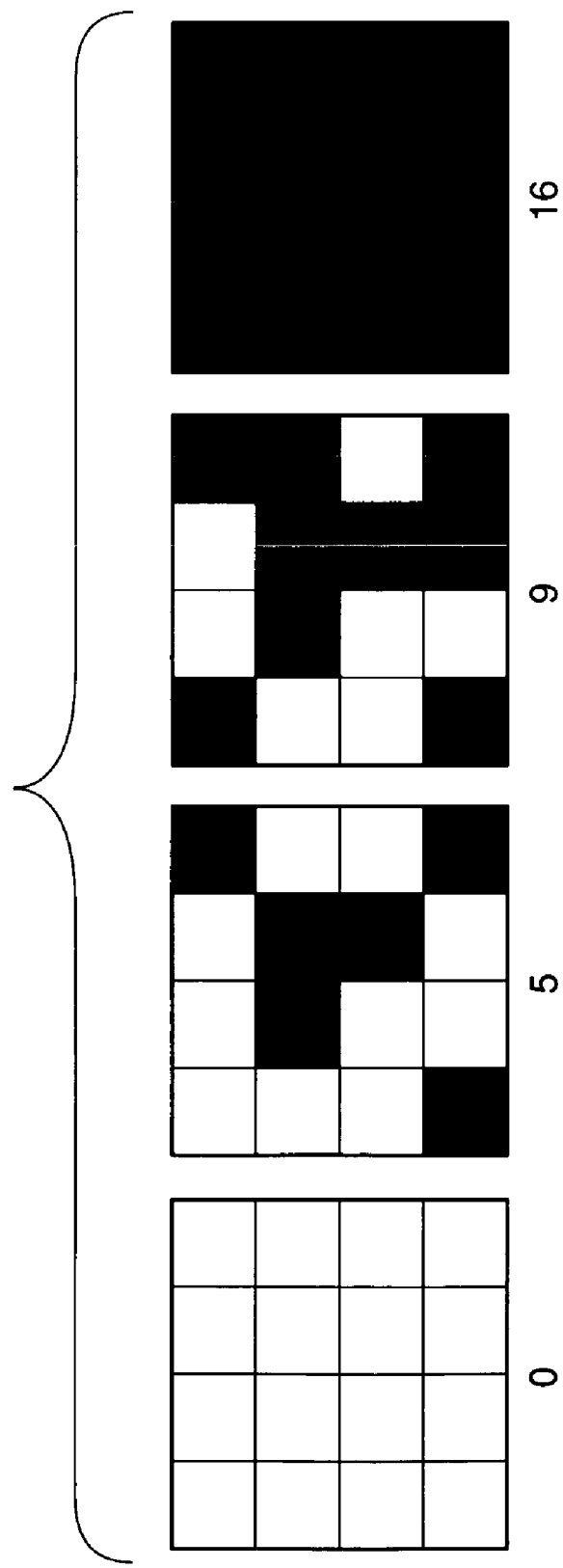
FIG. 43 is a diagram showing a correlation between a tone represented by area-type tone recording and a tone represented by density type tone reproduction.

FIG. 43 is a diagram showing a 4×4 dither matrix and an example tone relationship that can be represented by using the matrix. In FIG. 43, the matrix indicates a tone represented by the area-type tone reproduction, and the tone represented by the matrix is indicated by the number at the bottom.

There are 16 pixels in the 4×4 matrix. By turning the 16 pixels on or off, 4×4+1=17 levels can be represented.

Generally, m n dots obtained using the halftone process will represent (m×n+1) levels.

Figure 44:
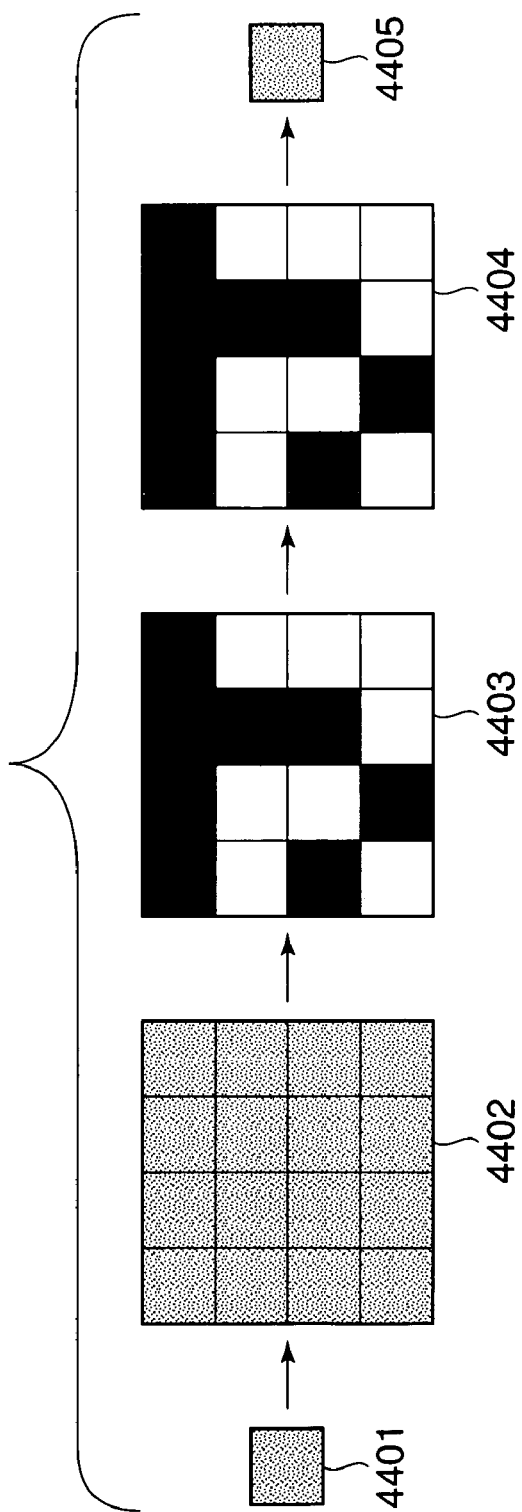
FIG. 44 is a diagram for explaining the principle for the transmission of tone information before and after a gray level transformation.

This will be explained while referring to FIG. 44. In FIG. 44, assume that a pixel 4401 is represented by the density level provided by a dynamic range of 0 to 16, and has a value of 8. Four pixels having the same value are arranged vertically and horizontally to generate a 4×4 block 4402. The halftone process is performed for this block 4402 using an arbitrary 4×4 dither matrix, and binary data 4403 is generated, which is transmitted and output by the printer 0109. Thereafter, the binary data is again input by the scanner 0201 at the same resolution as the output resolution of the printer 0109. At this time, assuming that the ratio of the output resolution of the printer 0109 to the input resolution of the scanner 0201 is 1:1, the pixel that is output by the printer 0109 and input by the scanner 0201 is equal to the binary data 4403. The thus generated image data is binary data 4404. Using an appropriate interpolation method, the binary data 4404 is scaled down in size to 1/(4×4), and multi-valued data 4405 are generated. This multi-valued data 4405 has a value of 8. When the resolution of the scanner 0201 is not high enough to determine that the binary data 4403 is the binary data 4404, the binary data 4403 is optically converted into the multi-valued data 4405.

While referring to FIG. 44, the process has been explained in which tone information represented by the density-type tone reproduction is converted into area-type tone information, and when the obtained information is to be represented by the density-type tone reproduction, the tone information is correctly transferred. Generally, when a halftone process is performed using area-type tone reproduction, whereby one pixel is represented by m×n pixels, and when the interpolation process is performed to change the binary data for the m×n pixels into one pixel, the tone information is transferred.

In this embodiment, to provide for the information the robustness to repel attacks, including the printing and scanning, the size and depth of the patch used for embedding the additional information Inf are designed while taking into account the relationship between area-type tone representation and density-type tone representation. In this embodiment, an explanation will be given for a case wherein for images of various sizes the printer 0109 outputs images having a predetermined size.

In examples in FIGS. 45A and 45B, two images, 4501 and 4504, having different resolutions are converted into images, 4503 and 4506, that have the same size, and are output by the printer 0109. A process sequence performed for a low-resolution image is shown in FIG. 45A, and a process sequence performed for a high-resolution image is shown in FIG. 45B.

First, the enlargement process is performed for the images 4501 and 4504, so that one pixel corresponds to one dot. An interpolation procedure, such as the nearest neighbor method, is employed as the enlargement method. The nearest neighbor method is a method by which the value of a pixel is copied to a neighboring pixel for enlargement (when an image has a very high resolution, reduction (a thinning process) may be performed). As a result, the image 4501 is enlarged and the image 4052 is obtained, and the image 4504 is enlarged and the image 4505 is obtained. Thereafter, the enlarged images 4502 and 4505 are represented by dots as printed materials (print image data) 4503 and 4506.

While in this case the printer 0109 will perform a CMYK conversion process and color matching, in order to simplify the description, no explanation for these processes will be given.

As is apparent from FIGS. 45A and 45B, when the resolution of an image is low, one pixel can be represented by many dots, and when the resolution of an image is high, one pixel must be represented by a small number of dots.

An explanation will now be given for an example wherein the embedment of the patches affects the conversion from the density-type tone to the area-type tone. In order for the explanation to be easily understood, the affect image resolution has on the process is not taken into account.

In FIG. 46, image areas (subset A) 4601 and 4605 are those that are to be operated on using a positive patch when the additional information Inf is to be embedded in a specific image, and are set to the state preceding the halftone process.

Image areas (subset B) 4603 and 4607 are those that are to be operated on using a negative patch when the additional information Inf is to be embedded in a specific image, and are set to the state preceding the halftone process.

The image areas 4601 and 4603 in FIG. 46 are those for which a patch is not used when the additional information Inf is embedded, and the image areas 4605 and 4607 are those for which a patch is used when the additional information Inf is embedded.

Further, at this time, immediately before the halftone process is initiated, in the image areas 4601, 4603, 4605 and 4607 one pixel corresponds to one dot.

Then, following the initiation of the halftone process, and after area-type tone reproduction has been performed, the images in the areas 4601, 4603, 4605 and 4607 are represented by dots in the areas 4602, 4604, 4606 and 4608.

When the additional information Inf is not embedded, generally it is ascertained that there is almost no change in the difference in the number of ink dots in the area 4602 and the area 4604. When an image is large and the average of the differences in the ink dots in the patches is calculated, the average is substantially 0.

When the additional information Inf is embedded, it is anticipated that a difference will appear between the number of ink dots in the area 4606 and the number of ink dots in the area 4608.

And when area-type tone reproduction is employed to represent the additional information Inf, the change in the ink dots can be controlled by the design of the patches. It can then be ascertained that the patchwork method provides the robustness required to repel attacks, such as are represented by printing and scanning.

Further, it can be intuitively understood from FIG. 46 that the number of ink dots is increased both when the area size for embedding the patch is increased and when the depth of the patch is increased.

Figure 47:
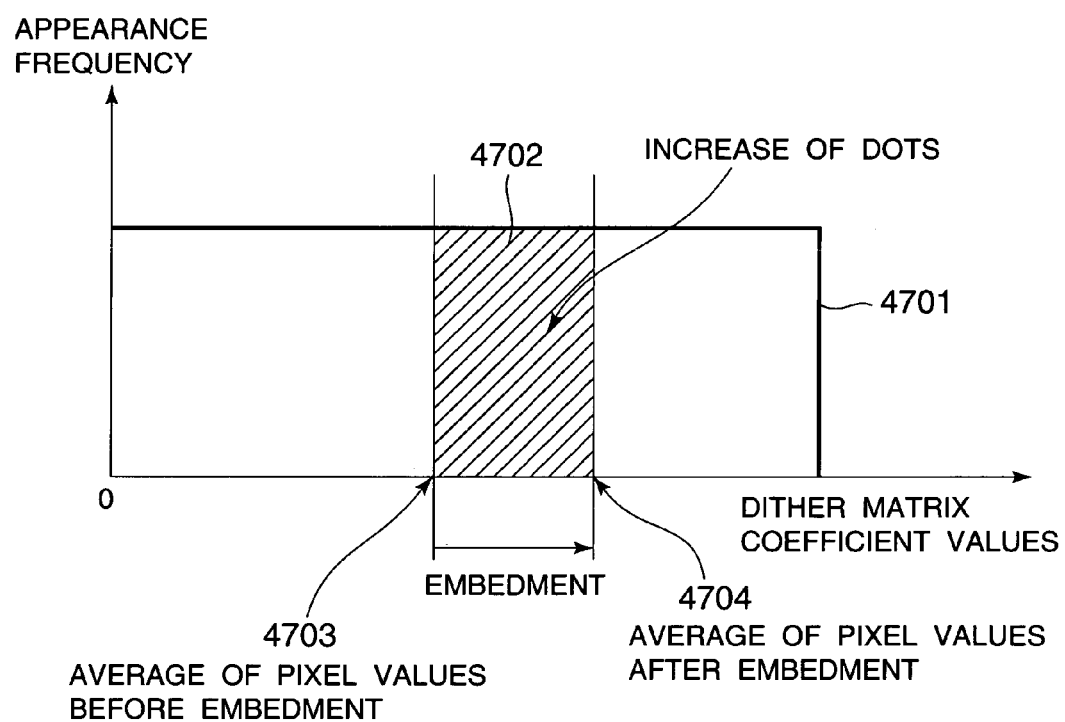
FIG. 47 is a graph for explaining an increase is dots in accordance with the size of a patch and an embedment depth.

The relationship between the patch and the increase in the ink dots will now be described while referring to FIG. 47. FIG. 47 is a diagram showing a change in the ink dots in accordance with the size and depth of the patch.

In FIG. 47, the horizontal axis represents the coefficient value of a dither matrix used to perform a halftone process for a subset A or B for which one pixel has been enlarged to one dot. The vertical axis represents the frequency appearance of the coefficient value of the dither matrix. And in order that the explanation can be easily understood, the horizontal axis also represents the average of pixel values, obtained using the halftone process, in the subset A or B for which one pixel has bees enlarged to one dot.

As is shown in FIG. 47, generally, when the coefficient value of the dither matrix corresponds to a large sub-set A or B, the coefficient value is substantially not biased, and the appearance frequency can be regarded as substantially equal.

Assuming that when the additional information Inf is embedded, an average of 4703 pixel values before the embedment is changed to an average of 4704 pixel values after the embedment, it is understood that, through the binarization of the dither matrix, the ink dots are increased by a number equivalent to the area of a shaded portion 4702.

That is, it is apparent that the depth of the patch and the increase in the ink dot count are proportional.

When the patch size is increased, the appearance frequency of the coefficient value of the dither matrix is further increased. Thus, the area 4702, the shaded portion, is increased along the axis of the appearance frequency, and it is understood that the increase in the size of the patch is also proportional to the increase in the ink dot count.

While taking the above characteristic into account, for the entire image, (1) the embedment depth is proportional to the number of dots on the printed material, and (2) the size of the path is proportional to the number of dots on the printed material.

That is, when $\Delta\beta$ denotes a difference in the dot count in areas throughout the image, which are changed by embedding the patches, where the positive patches are embedded, and in areas where the negative patches are embedded, $$\Delta\beta = 2 \times \alpha \times PA \times C + \gamma \qquad \text{(Equation 47-1)}.$$

In this equation, $\alpha$ denotes a proportional coefficient, $\gamma$ denotes a margin, C denotes an embedment depth, and PA denotes the area of a positive or negative patch that corresponds to the one-pixel and one-dot relationship for the entire image. The values of $\alpha$, $\beta$ and $\gamma$ are defined through experiment.

The principle of (Equation 47-1) can be employed not only for the halftone process using the dither matrix, but also for the error diffusion method ((1) and (2), described above, are established).

In (Equation 47-1), no consideration is given to the resolution of an image, the output resolution of a printer, and the input resolution of a scanner. An explanation will now be given for a case wherein the resolution of the image, the output resolution of the printer 0109 and the input resolution of the scanner 0201 are changed.

In this embodiment, in order to hold as much information as possible, the input resolution for the scanner 0201 is fixed at 600 ppi (pixels per inch), a satisfactory resolution for a flat-bed scanner.

Now, the output resolution of the printer 0109 and the resolution of the image will be described.

As was previously described while referring to FIGS. 45A and 45B, to print an image, the number of dots representing the density-type tone for one pixel is determined based on the resolution of an image. An example will be explained below.

In FIGS. 45A and 45B, as an example, for image 4501 the dimensions are 1000×800 pixels.

Assume that the image 4501 is to be reproduced by a printer having an output resolution of 1200 dpi in the main scanning and sub-scanning directions and that it will use 5 inches to print the long side. An enlargement process is performed so that before the halftone process is initiated one pixel equals one dot, and 1200 dpi×5=6000 dots are output for the long side. In this manner, the image 4501 is enlarged to provide the image 4502, which is 6000×4800 pixels. Then, when the tone of the image 4501 is reproduced from the image 4503 for which the halftone process has been performed, 6×6 dots are used to represent one pixel.

On the other hand, let us assume that for image 4504 the dimensions are 3000×2400 pixels.

When the image 4504 is also to be reproduced by a 1200 dpi printer that will use 5 inches to print the long side, similarly, the image 4504 is enlarged to provide image 4505, which is 6000×4800 pixels and in which one pixel corresponds to one dot. Thereafter, the image 4506 is obtained using the halftone process, and 2×2 dots are used to represent one image 4504 pixel.

Since it is assumed that the density of an ink dot is determined, when 5×5 dots are used to represent one pixel, the dynamic range for the density-type tone representation using one pixel is large. And when 2×2 dots are used to represent one pixel, the dynamic range for the density-type tone representation using one pixel is small.

The additional information extraction process will now be described in detail. According to the patchwork method, in the detection process (the sum of pixel values in the areas wherein the positive patches are embedded)−(the sum of pixel values in the areas wherein the negative patches are embedded)

is calculated for each pattern arrangement, and an average is obtained for each pattern arrangement for the entire image. This average is called a reliability distance d, and as the reliability distance d is large, the extraction of additional information is ensured.

Figure 48A:
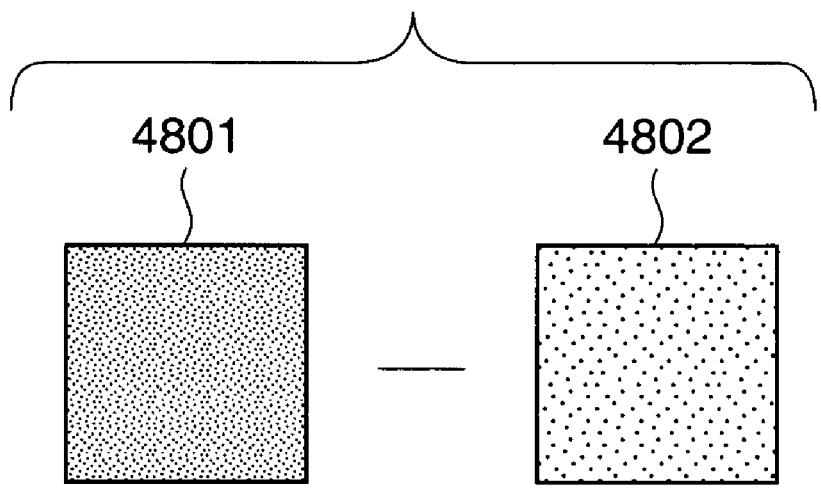
FIGS. 48A and 48B are diagrams showing a difference, between a positive patch and a negative patch for each of two pattern arrangement units, derived from a difference in image resolutions.
Figure 48B:
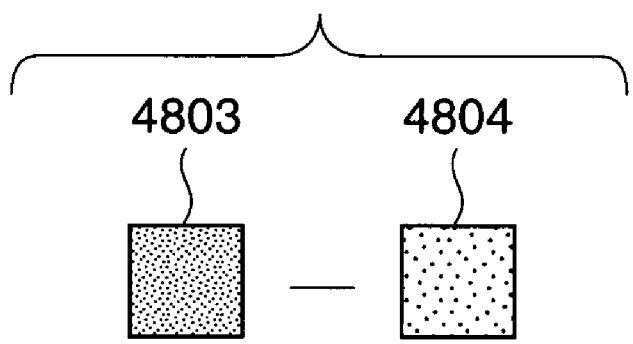

FIGS. 48A and 48B are diagrams showing the difference between the positive and negative patch areas for each pattern arrangement. In FIG. 48A, a positive patch area 4801 and a negative patch area 4802 are shown, for which the image resolution is low, and in FIG. 48B, a positive patch area 4803 and a negative patch area 4804 are shown, for which the image resolution is high.

Since a predetermined density is provided for each ink dot, and since each pixel in each of the patch areas 4801 and 4802 consists of many ink dots, the dynamic range of the density tone is large, even when the reliability distance d has a large value. On the other hand, since each pixel in each of the patch areas 4803 and 4804 is represented by only a few ink dots, the dynamic range of the density tone is small when the value of the reliability distance d is large.

Generally, when only a small number of dots is used to form one pixel (the image resolution is high), the dynamic range of the gray level for one pixel is small, so that a large reliability distance d can not be obtained, and the additional information Inf can not be extracted.

Therefore, when the image resolution is high, either the size of the patch or the embedment depth (±c) must be increased.

Generally, since a position shift constitutes a large problem when the output resolution is high, it is preferable that the patch size be increased.

When the number of dots in a pattern arrangement required for the detection of additional information is defined as $\Delta\beta p$, based on (Equation 47-1), the relationship of the pixel count P of the positive or negative patch, the embedment depth C of the patch and the dot count m×n representing one pixel is represented by $$\Delta\beta p = 2 \times \alpha' \times P \times (m \times n) \times (C/255) + \gamma' \quad \text{(Equation 47-2)}.$$

In this equation, (m×n)×(C/255) means that even when the embedment depth C is changed by the maximum tone levels 255, at the maximum, the number of dots allocated for one pixel is increased only by m×n.

In the equation, $\alpha'$ is a proportional coefficient, and $\gamma'$ is a margin.

The m×n count of the dots used to reproduce one pixel is calculated by using m×n=(the output resolution of a printer in the main scanning direction/the image resolution)×(the output resolution of a printer in the sub-scanning direction/the image resolution). The value m×n increases as the image resolution is high.

Therefore, when $\Delta\beta p$, $\alpha'$ and $\gamma r$ are calculated through experiment, the embedment depth for each pattern arrangement required for the detection of the additional information Inf, and the size (the pattern arrangement size) and the embedment depth of the patch can be obtained from the output resolution of the printer and the image resolution.

Through the above observations, a method for changing the embedment depth (±c) and the patch size in accordance with the image resolution will now be proposed.

The apparatus using this method will now be explained.

The output resolution of the printer 0109 and the image resolution are transmitted to the pattern arrangement determination unit 0110 in FIG. 1, and an appropriate pattern arrangement, for the extraction of the additional information Inf, is output.

As an example, assume that the output resolution of the printer 0109 is 1200 dpi and the long side of the image is to be printed in a space of about 6 inches. Further, assume that there are images having dimensions ranging from 300 ppi to 600 ppi (1800 to 3600 pixels for the long side).

Figure 49:
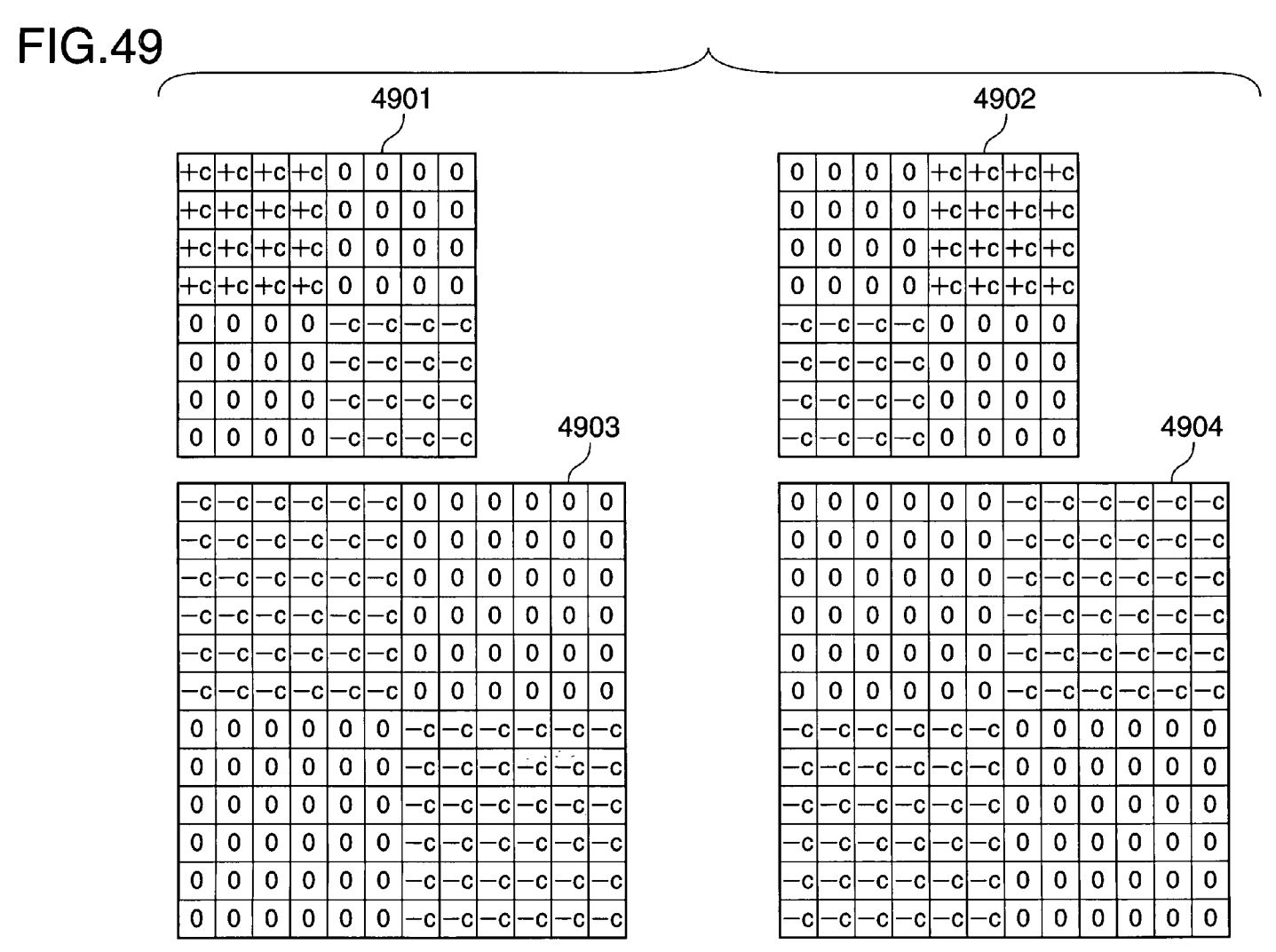

The pattern arrangement used for embedding the additional information Inf is selected in accordance with the image resolution. When the image resolution is less than 500 ppi, the pattern arrangement 4901 in FIG. 49 is employed, and when the image resolution is equal to or higher than 500 ppi, the pattern arrangement 4903 in FIG. 49 is employed.

Presume that (Equation 47-2) is used to determine an appropriate embedment depth.

After the pattern arrangement determination unit 0110 determines an appropriate pattern arrangement in this manner, based on the size of the pattern arrangement received from the pattern arrangement determination unit 0110, the embedment position determination unit 0103 determines the embedment position at the succeeding stage. Thereafter, at the pattern arrangement embedment position received from the embedment position determination unit 0103, the additional information embedment unit 0104 embeds the additional information Inf in the image.

When the pattern arrangement used for the embedment is unknown, the additional information Inf can not be extracted. Therefore, the pattern arrangement determination unit 2001, which will be described later, uses the scaling rate output by the registration unit 0203 to determine the image resolution.

When the output resolution of the printer 0109 is fixed, so long as the image resolution is obtained from the scaling rate, the pattern arrangement determination unit 2001 can determine the pattern arrangement that was used for embedment.

Therefore, even when, in accordance with the image resolution, the patch and the pattern arrangement are variable, the additional information Inf can be extracted by using the information obtained from the registration signal.

(3-3. Embedment Position Determination Process)

Figure 11:
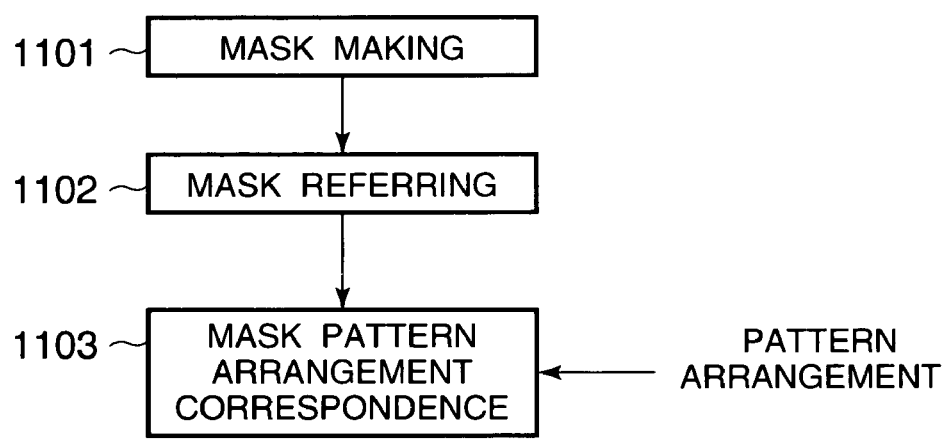
FIG. 11 is a block diagram illustrating an embedment position determination unit.

FIG. 11 is a diagram showing the internal arrangement of the embedment position determination unit 0103.

In FIG. 11, a mask making unit 1101 prepares a mask for designating the embedment positions of individual bit information forming the additional information Inf. The mask is a matrix that includes position information for designating the relative arrangement method for the pattern arrangement (see FIG. 9) that corresponds to each bit.

Figure 17:
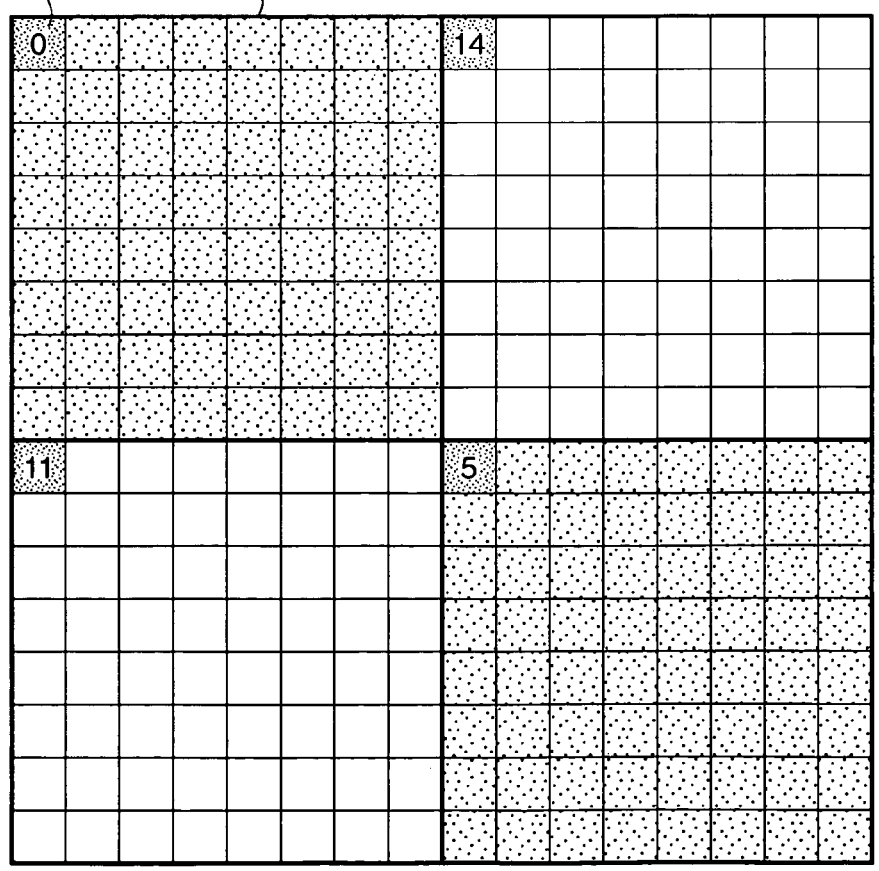
FIG. 17 is a diagram showing the state wherein pattern arrangements are developed in the mask in FIG. 16.

An example mask 1701 is shown in FIG. 17. The coefficient values are allocated in the mask, and in the mask, have and equal appearance frequency. Using this mask 1701, the additional information Inf, consisting of a maximum of 16 bits, can be embedded.

Next, a mask referring unit 1102 reads the mask 1701 prepared by the mask making unit 1101, and correlates the coefficient values in the mask 1701 with information associated with the relationship between the bit information and the position of the bits, and determines what arrangement method to employ for the pattern arrangement to be used when embedding the individual bit information.

Further, at the locations of the coefficient values in the mask 1701, a mask pattern arrangement correspondence unit 1103 develops the elements (e.g., an 8×8 block) of each pattern arrangement that is received from the pattern arrangement determination unit 0110 at the preceding stage. That is, each coefficient value (one block) of the mask 1701 in FIG. 17 is multiplied by 8×8, as is shown in a block 1703 in FIG. 17, so that it can be referred to as the embedment position for each pattern arrangement.

The additional information embedment unit 0104 refers to the embedment start coordinates 1702 in FIG. 17 when embedding the bit information.

In this embodiment, the mask making unit 1101 prepares the mask 1701 each time image data (the blue component) is received. Thus, when image data for a large size is received, the same additional information Inf is repetitively embedded multiple times.

According to the above described method, the structure (the arrangement of the coefficient values) of the mask serves as a key for the extraction from the image of the additional information Inf. That is, only the owner of a key can extract the information.

It should be noted that in addition to a case for preparing a mask in real time, this invention also includes a case wherein a mask is prepared in advance and is stored in the internal storage device of the mask making unit 1101, so that it can be called up as needed. In this case, the operation can be quickly shifted to the process at the succeeding stage.

The individual processes performed by the embedment position determination unit 0103 will now be described in detail.

(3-3-1. Mask Making Unit)

First, the mask making unit 1101 will be described.

For the embedment of the additional information Inf using the patchwork method, when the information is added while extensive manipulation of the pixel value is being effected in order to increase the robustness (for example, when a large value c is set for the pattern arrangement), the determination of the image quality, comparatively, is not noticeable at the edge portions whereat the pixel value is drastically changed, while in the flat portion, whereat the pixel value change is less, the portion whereat the pixel value is manipulated is noticeable as noise.

Figure 13:
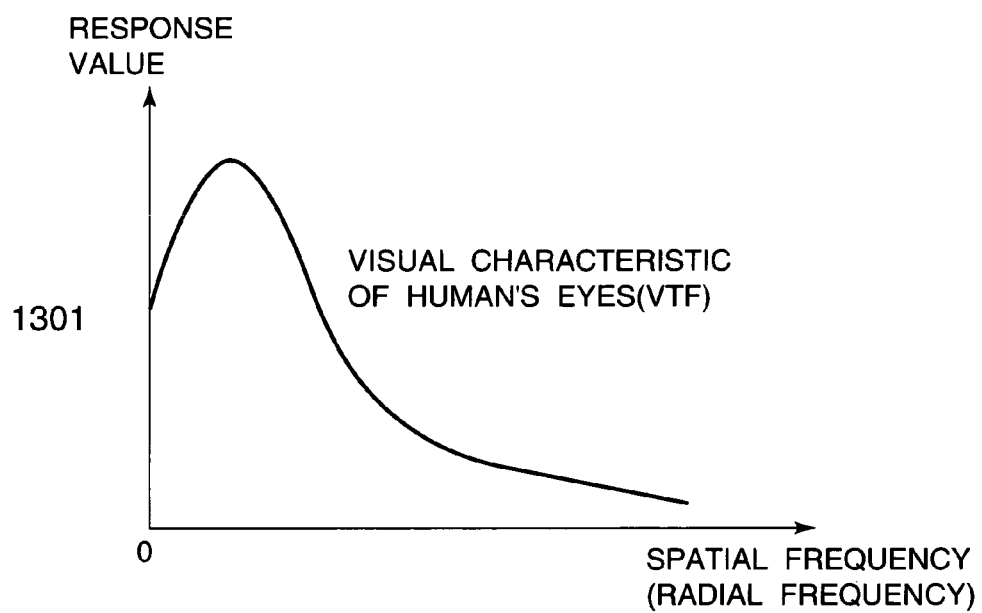
FIG. 13 is a graph showing the visual characteristic of a human's eyes (VTF) for a spatial frequency.

FIG. 13 is a graph showing the spatial frequency characteristic of the visual perception of human beings. The horizontal axis represents the spatial frequency (radial frequency), and the vertical axis represents the visual response value. When the information is embedded by operating the pixel value, it is apparent from FIG. 13 that the deterioration of the image quality is noticeable in a low frequency domain wherein a change can be visually detected by human beings.

Therefore, in this embodiment, a pattern is arranged for each bit, while taking into account a blue noise mask or a cone mask that is commonly used for the binarization of a multi-valued image.

The characteristics of the blue noise mask and the cone mask will now be briefly explained.

First, the characteristic of the blue noise mask will be described.

A characteristic of the blue noise mask is that it always has a blue noise pattern, regardless of the threshold value that is used for the binarization of the blue noise mask. The blue noise pattern is a pattern indicating that the frequency property of the spatial frequency is biased toward the high frequency domain.

One part of a specific blue noise mask is shown in FIG. 37.

Figure 14:
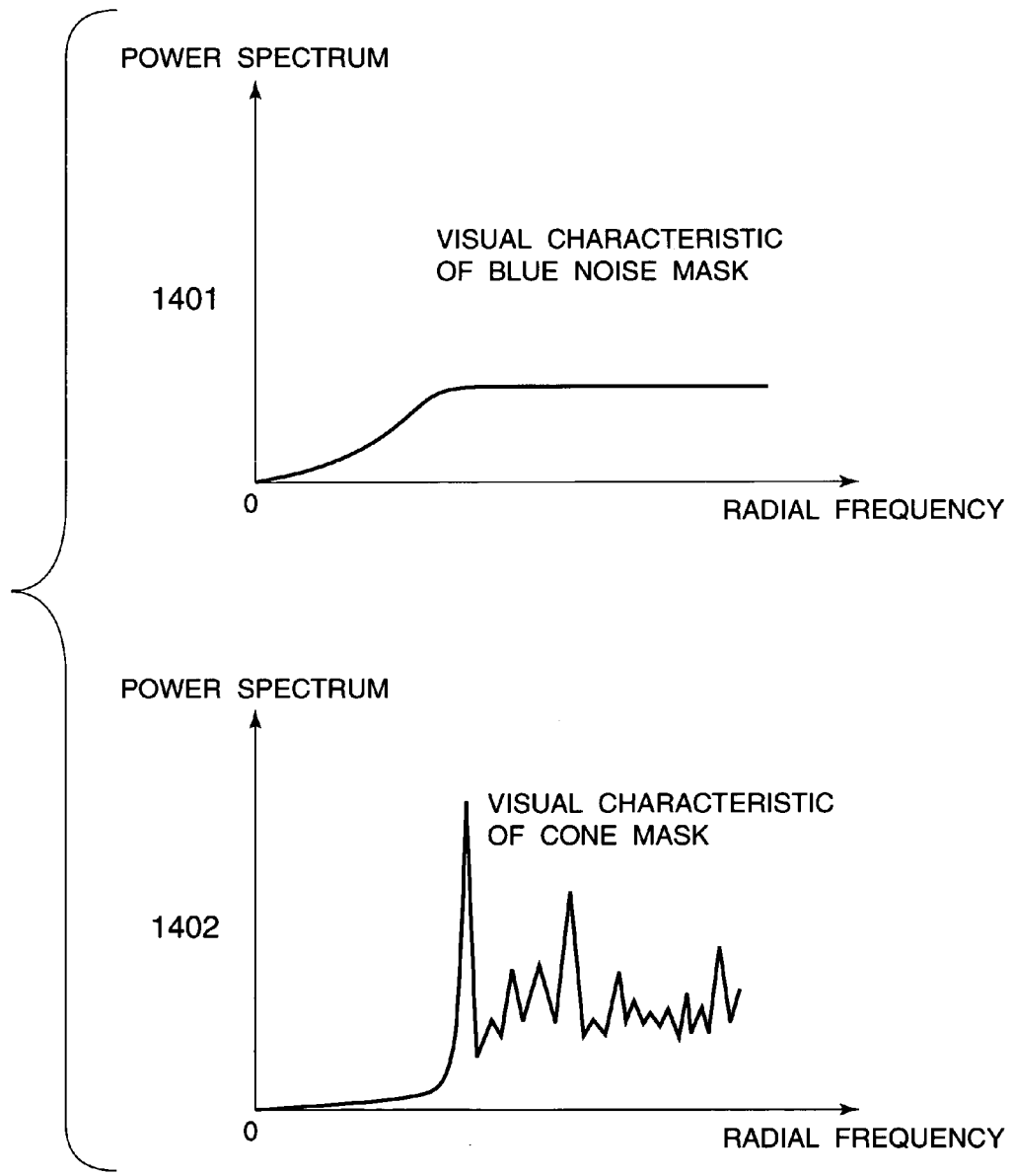
FIG. 14 is a graph showing the visual characteristics of a blue noise mask and a cone mask for a spatial frequency.

Also, a schematic graph 1401 in FIG. 14 shows the spatial frequency characteristic of the blue noise mask that has been binarized using a threshold value of 10.

In the graph 1401, the horizontal axis represents the radial frequency, and the distance from the origin (direct current component) is indicated when a Fourier conversion is performed for the blue noise mask. The vertical axis represents the power spectrum, which is the average of the sum of the squares of the amplitude components at the distances indicated by the radial frequencies. The graph 1401 is obtained by changing the two-dimensional frequency property for the image to a one-dimensional property, so that visually, it can be easily understood.

When compared with FIG. 13, it is found that the blue noise mask is not easily recognized by humans' eyes because the high frequency component is biased. Therefore, it is known that, when the blue noise mask is employed for an ink-jet printer to represent the tones of a multi-valued image employing an area-type tone reproduction that uses dots, the spatial frequency component is biased toward the high frequency domain, and area-type tones can be represented without being noticeable.

An example process for generating the blue noise mask will now be described.

1. Generate white noise.

2. Perform low-pass filtering for a binary image Pg1 (the initial value is a white noise mask) having a tone g, and generate a multi-valued image P'g1.

3. Compare the image of the tone g (the initial value: 127) with the low-pass filtering image (multi-valued image) P'g1, invert the white and black pixels of the binary image Pg in order, beginning at the pixel having the greatest error, and obtain a binary image Pg1+1.

4. Repeat the operations 2 and 3 until the error is minimized, and gradually change the binary image Pg1 (the initial value is a white noise mask) to the binary image Pg (a blue noise mask) having the tone g (initial value: 127).

5. Provide binary black (white) points having the tone g+1 (g−1) at random locations in the image Pg, and repeat the operations 2 and 3 to obtain the image Pg+1 (Pg−1).

By repeating the above processing, the blue noise mask is prepared for all the tones, and the dithering matrix is generated.

For example, for a 32×32 blue noise mask, for each tone there is an increase (decrease) every four points.

At this time, however, since the black (white) bit, previously determined as the tone g, can not be inverted in order to obtain 256 tones, for a low or high tone, the limitation condition is strict, so that only a less uniform, random pattern can be acquired.

Figure 12:
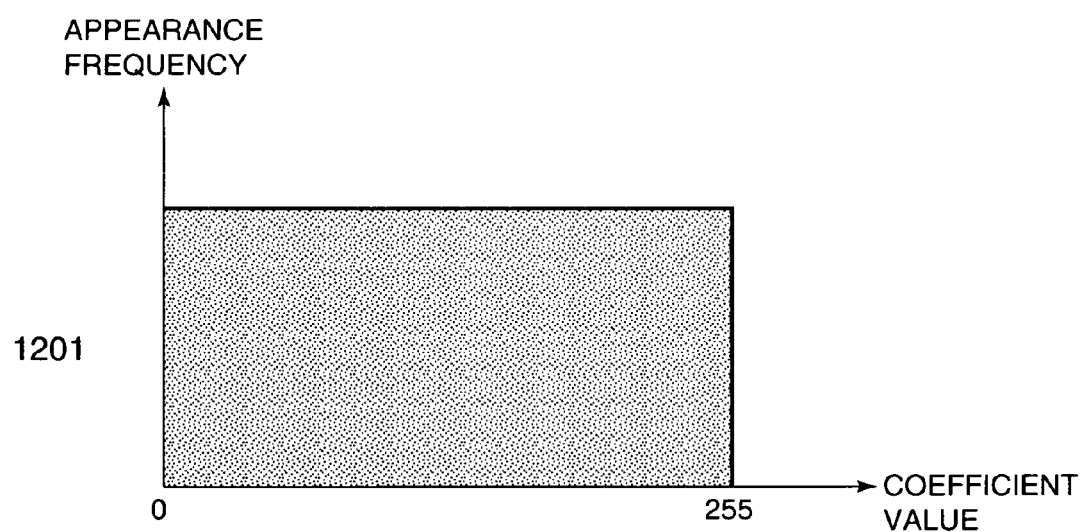
FIG. 12 is a graph showing the distribution of appearance frequencies for a cone mask and a blue noise mask.

FIG. 12 is a graph showing a frequency appearance distribution (histogram) 1201 for the coefficients constituting a blue noise mask. In FIG. 12, all the values (coefficients) of 0 to 255 are present and have the same count as in the mask.

The technique by which the blue noise mask is used to binarize the multi-valued image is well known, and is disclosed in detail in, for example, "J. Opt. Soc, Am A/Vol. 9, No. 11/November 1992, Digital halftoning technique using a blue-noise mask, Tehophano Mitsa, Kevin J. Parker".

The characteristic of the cone mask will now be described.

As one characteristic of the cone mask, when the coefficients in the mask are binarized, a periodical or pseudo-periodical peak occurs, as is shown in a graph 1402 in FIG. 14, in the spatial frequency domain that describes the obtained binary information. It should be noted that the cone mask is so designed that no peak occurs in the low frequency domain.

One part of the coefficient arrangement of a specific cone mask is shown in FIG. 38.

Since an appropriate distance is maintained between the dots, regardless of which threshold value is used to binarize the cone mask, a peak does not appear in the low frequency domain.

In the schematic graph 1402 in FIG. 14, the spatial frequency property is shown when the cone mask is binarized using a threshold value of 10. As well as the spatial frequency property for the blue noise mask in graph 1401, it is apparent that the characteristic in the graph 1402 has only a few low frequency components.

Regardless of whether the threshold value is small or large, for the cone mask, the peak appears at a frequency higher than the low frequency band that is provided for the blue noise mask. Therefore, the portions whereat the embedment positions are concentrated are reduced compared with those for the blue noise mask. Thus, the embedment noise generated when the additional information Inf is embedded is less noticeable than the blue noise.

In addition, relative to the blue noise mask, an appearance frequency distribution (histogram) 1201 in FIG. 12 is also provided for the usage frequencies of the coefficients constituting the cone mask.

Therefore, when the patterns that correspond to the individual bit information of the additional information Inf are to be embedded in the image data, while correlating with the coefficients of the mask, the patterns can be arranged in the image data, in a number equivalent to that of the bits. And as a result, the additional information Inf can be embedded uniformly.

In this embodiment, because of the above advantages, the cone mask is employed as an embedment reference mask.

(3-3-2. Mask Referring Unit)

The mask (cone mask) prepared by the mask making unit 1101 is transmitted to the mask referring unit 1102.

The mask referring unit 1102 correlates the embedment positions of N-bit information with the mask number (pixel value) to determine the embedment position.

The embedment position determination method used by the mask referring unit 1102 will now be described.

Figure 15:
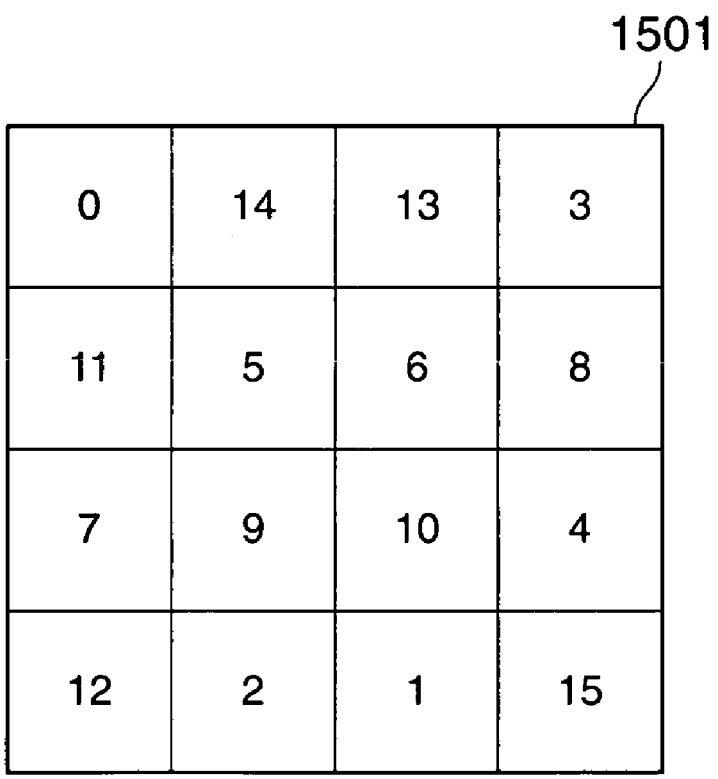
FIG. 15 is a brief diagram for explaining a position reference mask.

In this embodiment, in order to easily understand the explanation, a 4×4 cone mask 1501 in FIG. 15 is employed.

The mask 1501 in FIG. 15 has 4×4 coefficients, and each coefficient value 0 to 15 is arranged. The embedment position of the additional information Inf is referred to by using the 4×4 mask 1501. With this mask, the additional information Inf, consisting of a maximum 16 bits, can be embedded, and in this embodiment, 8 bits of additional information is to be embedded.

Figure 36:
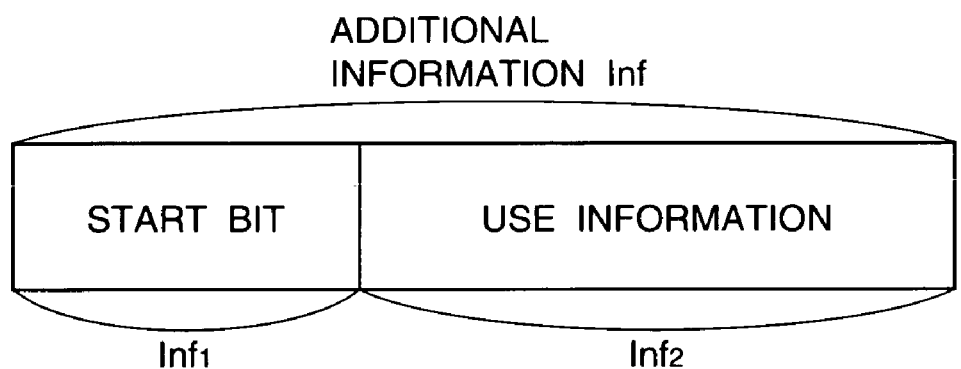
FIG. 36 is a diagram showing the structure of the additional information Inf.

The structure of the additional information Inf will now be described while referring to FIG. 36. The additional information Inf includes a start bit Inf1 and use information Inf2.

The start bit Inf1 is used by an offset adjustment unit 2003 in the electronic watermark extraction apparatus in order to show that the actual position whereat the additional information Inf has been embedded has been shifted from the ideal position, and to employ the distance shifted to correct the start position for the extraction of the electronic watermark (additional information Inf). This process will be described later in detail.

The use information Inf2 is used as original additional information, i.e., information actually added to the image data I. If the tracking of the cause of the illegal use of the image data wI is the object, this information includes either the ID of the apparatus in FIG. 1 or the user ID. Further, if the object is the inhibition of the copying of the printed material of the image data wI, the use information Inf2 includes control information indicating that copying is inhibited.

In this embodiment, a string of five bits "11111" is employed as a start bit. However, the present invention is not thereby limited, and in the additional information Inf, bits other than five may be used as the start bit; or a bit string other than "11111" may be also employed. However, the bit count of the start bits and the bit string must be used in common by the electronic watermark embedment apparatus and the electronic watermark extraction apparatus.

An explanation will now be given for a brief example wherein a cone mask of 4×4 coefficients is employed to embed additional information Inf totaling eight bits, five start bits and three use information bits.

Once again, however, the employment of the present invention is not limited to this case, and the present employment can be applied when a 32×32 cone mask is used to embed a total of 69 bits of additional information Inf, including five start bits and 64 use information bits.

In the additional information Inf, five start bits, "11111", and three information use bits, 010, are used. Of these, the first through the fifth bits include bit information values of 1, the sixth bit includes a bit information value of 0, the seventh bit includes a bit information value of 1, and the eighth bit includes a bit information value of 0.

Patterns (see FIG. 9) corresponding to these bits are allocated to the positions that correspond to the respective coefficients in the cone mask, and in accordance with their positional relationship, the pixel values of the original image data are changed by ±c. As a result, one set of the additional information Inf is embedded in original image data having a size equivalent to one cone mask.

In this embodiment, a threshold value is determined based on the minimum number of bits required for embedding the additional information Inf, and the bit information is embedded in a corresponding location in the cone mask wherein a coefficient equal to or smaller than the threshold value is located. Therefore, regardless of the number of bits in the additional information Inf, an additional information set Inf is embedded in a cone mask.

The present invention is not limited to this procedure, and the bit information may be embedded at a corresponding site whereat a coefficient equal to or greater than a specific threshold value is located. Then, based on this embedment as the assumption, the threshold value may be determined.

In this embodiment, the ratio of the number of coefficients equal to or smaller than the threshold value used for the embedment to the total number of coefficients in the mask is called an embedment filling rate.

In order to correctly embed the additional information of eight bits integer times, a threshold value of 8 or 16 must be used to determine which coefficient in the mask 1501 in FIG. 15 is used as the embedment reference position. The optimal threshold value is determined while taking into account the effect on robustness and image quality.

When the threshold value of the mask is set to 8, the embedment filling rate is 50%. That is, 50% of the image data compared with the mask is a target for the process using the pattern arrangement in FIG. 9.

An example correlation between the bit information and the coefficient in the mask is shown in correlation table 1.

CORRELATION TABLE 1

| Order of bit information to be embedded | S1 | S2 | S3 | S4 | S5 | 1 | 2 | 3 |
|---|---|---|---|---|---|---|---|---|
| Coefficient in the mask | 0 | 1 | 2 | 3 | 4 | 5 | 6 | 7 |

S1 to S5 are bit information (start bits) used in the offset adjustment unit 2003 for the adjustment of the position; 1 to 3 are three bits of use information.

Figure 16:
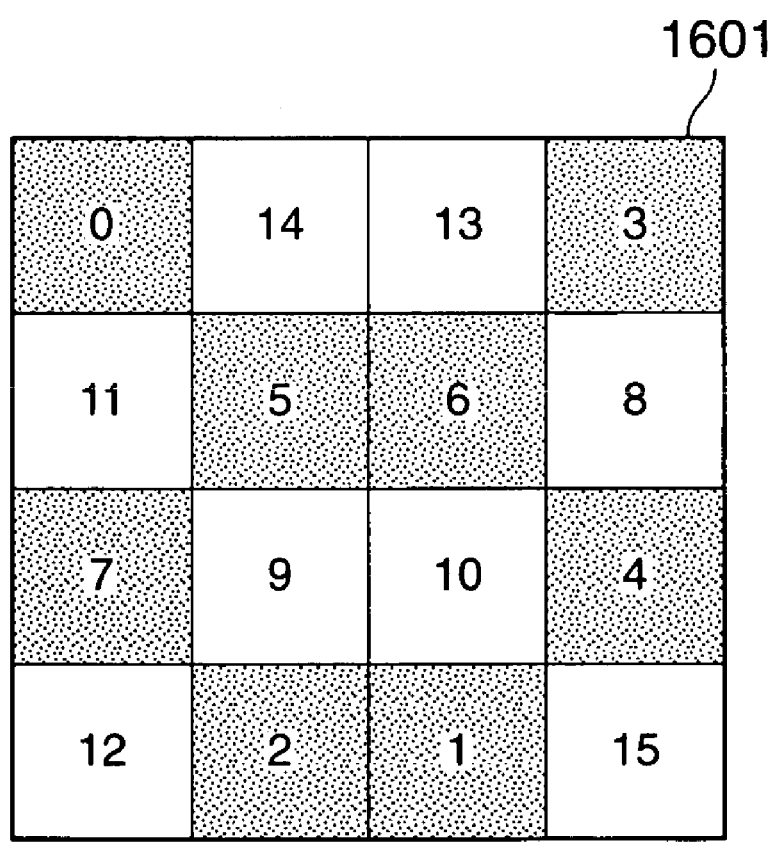
FIG. 16 is a conceptual diagram showing embedment positions in a position reference mask.

According to correlation table 1, by using the pattern (see FIG. 9) the bit information is embedded at the pixel positions in the input image data that correspond to the positions of the coefficients (0 to 7) in a mask 1601 in FIG. 16. The correlation between the order of the bit information to be embedded and the coefficient values of the mask is a part of the key information, and not all the bit information can be extracted without the correlation being obtained. In this embodiment, in order to simplify the explanation, as is shown in table 1, the coefficient values of 0 to the threshold value are correlated with S1 to S5 and the three bits of use information.

The embedment filling rate when the 32×32 cone mask is actually employed will also be briefly explained. The same processing is performed as is used for the mask 1501.

First, the threshold value that is required for correctly embedding the additional information Inf integer times is determined, while taking into account the deterioration of the image quality that occurs during embedment.

Further, in order to repeat the bits of the additional information Inf an equal number of times, the number of coefficients that is equal to or smaller than the threshold value is divided by the number N of the bits consisting of the additional information Inf, and the repetition count for embedding each bit for one mask size is determined.

For example, when the above described 69 bits of additional information Inf, five start bits and 64 bits of use information, is to be embedded in the original image data corresponding to the coefficient values 0 to 255, the threshold value is set, for example, to 137.

In this case, 138 effective coefficient values are contained in the mask. Since 69 bits are required to represent one additional information set Inf, each bit of information can be embedded 138/69=2 times in one mask size.

When the embedment position is to be determined using the cone mask, the bits are embedded at all the points whereat coefficients that are equal to or smaller than a specific threshold value are arranged. This is because the characteristic of the cone mask that the peak does not appear in the low frequency component in the spatial frequency is provided usefully.

When the embedment position is determined in the above described manner, and when the embedment filling ratio is 50% and the amount of embedded information is 69 bits, the correlation of the bit information, consisting of the additional information Inf and each of the coefficient values of the cone mask, is as shown in correlation table 2.

CORRELATION TABLE 2

| Order of bit information | | | | | | | | |
|---|---|---|---|---|---|---|---|---|
| S1 | S2 | S3 | S4 | S5 | 1 | 2 | ... | 64 |
| Coefficient value in the cone mask | | | | | | | | |
| 0, 1 | 2, 3 | 4, 5 | 6, 7 | 8, 9 | 10, 11 | 12, 13 | ... | 136, 137 |

S1 to S5 are start bits, which are bit information used for the offset adjustment apparatus 2003; 1 to 64 are use information.

However, the present invention is not limited to this correlation. So long as the pattern in FIG. 9 is employed to embed bit information, in order, in all the positions of the coefficients from 0 to the threshold value (or from the threshold value to 255), another correlation may be employed for the bit information and the coefficient values.

For the 32×32 cone mask, there are four positions in one mask whereat the same coefficient is arranged.

When, based on correlation table 2, the bit information is to be embedded in the original image data, with a large cone mask of 32×32 or 64×64, the bit information consisting of the additional information Inf is substantially embedded an equal number of times. Further, the same bit information is spread out and embedded in the original image data.

Conventionally, the embedment position is selected at random using the patchwork method; however, in this embodiment, the same effects can be obtained by referring to the cone mask, and further, image deterioration is low.

As a result, the mask referring unit 1102 obtains the coordinates (x,y) for the embedment position that corresponds to the bit information.

When this information is represented by the arrangement S[bit][num]=(x,y), for the correlation table 1, "bit" represents the start bits S1 to S5 and 1 to 3 bits of use information; "num", the order provided for the coefficients that repetitively appear in the cone mask; and (x,y), the relative coordinates in the mask.

The above described operation is performed by the mask referring unit 1102.

(3-3-3. Mask Pattern Arrangement Correspondence Unit)

The embedment position of the bit information in the cone mask, which is obtained by the mask referring unit 1102, is transmitted to the mask pattern arrangement correspondence unit 1103.

The embedment position determined by the mask referring unit 1102 is the position (equivalent to 8×8 pixels) of the pattern of the bit information. Thus, according to the patchwork method, the addition areas (+c), the subtraction areas (−c) and the other areas (0) in FIG. 9 must be allocated. Therefore, the mask pattern arrangement correspondence unit 1103 develops the 8×8 pattern arrangement in FIG. 9 at all the positions in the cone mask that is referred to by the mask referring unit 1102.

Specifically, for the coordinates of the pattern S[bit][num] =(x,y), obtained by the mask referring unit 1102, the x coordinate is multiplied by the horizontal width of the pattern arrangement, and the y coordinate is multiplied by the vertical height of the pattern arrangement. As a result, the coordinates 1701 in FIG. 17 are changed to the head coordinates 1702, and one pixel in the mask is enlarged to provide a pattern arrangement.

Figure 19:
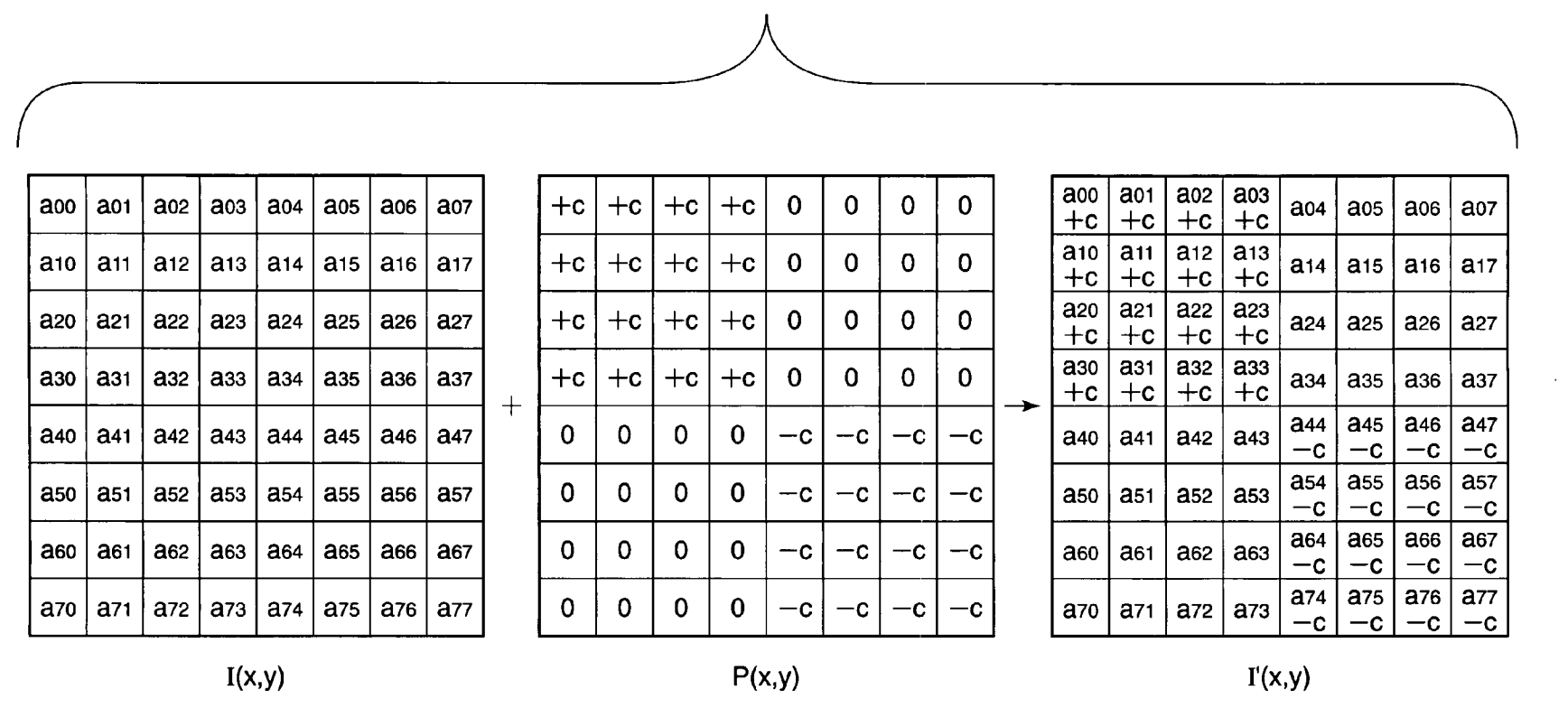

When the pattern arrangement in FIG. 19 is employed at the head coordinates, the embedment can be performed without overlapping the area 1703, which in size corresponds to the pattern arrangement.

Although the coordinates (x,y) are changed to the coordinates (x',y'), the "bit" and "num" in S[bit][num] are not changed.

Therefore, for the additional information Inf that corresponds to "bit" in S[bit][num], (x',y') is defined as the start position for the embedment of the pattern arrangement, so that multiple sets of bit information can be embedded.

A mask obtained when the mask pattern arrangement correspondence unit 1103 develops (enlarges) the coefficients of the cone mask to provide an 8×8 pattern arrangement is called an enlarged mask.

The size of the enlarged mask is (32×8)×(32×8), and this size is used as the minimum image unit (macro block) required for the embedding of at least one set of additional information Inf.

In this embodiment, as described for the pattern arrangement determination unit 0110, the size of the pattern arrangement is not limited to 8×8. In this invention, the sizes of the pattern arrangement and the patch are selected (optimized) by the pattern arrangement determination unit 0110 in accordance with the image resolution or the output resolution of the printer. Even when the size of the pattern arrangement is not 8×8, the mask pattern arrangement correspondence unit 1103 can employ the same unit to determine the embedment position for the additional information Inf.

This completes the description of the operation of the mask pattern arrangement correspondence unit 1103.

Generally, when a small mask is prepared, the degree of freedom for the dot arrangement position is smaller than it is for a large mask, and it is difficult to prepare a mask, such as a cone mask, that has a desired characteristic. For example, when the additional information Inf is to be embedded by repetitively allocating a small mask for an image, the spatial frequency of the small mask appears across the entire image.

On the other hand, since the complete additional information Inf is extracted from one mask, when a large size is set for a mask, the extraction robustness (the probability that the additional information Inf can be extracted from the partial image data wI') is reduced. Therefore, the size of the mask should be determined while taking into account and achieving a balance between extraction robustness and image deterioration.

This completes the explanation of the processing performed by the embedment position determination unit 0103 in FIG. 1.

(3-4. Additional Information Embedment Process)

By referring to the thus determined embedment positions of the bits relative to the image data, the additional information embedment unit 0104 in FIG. 1 actually embeds the additional information Inf.

Figure 10:
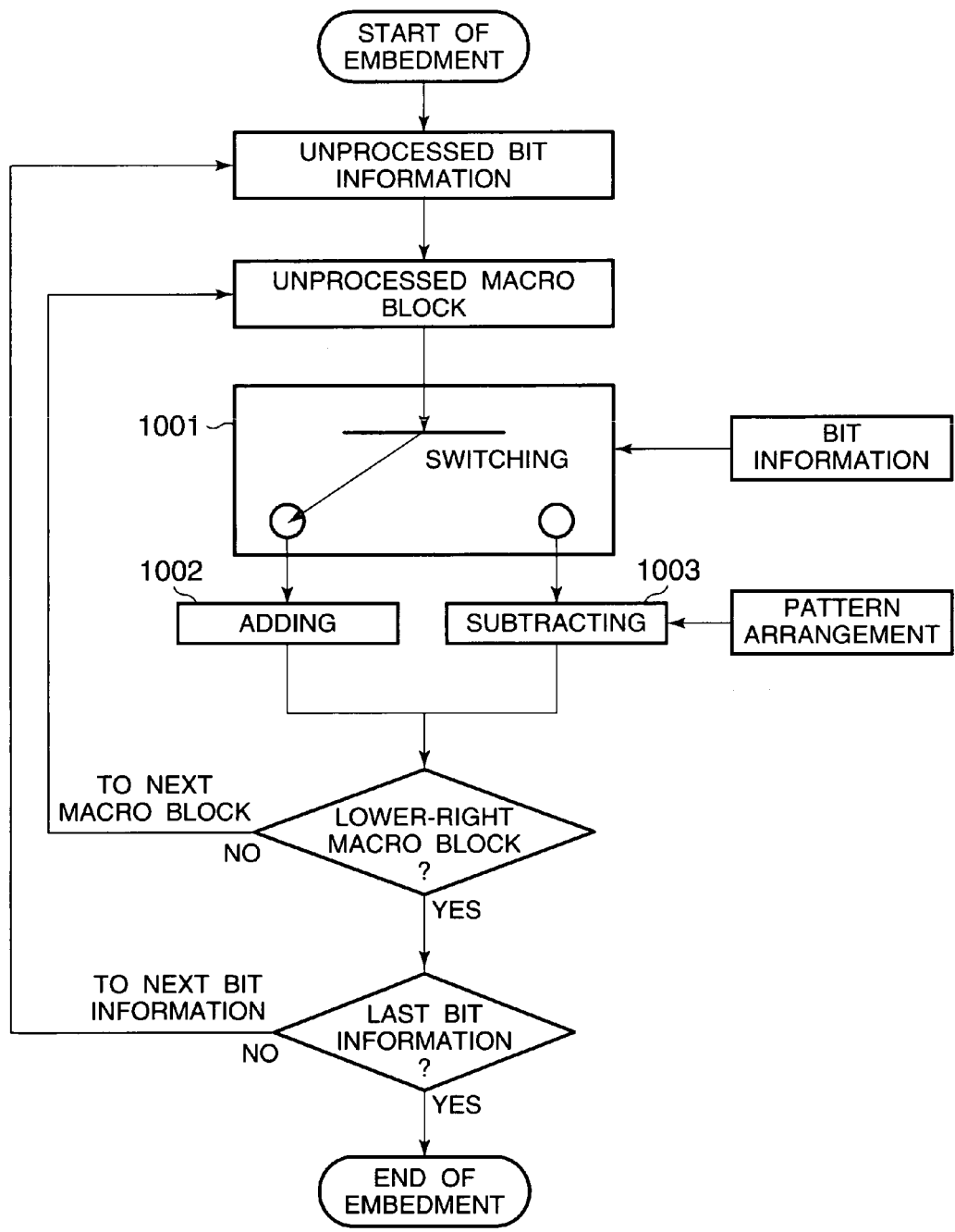
FIG. 10 is a flow chart showing the processing performed by an additional information embedment unit.

FIG. 10 is a flow chart showing the processing for repetitively embedding the additional information Inf.

In the processing shown in FIG. 10, for an entire image, multiple available macro blocks are allocated. Then, the information of the first bit of the additional information Inf is repetitively embedded in all the macro blocks, following which the information of the following bits, such as the second and the third bits, is repetitively embedded until the last information bit is reached. That is, the embedment processes 1001 to 1003 are performed for all the unprocessed macro blocks.

The present invention is not limited to this processing order, and the two internal and external loop processes may be inverted. That is, if there is an unprocessed macro block, all the bit information that has not yet been embedded may be embedded in the unprocessed macro block.

Specifically, for the embedment of the additional information Inf, the pattern arrangement in FIG. 9 is added when each bit to be embedded is "1". When a bit to be embedded is "0", the pattern arrangement in FIG. 9 is subtracted. In other words, a pattern arrangement is added in which the signs are the inverse of those in FIG. 9.

The addition and subtraction process can be performed by changing a switching unit 1001 in FIG. 10 in accordance with the bit information to be embedded. That is, when the bit information to be embedded is "1", the switching unit 1001 is connected to the addition unit 1002, and when the bit information to be embedded is "0", the switching unit 1001 is connected to the subtraction unit 1003. The processes 1001 to 1003 are performed by referring to the bit information and the pattern arrangement.

The state wherein information consisting of one bit is embedded is shown in FIG. 19. In FIG. 19, the bit information to be embedded is "1", i.e., the pattern arrangement is added.

In the example in FIG. 19, I(x,y) is the original image, and P(x,y) is an 8×8 pattern arrangement. The coefficients constituting the 8×8 pattern arrangement are superimposed on original image data (the blue component) having the same size as the pattern arrangement, and the values at the corresponding positions are added or subtracted. As a result, I'(x,y) is obtained, and is output to the color component synthesis unit 0105 in FIG. 1 as the image data for the blue component, wherein the bit information is embedded.

The addition/subtraction using the 8×8 pattern arrangement is repeated for all the embedment positions (the positions wherein the pattern arrangement is allocated for the embedding of the bit information) that are determined in correlation table 2.

As is explained for the pattern arrangement determination unit 0110, in this embodiment the size of the pattern arrangement is not limited to 8×8. In this invention, the sizes of the pattern arrangement and the patch are selected (optimized) by the pattern arrangement determination unit 0110 in accordance with the image resolution or the output resolution of the printer. Even when the size of the pattern arrangement is not 8×8, the same additional information embedment unit 0104 can embed the additional information Inf.

In FIG. 18 is shown the state wherein the internal loop process in FIG. 10 is performed.

In FIG. 18, in order to repetitively embed the bit information, a macro block 1802 is repetitively allocated across the entire image 1801 (1803), from the upper left to the lower right in raster order, and the embedding process (1001 to 1003 in FIG. 10) is performed.

The above operation is performed by the additional information embedment unit 0104, so that the additional information Inf is embedded in the entire image.

Through this processing, the additional information Inf is embedded in the image data. When the individual elements of the image data wherein the additional information Inf is embedded are represented by a satisfactorily small number of dots, the size of the pattern arrangement will be sufficiently small, so that each pattern arrangement will be perceived as a very small point by a human's eyes. Thus, the spatial frequency property of the cone mask is maintained, and the image deterioration is not noticeable.

(3-5. File Compression and Decompression)

In this embodiment, after the additional information Inf is embedded by the additional information embedment unit 0104, the compression, storage and decompression of a file is performed.

An explanation will now be given for a method for designing a process for the embedment of an electronic watermark, while taking into account the compression of an image wherein an electronic watermark is embedded.

(3-5-1. JPEG Compression Encoding)

Figure 39:
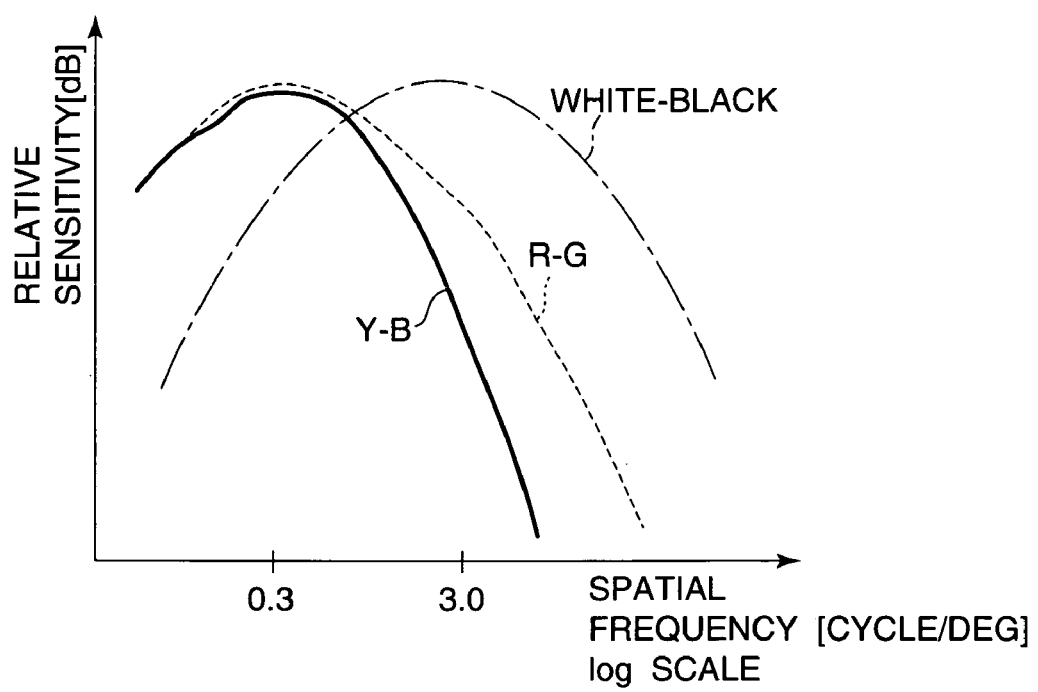
FIG. 39 is a diagram showing the chromaticity characteristic of a human's eyes for a spatial frequency.

FIG. 39 is a graph showing the visual characteristic relative to the chromaticity and the spatial frequency. To plot each curve, a spatial sine pattern of white-black, or red-green or yellow-blue, that is, a pair of opposite colors having the same luminance, was employed. When the cycle and contrast of the spatial sine pattern was changed, the limit that the pattern can be recognized by the human's eyes is measured.

In FIG. 39, for the white-black curve (brightness information), maximum sensitivity was reached at about 3 [cycle/deg], and for the chromaticity (red-green or yellow-blue), maximum sensitivity was reached at about 0.3 [cycle/deg].

It is therefore apparent that the brightness information is a sensitive factor in the identification of fine portions, such as image resolution, and that the chromaticity affects the appearance of a spatially wide portion (low spatial frequency).

Further, it was also so found that the yellow-blue pattern, when compared with the red-green pattern, does not affect the fine identification of the spatial information.

As a result, it is concluded that, according to the method for modulating a gray scale image having only a luminance component and for embedding the electronic watermark information in the obtained image, image deterioration was noticeable, compared with the method used for embedding electronic watermark information in the color component of the color image data. It was further concluded that the method for embedding electronic watermark information in the blue element (B) is preferable for RGB color image data, to render image deterioration the least noticeable to human beings.

When the color component is changed to embed therein electronic watermark information, uneven color is discernable by a human's eyes across a spatially wide domain (the state at a low spatial frequency). Whereas in a spatially narrow domain (the state at a high spatial frequency), uneven color is less noticeable than when the electronic watermark information is embedded in the luminance.

In this embodiment, for a gray scale image having for one pixel only one type of element, the image data are converted into color image data that for one pixel have multiple elements, and then the electronic watermark information (additional information Inf) is embedded therein. Therefore, image deterioration can be better prevented than when the electronic watermark information is embedded in the gray scale image data.

When the embedment of the electronic watermark information in the gray scale image data is compared with the embedment of the electronic watermark information in only one element of multiple element types that constitute the color image data, a preferable image quality can be maintained when the image is output at a high resolution (when the value of one pixel is represented by a small number of ink dots).

However, one disadvantage is that the color image data (file size) to be output is almost three times the size of the original image data.

In this embodiment, therefore, in order to limit the file size as much as possible, the JPEG compression encoding unit 0106 performs JPEG compression encoding for the image data in which the electronic watermark has been embedded.

Generally, JPEG compression encoding is a technique, based on the visual characteristics of human beings, for removing a portion to which human beings are not visually sensitive and for reducing the data quantity. Whereas the electronic watermark technique is a technique for embedding information in a portion to which a human's eyes are not sensitive. Thus, it is difficult for the JPEG compression encoding technique and the electronic watermark technique to coexist, and JPEG compression and encoding is regarded as a type of attack on the electronic watermark information.

The method for providing the robustness required to resist the debilitating effects of JPEG compression and encoding will now be briefly explained.

The pattern arrangement shown in FIG. 9 is so set, through sub-sampling of the color difference component and the quantization process, that the additional information embedded in the color image data is not lost.

First, the JPEG compression encoding method will be briefly described.

The color image data input to the JPEG compression encoding unit 0106 is converted into luminance (Y) and a color difference (Cr, Cb). When original color image data consisting of red (R), green (G) and blue (B) components are input, the equations $Y=0.29900 \times R+0.58700 \times G+0.11400 \times B$ $Cr=0.50000 \times R-0.41869 \times G-0.08131 \times B$ $Cb=-0.16874 \times R-0.33126 \times G+0.50000 \times B$ are employed to convert the format of the original color image data into color image data that consist of the luminance (Y) and the color difference (Cr, Cb).

Figure 40:
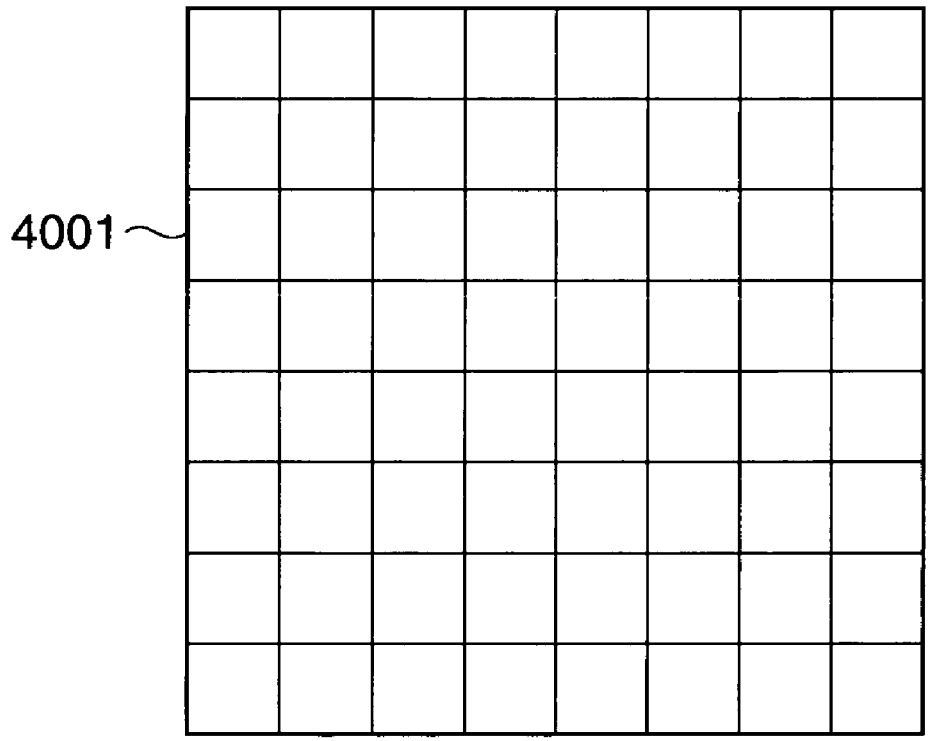
FIG. 40 is a diagram showing the minimum encoding unit of the JPEG method.

Image data separated into a luminance component and a color difference component are divided in the raster order, beginning at the upper left of the image, into blocks of 8×8 pixels, as shown in FIG. 40. According to the JPEG compression and encoding method, compression and encoding are repeated for each 8×8 block.

An explanation will now be given for the sampling process used for the color component according to the JPEG compression and encoding technique.

During the JPEG compression and encoding processing, the sampling of the color difference component is performed at the sampling ratio of the sampling option for each 8×8 pixel block.

FIG. 41 is a diagram showing the state for the sampling of image data. Sampling performed at a ratio of 4:2:2 in the JPEG compression and encoding processing will be described.

A luminance component 4101 consists of a 4×4 pixel block. Since there is much visually important information is present for the luminance component, a thinning process is not performed and the 4×4 pixel block is output unchanged.

A color difference component (Cr, Cb) 4103 consists of 4×4 pixels. Since a human's eyes exhibit little sensitivity to the color component, horizontally or vertically two pixels are thinned down to one pixel. As a result, the color difference component (Cr, Cb) 4103 of 4×4 pixels is converted into one 4104 of 4×2 pixels. Through the above sampling, a color difference component of 8×8 pixels is reduced to one of 8×4 pixels.

Therefore, as a result of sampling performed at the ratio of 4:2:2, the luminance component Y, the color difference component Cr and the color component Cb of 8×8 pixels are changed respectively to 8×8 pixels, 8×4 pixels and 8×4 pixels. In a well known manner, the DCT (Discrete Cosine Transform), quantization, zigzag scanning and Huffman coding are performed for the pixels obtained by sampling.

Further, when the fact that the visual characteristic of human beings is not sensitive to the high frequency component is employed, and when the number of steps for quantizing the DCT coefficient to obtain the high frequency component is reduced, the data are compressed efficiently. Further, the quantization is performed so that the total number of quantization steps is smaller for the color difference component than for the luminance component.

The robust pattern arrangement that can resist the above described compression and encoding processing will now be described.

In FIG. 42, the pattern arrangement in FIG. 9 is shown again. In FIG. 42, an area 4201 in which the positive elements +c are arranged is called a positive patch, and an area 3202 in which the negative elements −c are arranged is called a negative patch. At this time, the information is biased toward a low frequency component in the minimum encoding unit 4001 of 8×8 pixels in FIG. 40, so that for each patch the robustness available to counter the effects of JPEG compression can be increased. However, the present invention is not limited to this, and 16×16 pixels may be defined as the minimum encoding unit for the various setups mentioned above.

Further, when sampling is performed at a ratio of 4:1:1 (every other pixel of the color difference component is thinned vertically and horizontally) or at a ratio of 4:2:2 (every other pixel of the color difference component is thinned vertically or horizontally), in accordance with the sampling, each patch has a width that is integer times two pixels vertically and/or horizontally. Then, the robustness relative to the sampling can be increased.

Specifically, (1) Each patch is used wherein information is biased toward the low frequency by the minimum encoding unit (8×8 pixels).

(2) The size of each patch, in accordance with the sampling method, is 2×N (N is an integer) pixels vertically and/or horizontally.

In order to provide the low frequency component for each patch (8×8 pixels) for which the JPEG compression encoding is performed, it is preferable that the position on an image to which the pattern arrangement is allocated, and the size of the pattern arrangement (8×8 pixels in FIG. 9) are synchronized for the areas for which the encoding is performed.

That is, (3) The size and the embedment position of the pattern arrangement are synchronized with the unit size for which the JPEG compression and encoding is performed.

When the additional information Inf is embedded using the pattern arrangement in FIG. 9, while taking the above condition into account, the electronic watermark information (additional information Inf) can be maintained in the image data even after JPEG compression and encoding of the data has been performed. Thus, the adequate robustness relative to JPEG compression and encoding can be obtained.

It should be noted that the present invention includes a case wherein the color component extraction unit 0101 converts the gray scale (monotone) image directly into the luminance component (Y) and the color difference components (Cr and Cb), and the additional information Inf is embedded, as the electronic watermark, only in the Cb component. In this case, the conversion of the luminance and the color components by the JPEG compression encoding unit is not required, and the number of procedures is reduced.

Further, the present invention includes a case wherein the color component extraction unit 0101 directly converts the gray scale (monotone) image to the yellow (Y), magenta (M), cyan (C) and black (K) components used for printing, and the additional information Inf is embedded, as an electronic watermark, only in the Y component. In this case, the process for the conversion of the color component immediately before the printing process can be eliminated.

That is, the present invention includes a case wherein the additional information Inf is embedded in only one component of those components that, collectively, constitute a single pixel, regardless of whether the component used for the embedment is the blue component, the Cb component or the Y component.

(3-5-2. Memory Storage)

The coded data produced by JPEG compression and encoding is temporarily stored in the memory. Subsequently, at the succeeding stage, the coded data is read from memory, in accordance with the timing for the transmission of data to an external device and the printing timing for the printer of the apparatus in FIG. 1, and is transmitted to the JPEG decompression decoding unit 0108.

In this embodiment, the gray scale image data are temporarily converted into color image data, and the blue component is modulated. Then, the color image data, consisting of the luminance and color difference components, are obtained, and JPEG compression is performed for this color image data. When the amount of the thus provided coded data is compared with the amount of coded data that is obtained by converting the original gray scale image data into color image data, consisting of luminance and color difference components, and by performing JPEG compression and encoding for the color image data, there is no drastic increase in memory usage, even though there is a slight increase in the amount of color component data.

Specifically, on the assumption that JPEG compression and encoding is performed for the original image data, in which the electronic watermark information has been embedded, when the method of this embodiment for embedding the electronic watermark information (additional information Inf) in the gray scale image data is compared with the method for modulating the common gray scale image data and embedding the electronic watermark information, image quality can be improved without the data quantity being greatly increased.

(3-5-3. JPEG Decompression Decoding)

The JPEG decompression decoding unit 0108 reads the coded data from the memory 0107 in accordance with the timing for the transmission of data to an external device, or the printing timing for the printer 0109, and uses a process that is the inversion of the compression process to decode the color image data.

(3-6. Registration Process)

The registration unit 0203 of the electronic watermark extraction apparatus in FIG. 2 will now be described in detail.

The registration unit 0203 is positioned at the stage preceding the additional information extraction unit 0204 to perform the pre-process for the extraction of the additional information Inf. The image data extracted at the preceding stage from the blue component, by the color component extraction unit 0202, is transmitted to the registration unit 0203.

The registration unit 0203 corrects a difference in the scale between the image data wI, received from the electronic watermark embedment unit, and the image data wI', transmitted to the electronic watermark extraction apparatus.

Figure 7:
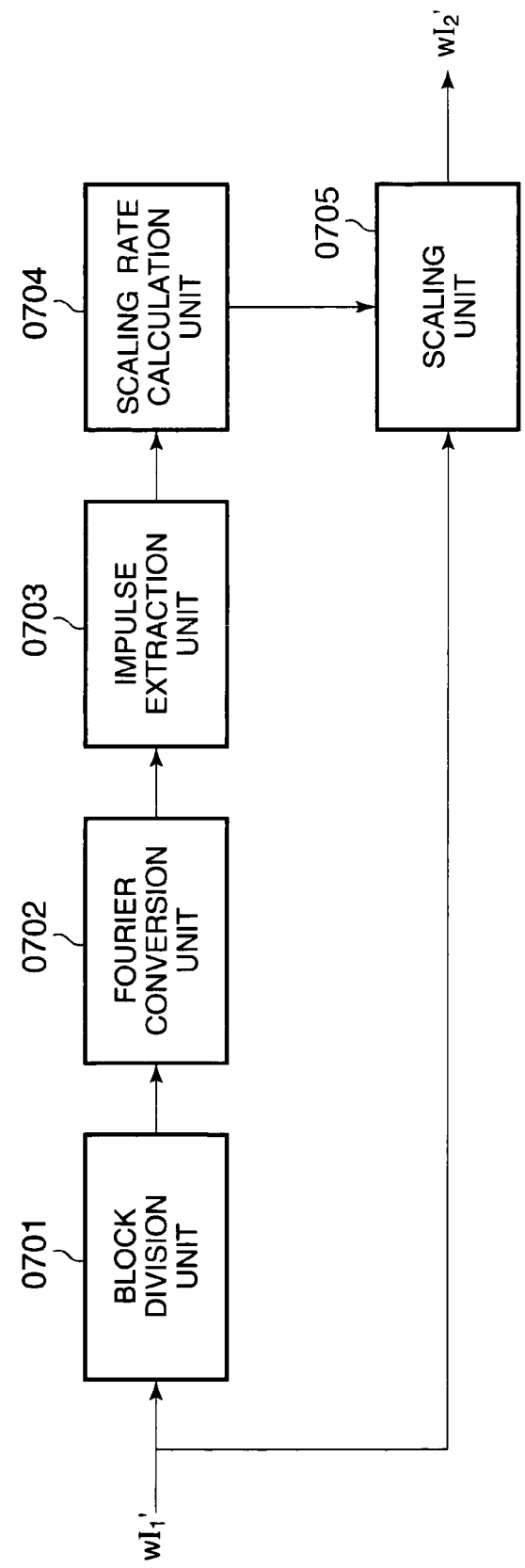
FIG. 7 is a block diagram illustrating a scaling unit.

The detailed arrangement of the registration unit 0203 is shown in FIG. 7. As is shown in FIG. 7, the registration unit 0203 comprises a block division unit 0701, a Fourier conversion unit 0702, an impulse extraction unit 0703, a scaling rate calculation unit 0704 and a scaling unit 0705.

The block division unit 0701 performs the same block division process as the registration signal embedment unit 0102 (the block division unit 0401) described above. Generally, using this process it is difficult to extract the same blocks as the registration signal embedment unit 102 (the block division unit 0401). This is because, when the printing process is performed for the image data wI in which the electronic watermark information has been embedded, the size of the data is changed and the position is shifted.

However, the position shifting does not greatly affect the extraction of blocks. This is because the registration signal is embedded in the amplitude spectrum of the image data by the electronic watermark embedment apparatus. Since a characteristic of the amplitude spectrum is that it is not affected by a position shift in the spatial domain of the image data, no problem arises, even when the position shift in the spatial domain occurs among blocks obtained by the block division units of the electronic watermark embedment apparatus and the electronic watermark extraction apparatus.

The block division unit 0701 outputs the resultant image data to the Fourier conversion unit 0702. The Fourier conversion unit 0702, as well as the registration signal embedment unit 0102, converts image data in the spatial domain into image data in the frequency domain. The image data in the frequency domain provided by the Fourier conversion is represented by the amplitude spectrum and the phase spectrum. However, only the amplitude spectrum is transmitted to the impulse extraction unit 0703; the phase spectrum is abandoned.

The image data in the frequency domain is transmitted to the impulse extraction unit 0703, whereat only the impulse signal is extracted from the received image data. That is, the signals 0502, 0503, 0504 and 0505, which are embedded in the image data, are extracted.

Figure 8A:
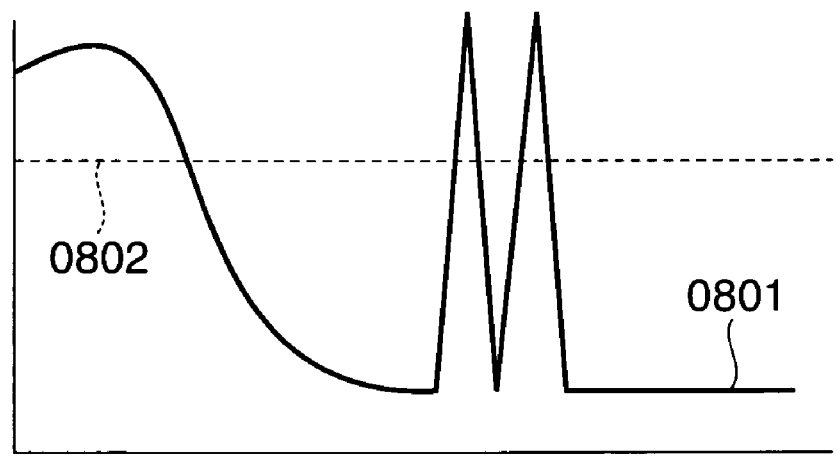
FIGS. 8A and 8B are graphs for explaining the extraction of a registration signal.

This extraction can be performed by using a well known image processing technique; one, for example, that employs a threshold value to process the image data converted in the frequency domain. This example is shown in FIG. 8A. In FIG. 8A, an amplitude spectrum 0801, transmitted to the impulse extraction unit 0703, is processed by using a threshold value 0802. It should be noted that, to make the explanation easier to understand, a single dimension is used in FIG. 8A to represent the image data provided by conversion. The impulse signal can be extracted by selecting an appropriate threshold value 0802. However, original image data that has the same magnitude as the impulse signal in the low frequency band is also extracted.

Figure 8B:
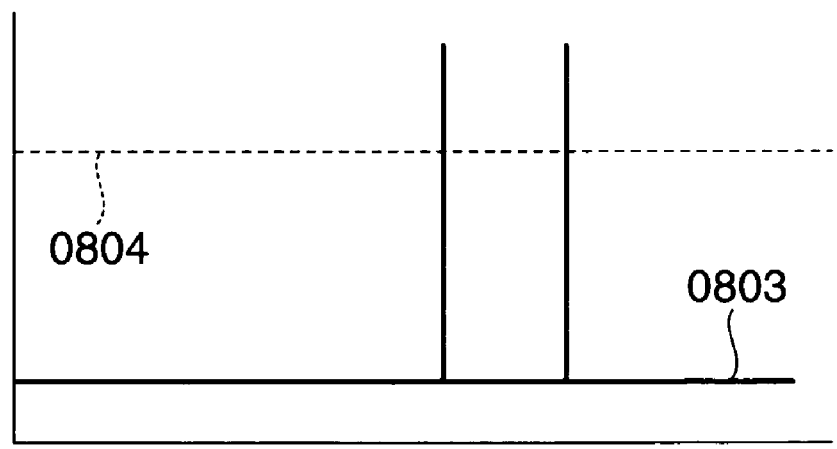

The method used to resolve this problem in this embodiment is shown in FIG. 8B. The secondary differential process is performed for the image data 0801 in the frequency domain that are converted. This process is equivalent to the Laplacian filter process. Then, to obtain image data 0803, the secondary differential process is performed for the image data 0801 converted in the frequency domain, and an appropriate threshold value 0804 is selected for the data 0803. Thereafter, the threshold value 0804 is used to process the data 0803, so that the impulse signal can be extracted.

Figure 26:
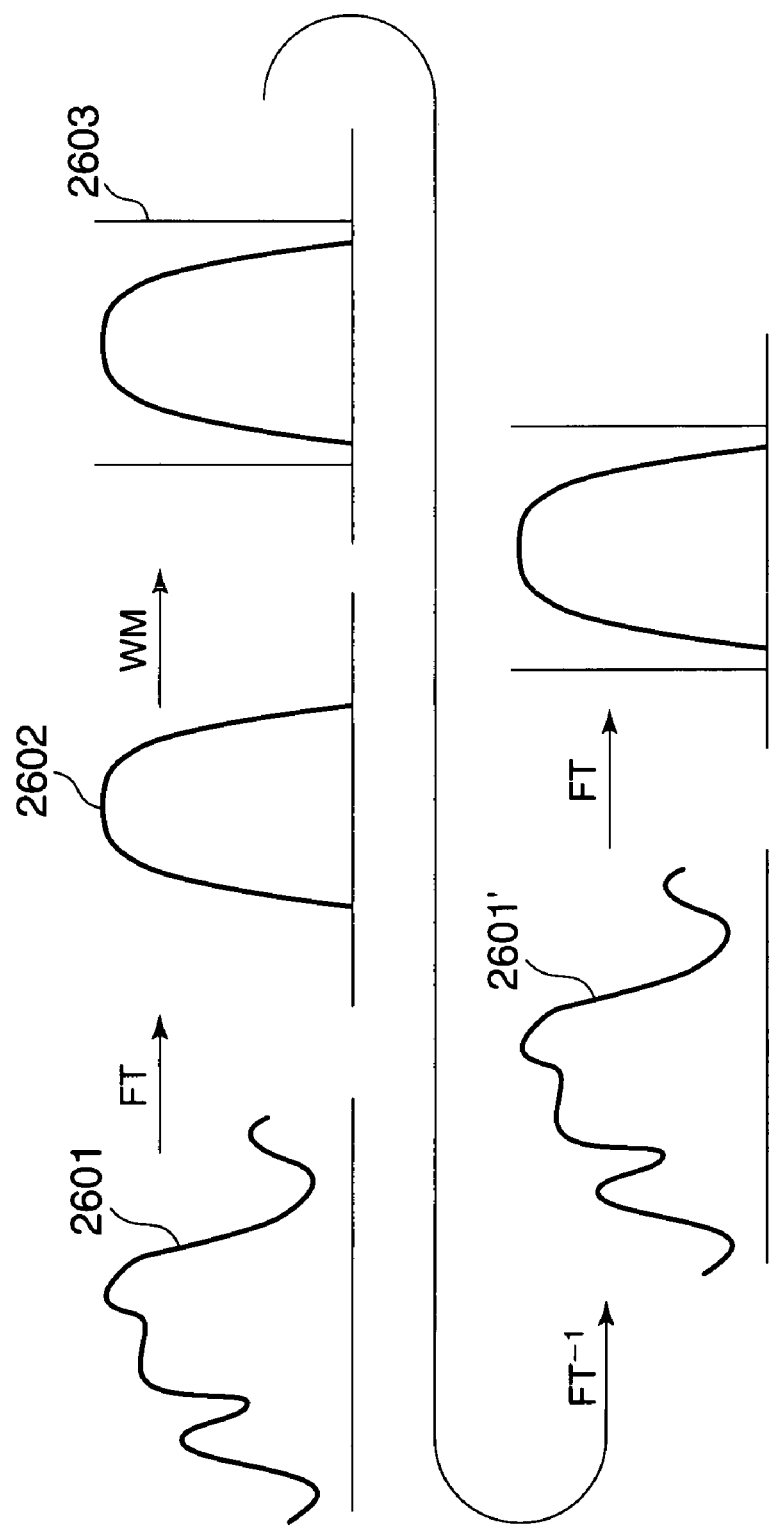
FIG. 26 is a diagram for explaining the principle for the embedding and extraction of a registration signal.

A slightly more detailed explanation will now be given, while referring to FIG. 26, for the principle for the extraction of the impulse signal. In FIG. 26, the process performed by the registration signal embedment side is also shown.

The registration signal embedment unit 0102 converts image data 2601 in the spatial domain to image data 2601 in the frequency domain, and adds an impulse signal to the image data 2601 in the frequency domain.

When the inverse frequency transformation is performed for the image data in the frequency domain, to which the impulse signal (registration signal) 2603 is added, the image data is returned to a signal 2601' in the spatial domain. Although the image data 2601' returned to the frequency domain will have an affect due to the addition of the impulse signal, this is almost impossible for a human's eyes to perceive, and the image data 2601 and the image data 2601' appear substantially the same. This is because the impulse signal 2603 added in the frequency domain is distributed, with a small amplitude, to all of the image data by the inverse Fourier conversion process.

The addition of the impulse signal 2603 in FIG. 26 is equivalent to the addition to the spatial domain of the image data having a specific frequency component. When the magnitude of an added impulse signal is higher than the frequency at which human beings can discern light, and when its amplitude is equal to or lower than the level at which human beings can discern light, the added impulse signal is not visible to humans. Therefore, the embedment of the registration signal can be said to be one type of electronic watermarking process.

In this embodiment, after the registration signal 2603 is embedded in the image data 2601, and the additional information Inf is embedded, the signal 2601' in the spatial domain is reproduced.

Before the extraction process, the Fourier conversion is again performed for the registration signal that is embedded as is shown in FIG. 26. Thus, the registration signal 2603, which is distributed to all the data in the spatial domain, is again converted into a signal in the frequency domain, and the resultant signal appears again as an impulse signal.

When the image in which the electronic watermark information has been embedded is subjected to an irreversible compression attack, such as JPEG compression, there is a high probability that the amplitude of the impulse will be decreased. Whereas, when an image is subjected to a geometrical attack, such as scaling, the position of the impulse is shifted. In either case, the impulse signal can be extracted using the above described appropriate impulse extraction process, and the degree of change from the original image data can be measured. Then, when the change is corrected, a state for ensuring the extraction of the embedded additional information Inf can be provided.

Through the above described processing, the impulse extraction unit 0703 in FIG. 7 extracts the impulse signal and transmits it to the scaling rate calculation unit 0704, which uses the coordinates of the received impulse signal to obtain the type of scaling.

Assume that the electronic watermark extraction apparatus in this embodiment is notified in advance of a frequency component in which the impulse signal has been embedded. In this case, the scaling rate can be calculated by using the ratio of the frequency whereat the impulse signal was embedded in advance to the frequency whereat the impulse signal is detected. For example, "a" denotes the frequency whereat the impulse signal was embedded in advance and "b" denotes the frequency whereat the impulse signal was detected. Using these, it can be found that the scaling has been performed a/b times. This is a well known Fourier conversion characteristic. Through the above processing, the scaling rate is output by the scaling rate calculation unit 0704.

However, the present invention is not limited to this, and information for the position (frequency) whereat the registration signal is embedded may be received as needed from the electronic watermark embedment apparatus. The present invention also includes a case wherein this position signal is received as an encryption signal, and the scaling rate is calculated. As a result, only the person who knows the registration signal can correctly extract the additional information Inf. In this case, the registration signal can be used as a key for the extraction of the additional information Inf.

The scaling rate is transmitted by the scaling rate calculation unit 0704 to the scaling unit 0705. The scaling unit 0705 also receives the image data wI1', for which, at the scaling rate, it performs a scaling process; one of various processes, such as bilinear interpolation or bi-cubic interpolation, that can be employed for this purpose. Thereafter, the scaling unit 0705 outputs image data wI2', provided by the performance of the scaling process.

In this embodiment, the scaling unit 0704 outputs the scaling rate to the pattern arrangement calculation unit 0204 in FIG. 2 for the second object.

The first object is the performance of the scaling process for the image data wI2', obtained by scaling the image data wI1', and the second object is the determination by the pattern arrangement calculation unit 0204 in FIG. 2, while using the received scaling rate, of the pattern arrangement that was used for the embedment.

(3-7. Additional Information Extraction Process)

An explanation will now be given for the processing performed by the additional information extraction unit 0204 to extract the additional information Inf from the blue component of the image data wI', in which the additional information Inf was embedded by the additional information embedment unit 0103 in FIG. 1.

Figure 20:
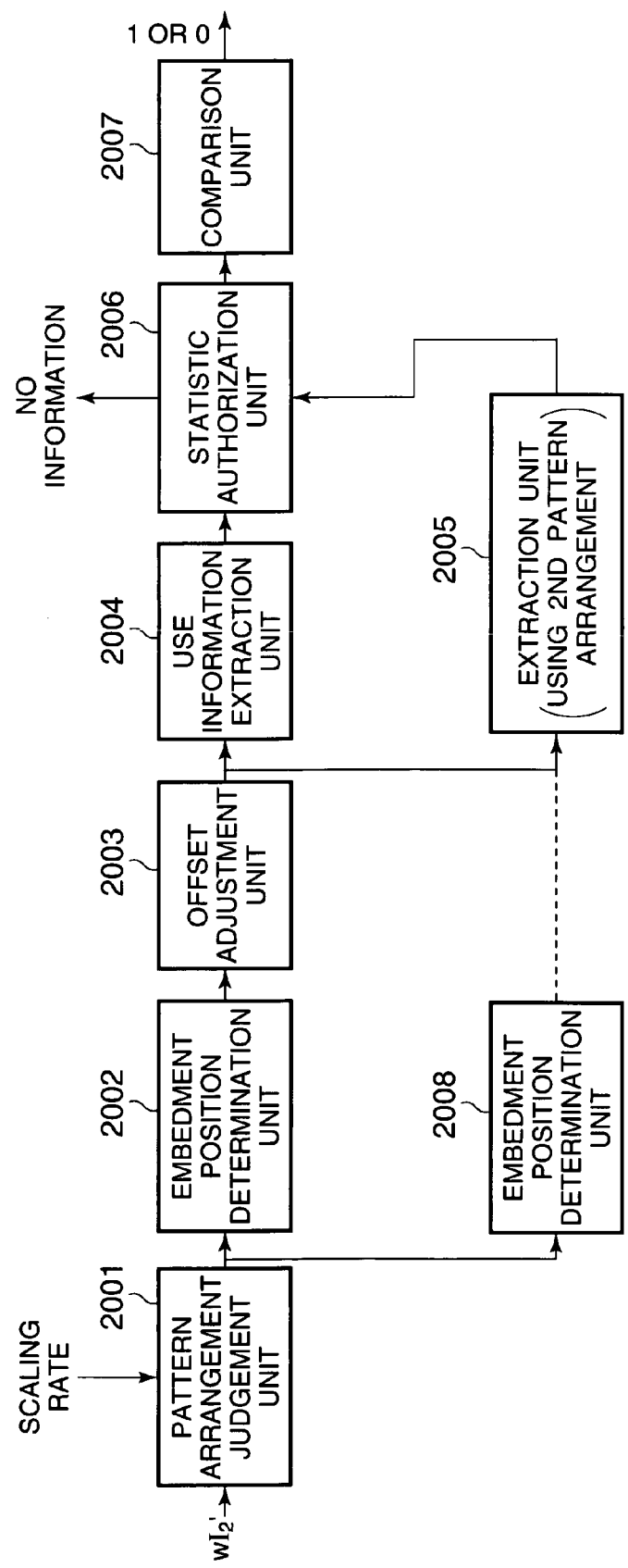
FIG. 20 is a diagram for explaining an additional information extraction unit.

The processing sequence for the extraction of the additional information Inf is shown in FIG. 20.

As is shown in FIG. 20, the scaling rate is transmitted by the registration unit 0203 in FIG. 2 to a pattern arrangement determination unit 2001, which then determines what pattern arrangement was used for the embedment.

(3-7-1. Pattern Arrangement Determination Unit)

The image data wI2', provided by the scaling process, is transmitted to the additional information extraction unit 0204. At this time, when the pattern arrangement determination unit 0110 in FIG. 1 has determined the pattern arrangement, in accordance with the image resolution and the output resolution of the printer 0109, the pattern arrangement that was used for the embedment can not be identified without obtaining the image resolution and the output resolution of the printer 0109. When the pattern arrangement that was used for the embedment is unknown, the additional information Inf can not be extracted.

In this embodiment, the pattern arrangement determination unit 2001 employs the scaling rate received from the registration unit 0202 to determine the pattern arrangement used when the additional information Inf was embedded.

With the assumption that the input resolution of the scanner 0201 during the scanning of the printed material pwI' is fixed, and the output resolution of the printer 0109 is known, the unit for determining the pattern arrangement using the scaling rate will now be described.

The scanner 0201 in FIG. 2 scans the printed material pwI' at an input resolution of 600 ppi, and obtains the image data wI'.

Assume that the output resolution of the printer 0109 at this time is 1200 dpi, while the input resolution of the scanner 0201 is 600 ppi.

The image data wI' is transmitted to the color component extraction unit 0202, which extracts the color component and outputs the image data wI1'. The image data wI1' is transmitted to the registration unit 0203, and the scaling rate calculation unit 0704 of the registration unit 0203 outputs, to the additional information extraction unit 0204, the scaling rate and the image wI2' obtained by scaling.

In the additional information extraction unit 0204, the received scaling rate is transmitted to the pattern arrangement determination unit 2001.

An explanation will now be given for an example image in which an electronic watermark having a scaling rate of 0.80 is embedded.

It is apparent from the scaling rate and the input resolution of the scanner 0201 that the image is output by the printer 0109 at the image resolution 600 ppi×0.80=480 ppi.

When an image resolution of 500 ppi serves as a threshold value, while taking tone transformation into account, a correlation is defined where, when the image resolution is less than 500 ppi, the pattern arrangement 4901 (8×8 pattern arrangement) in FIG. 49 is employed for the embedment, and where, when the image resolution is equal to or higher than 500 ppi, the pattern arrangement 4903 (12×12 pattern arrangement) in FIG. 49 is used for embedment. In this case, it is apparent that an electronic watermark having a scaling rate of 0.80 was embedded by using the pattern arrangement 4901 (8×8 pattern arrangement) in FIG. 49.

In the above described manner, the pattern arrangement determination unit 2001 employs the scaling rate to identify the pattern arrangement that was used for the embedment of the additional information Inf, and at the succeeding stage, outputs the pattern arrangement to an embedment position determination unit 2002.

A pattern arrangement 4902 orthogonal to the pattern arrangement 4901 in FIG. 49 and a pattern arrangement 4904 orthogonal to the pattern arrangement 4903 are used by an extraction unit 2005 in FIG. 20 that employs a second pattern arrangement. The orthogonal pattern arrangements will be described in detail later.

(3-7-2. Embedment Position Determination Process)

The embedment position determination unit 2002 determines from which area of the image data wI2' (blue component) the additional information Inf is to be extracted. The operation of the embedment position determination unit 2002 is the same as the embedment position determination unit 0103, and thus, the same area is selected by the embedment position determination unit 0103 and the embedment position determination unit 2002.

By using the correlation table 2 and the pattern arrangement shown in FIG. 9, the additional information Inf is extracted from the determined area.

The extraction of the additional information Inf is carried out by convoluting the pattern arrangement for the determined area.

When the pattern arrangement is variable in accordance with the output resolution of the image, it is determined that the pattern arrangement received from the pattern arrangement determination unit 2001 in FIG. 20 is to be used for the extraction of the additional information Inf. Hereafter, an explanation will be given only for a case wherein the 8×8 pattern arrangement is received from the pattern arrangement determination unit 2001 in FIG. 20. However, the same process can be performed for another pattern arrangement.

(3-7-3. Reliability Distance Calculation Unit)

The reliability distance d is an operation value required for the extraction of the embedded information.

Figure 6:
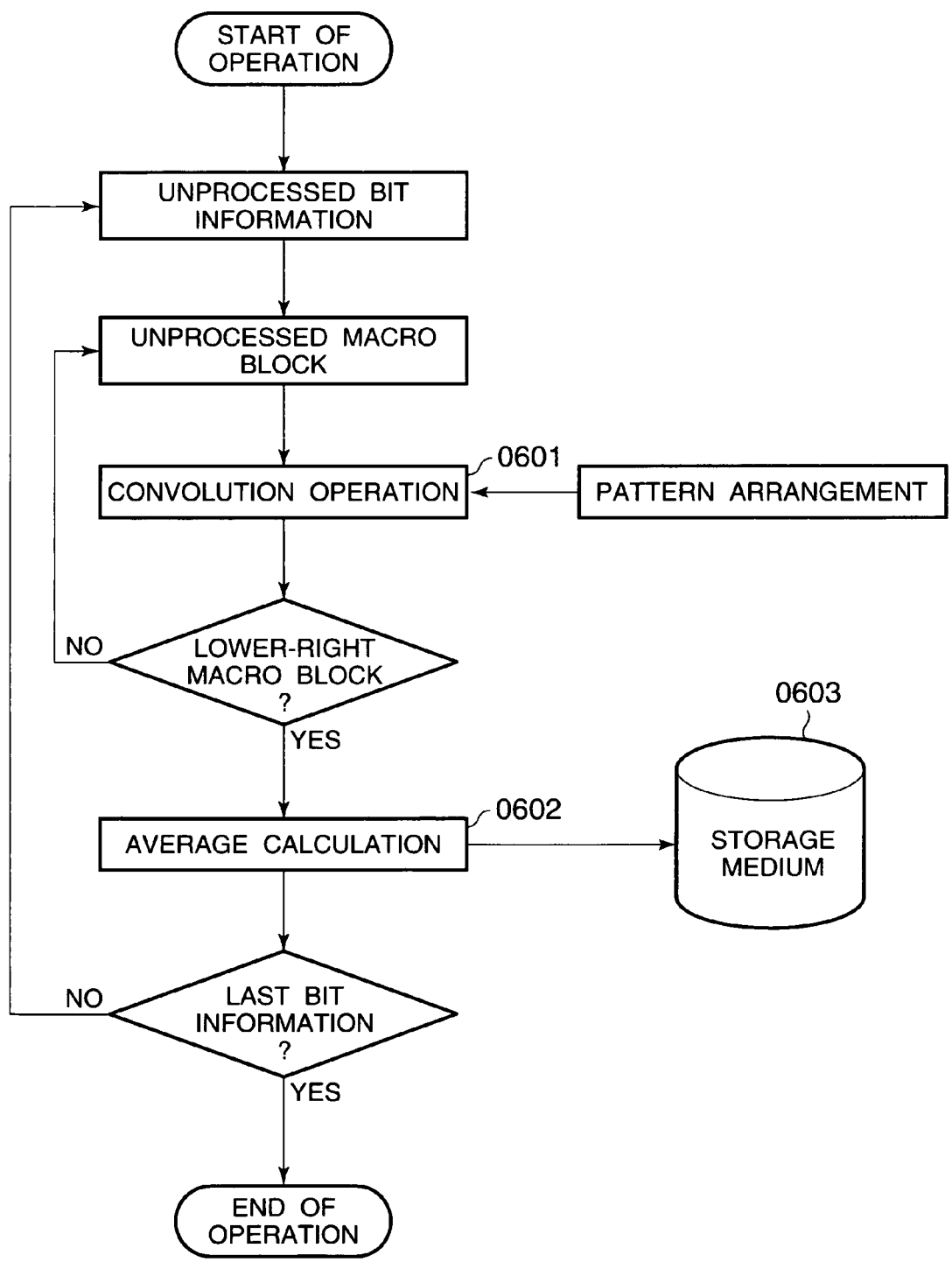
FIG. 6 is a flow chart showing the processing performed by a reliability distance calculation unit.

The method for obtaining a reliability distance d corresponding to the bit information is shown in FIG. 6.

First, the processing performed by a convolution operation unit 0601 will be described while referring to FIGS. 21 and 22.

Figure 21:
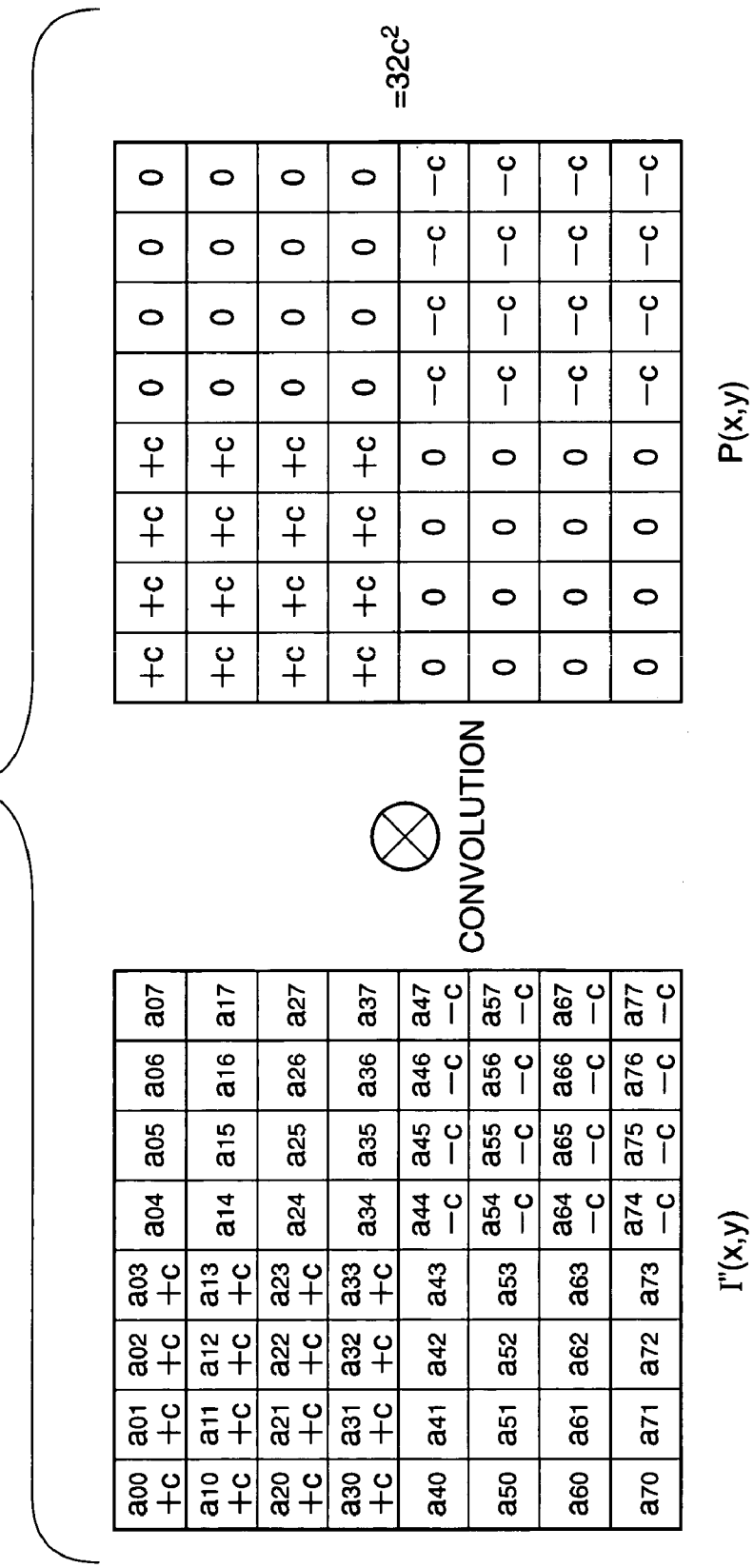
FIG. 21 is a diagram for explaining the state wherein the additional information Inf is extracted.
Figure 22:
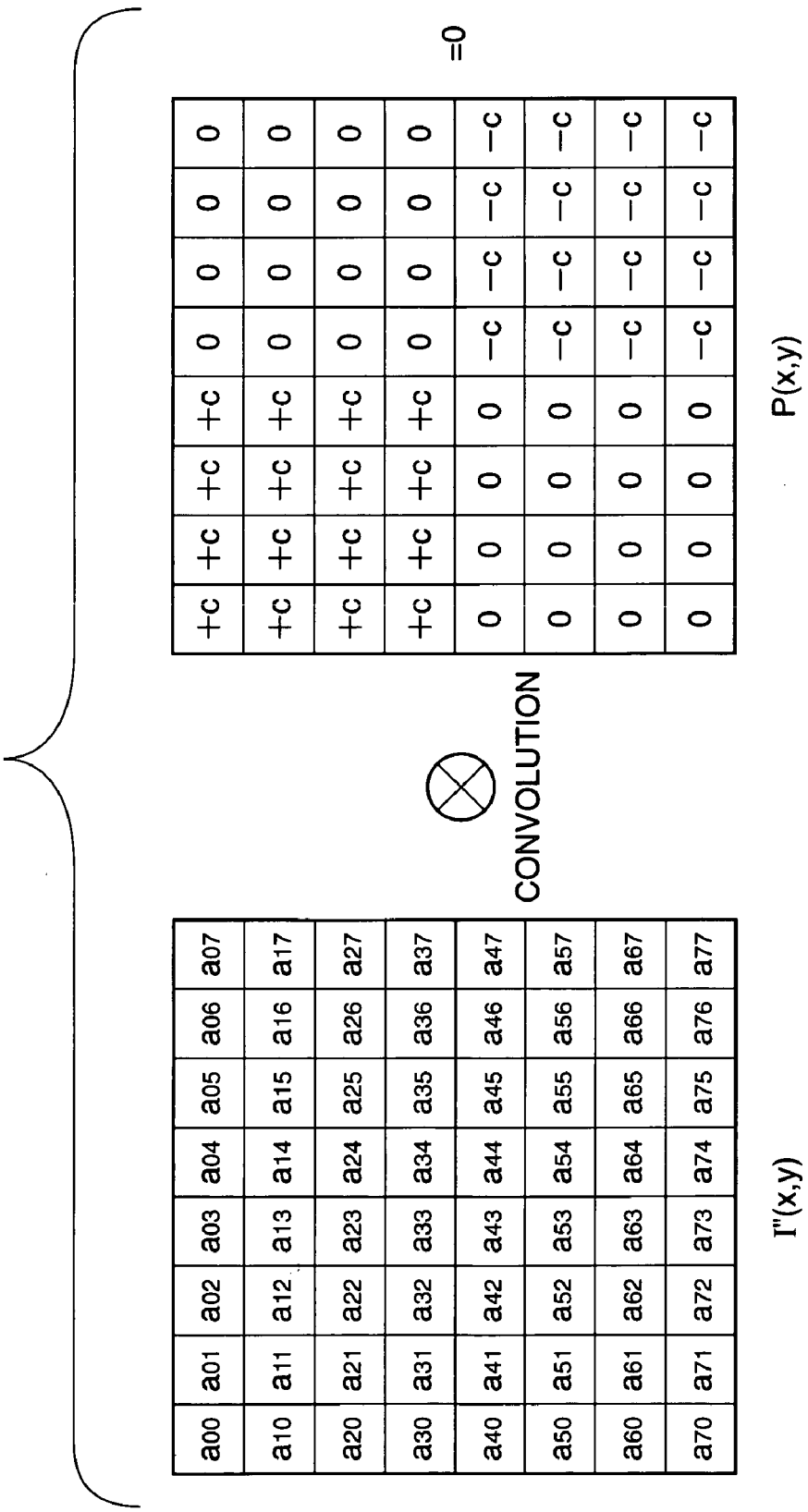
FIG. 22 is a diagram for showing the state wherein the additional information Inf is to be extracted, even though the additional information Inf is not present.

In FIGS. 21 and 22 are shown examples for extracting one bit of information that constitutes the additional information Inf.

In the example in FIG. 21, the one specific bit of information that constitutes the additional information Inf is extracted from the image data (blue component) I"(x,y), and in the example in FIG. 22, the one bit of information is to be extracted for the image data I"(x,y), in which the specific bit is not embedded.

In FIG. 21, I"(x,y) denotes the image data wherein the one-bit of information is embedded, and P(x,y) denotes an 8×8 pattern arrangement (pattern arrangement used for extraction of the additional information Inf) used for the convolution process. The individual elements (0, ±c) constituting the 8×8 pattern arrangement are accumulated in the pixel values arranged in the corresponding positions in the input image data I"(x,y), and the sum of these accumulation values is calculated. That is, P(x,y) is convoluted to I"(x,y). In this case, I"(x,y) is the representation that includes the image when the image data I'(x,y) has been the object of an attack. When the image data I'(x,y) is not attacked, I"(x,y)=I'(x,y). For the image wherein the one-bit information is embedded in I"(x,y), there is a high probability that, as is shown in FIG. 21, a non-zero value will be obtained as a result of the convolution. Especially when I"(x,y)=I'(x,y), the result of the convolution is $32c^2$.

In this embodiment, the pattern arrangement used for the embedment is the same as that for the extraction. However, the present invention is not limited to this. Generally, when the pattern arrangement used for the embedment is P(x,y) and the pattern arrangement used for the extraction is P'(x,y), the relationship can be modified, as P'(x,y)=aP(x,y). In this equation, a is an arbitrary real number, and in this embodiment, to simplify the explanation, a=1 is employed.

In the example in FIG. 22, the same calculation is performed for the image data I"(x,y) in which the one-bit information is not embedded. As a result of the convolution for the original image (corresponding to the image data I), the zero value shown in FIG. 22 is obtained.

A method for the extraction of one-bit information has been explained while referring to FIGS. 21 and 22. However, this explanation is applicable only for an ideal case wherein a convolution result of 0 is obtained for the image data I in which the additional information Inf is to be embedded. Actually, a convolution result of 0 is very rarely obtained for an area that corresponds to an 8×8 pattern arrangement for the actual image data I.

Specifically, when the pattern arrangement in FIG. 9 (the cone mask is also referred to as arrangement information) is employed to perform the convolution for the area of the original image (image data I) that corresponds to the 8×8 pattern arrangement, a non-zero value may be calculated, unlike in the ideal case. On the contrary, when the convolution is performed for the area of the image (image data wI) in which the additional information Inf is embedded, and that corresponds to the 8×8 pattern arrangement, the result may be "0", instead of "$32c^2$". However, generally, information concerning the individual bits that form the additional information Inf is embedded in the original image data multiple times. That is, the additional information Inf itself is embedded multiple times.

Thus, for information concerning each bit of the additional information Inf, the convolution operation unit 0601 obtains the sum of multiple convolution results. For the additional information Inf of eight bits, for example, eight sums are obtained, and the sums corresponding to the bits are transmitted to an average calculation unit 0602. There, the sums are divided by the number "n", the count of the repetitions of the pattern arrangement that corresponds to the number of individual bits, and an average value is obtained. This average value is the reliability distance d. That is, the reliability distance d is generated by applying a majority rule to ascertain whether in FIG. 21 the convolution result is similar to "$32c^2$" or to "0".

In the previous explanation for the patchwork method, the reliability distance d is defined as $d=1/N\Sigma(a_i-b_i)$. Thus, strictly speaking, the reliability distance d is the average value obtained by convolution using P'(x,y)=1/cP(x,y). However, even when the convolution is performed using P'(x,y)=aP(x,y), the obtained average value is merely a multiple of the real number of the reliability distance d, and substantially the same effects are obtained. Therefore, in the present invention, the average value for the convolution when P'(x,y)=aP(x,y) is used can also be employed as the reliability distance d.

The reliability distance d that is obtained is stored on a storage medium 0603.

The convolution operation unit 0601 repetitively generates reliability distances d for the bits of the additional information Inf, and sequentially stores them on the storage medium 0603.

A slightly more detailed description of this operation value will now be given. When, using the pattern arrangement (the cone mask is also referred to as arrangement information), the reliability distance d is calculated for the original image data I, the ideal distance d is 0. However, for the actual image data I, this value, although very close to 0, tends to be a non-zero value. And when the frequency distribution of the reliability distance d for each bit is examined, the distribution shown in FIG. 23 is obtained.

Figure 23:
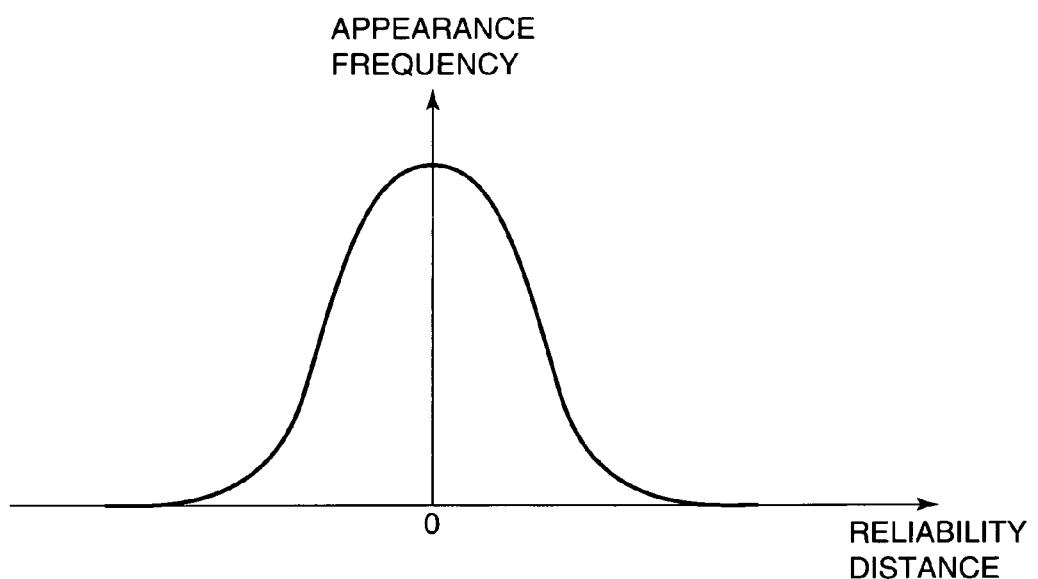
FIG. 23 is a graph showing the ideal appearance frequency distribution when a reliability distance d is extracted from an original image.

In FIG. 23, the horizontal axis represents the value of the reliability distance d that is generated for the bit information, and the vertical axis represents the number of bit information sets (the appearance frequency of the reliability distance d) for which the convolution to obtain the reliability distance d is performed. It is apparent from the graph that the distribution resembles the normal distribution. Further, for the original image data I, while the reliability distance d is not always 0, the average value is 0 (or is very close to 0).

Figure 24:
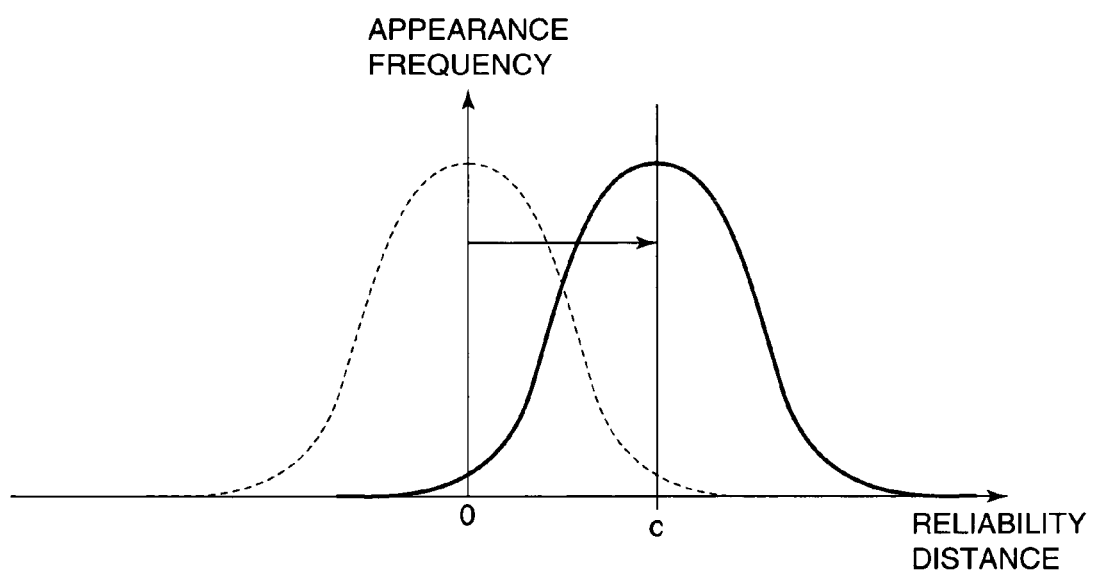
FIG. 24 is a graph showing the state when the reliability distance d is extracted from an image in which an electronic watermark has been embedded.

When as is shown in FIG. 19 the bit information "1" is embedded in the image data, and when, instead of the original image data I, the blue component of this image data is convoluted to I'(x,y), the frequency distribution for the reliability distance d is as shown in FIG. 24. In other words, the distribution is shifted to the right, while the shape shown in FIG. 23 is maintained. As is described above, when one bit of the additional information Inf is embedded in the image data, the reliability distance d for the image data is not always "c", but the average is "c" (or very close to "c").

In the example in FIG. 24, the bit information "1" is embedded; and when bit information "0" is embedded, the frequency distribution in FIG. 23 is shifted to the left.

As is described above, when the additional information Inf (the bit information) is embedded using the patchwork method, the number of bits (the number of usages of the pattern arrangement) should be maximized to the extent possible, so that the correct statistical distributions shown in FIGS. 23 and 24 tend to appear. That is, the accuracy is increased of the examination made to detect whether the bit information for the additional information Inf is embedded, or whether the embedded bit information is "1" or "0".

(3-7-4. Offset Adjustment Process)

The arrangement of the offset adjustment unit 2003 will now be described.

The offset adjustment unit 2003 receives the image data wI2', provided by the appropriate scaling process, and thereafter, the reliability distance operation in FIG. 6 is performed to detect a start bit. It should be noted that the offset adjustment unit 2003 generates only five reliability distances that correspond to the five bits of the start bit string Inf1. As is shown in FIG. 36, the start bit string Inf1 is a part of the additional information that is embedded in advance by the additional information embedment unit 0104, and in this embodiment, consists of five bits.

While the start bit string Inf1 is conceptually the first five bits, in the image in which the additional information Inf has been embedded, the start bits are not adjacently or collectively located, but rather, are spread out. This is because the start bits are embedded in order in correlation with the coefficient values that constitute the cone mask in table 2.

Figure 28:
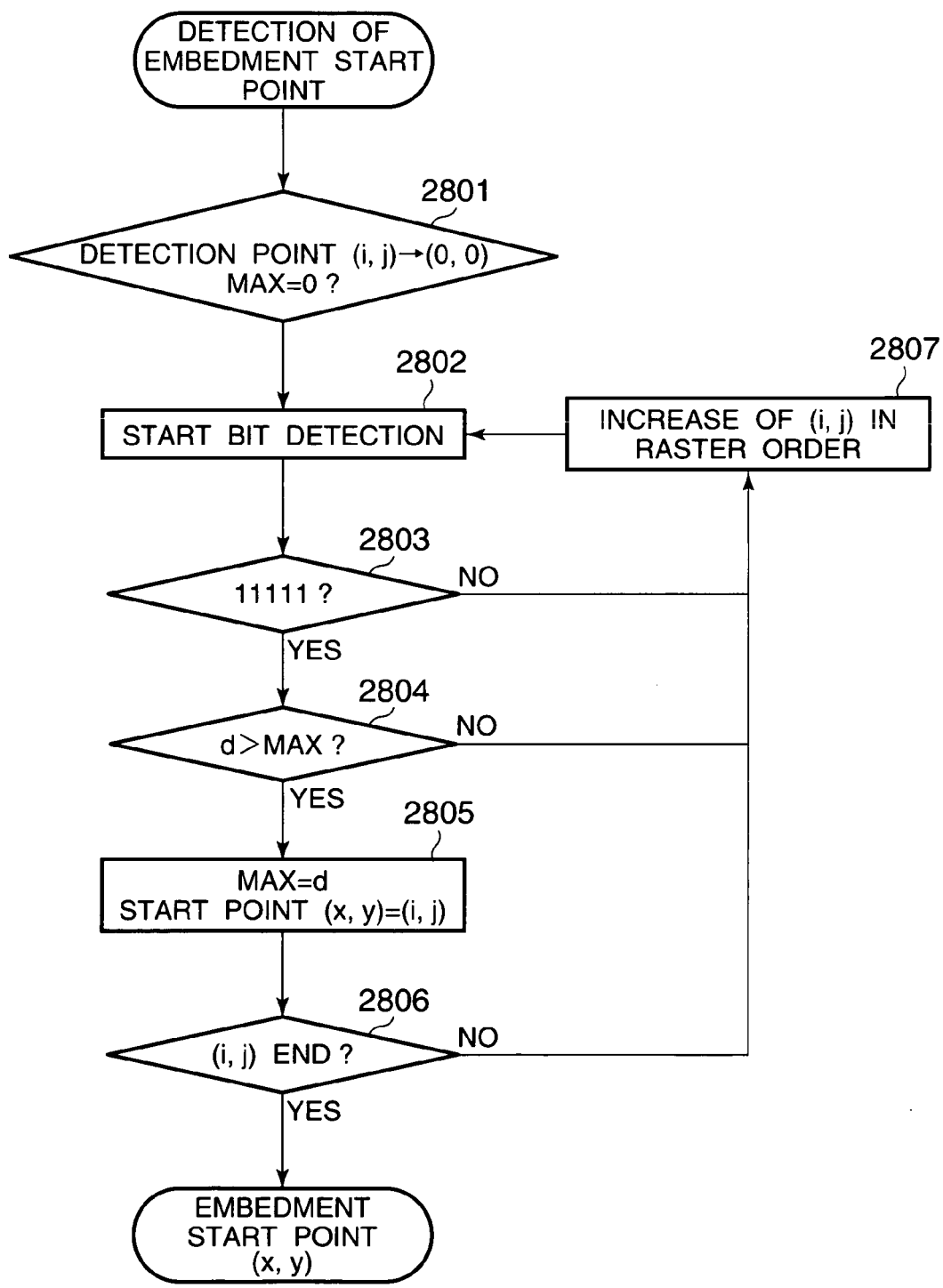
FIG. 28 is a flow chart for explaining the registration processing.

FIG. 28 is a flow chart for the processing performed by the offset adjustment unit 2003. The processing will now be described while referring to the flow chart in FIG. 28.

At step 2801, for the input image data wI2', the offset adjustment unit 2003 assumes the leftmost upper coordinates are the embedment start coordinates, and at the same time, sets the maximum value MAX to 0. At step 2802, the offset adjustment unit 2004 performs the reliability distance operation in FIG. 6 to detect the start bits.

At step 2803, a check is performed to determine whether the obtained information for the first to the fifth bits is the correct start bit string "11111". If this point indicates the correct embedment start coordinates, the five continuous positive reliability distances d are detected. But if this point does not indicate the correct embedment start coordinates, frequently, five continuous positive reliability distances d can not be obtained. This determination is sequentially performed, and the position whereat the correct start bit string Inf1 can be detected must be determined as the embedment start position.

However, the correct start bit string Inf1 may actually be detected at a point other than the embedment start position. The reason for this will be described while referring to FIGS. 27A, 27B and 27C.

Figure 27:
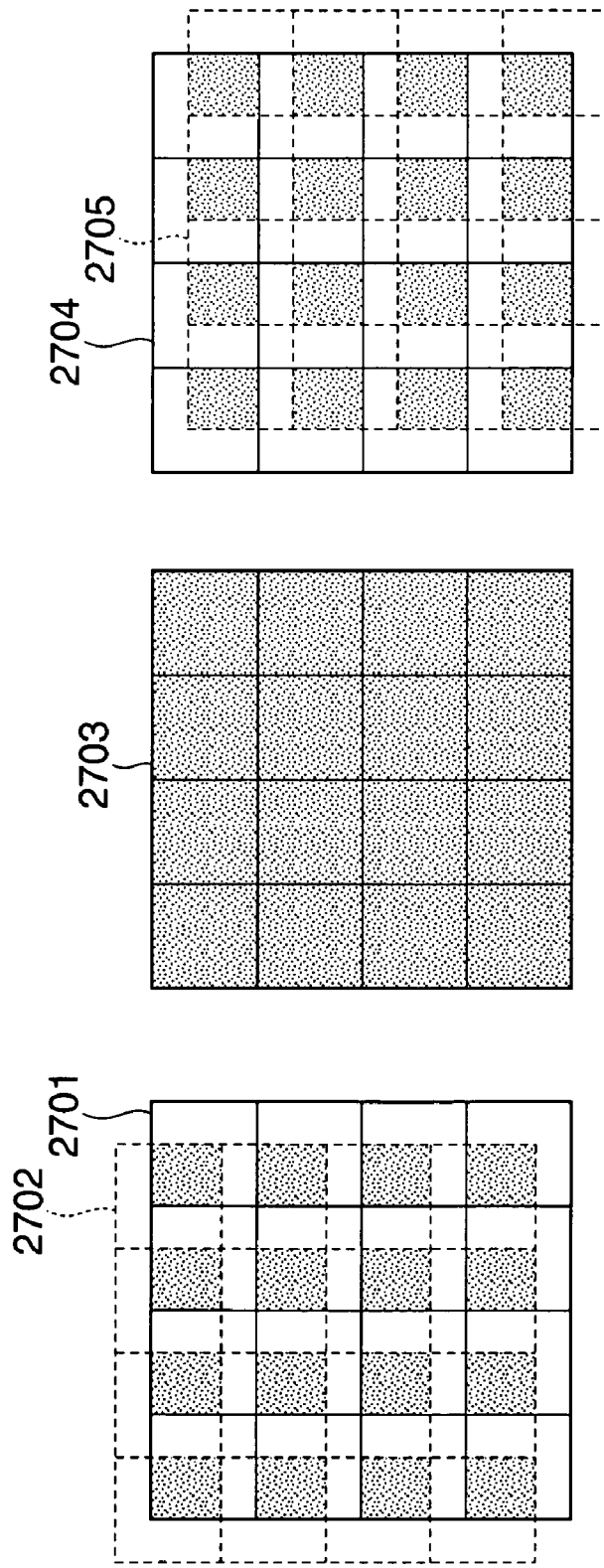
FIGS. 27A, 27B and 27C are diagrams showing the concept of a search for an embedment start position performed by an offset adjustment unit.

In FIGS. 27A to 27C, in order to extract the additional information Inf embedded by the patchwork method for this embodiment, pattern arrangements 2702 and 2705 (the cone mask is also referred to as arrangement information), which are used for the embedment of the additional information Inf, are employed and a convolution is performed, while positions 2701, 2703 and 2704 of the original macro blocks are searched for. It is assumed that in the drawings the search progresses continuously from the left to the right.

For simplification, in FIGS. 27A to 27C, one macro block (the minimum unit for the extraction of the additional information Inf) that is a part of the image data wI2' is shown. One block is used to present the concept of the size of the pattern arrangement used for the embedment of one-bit information.

When the positional relationship in FIG. 27A is established between the blocks 2701 and 2702, i.e., when the macro block 2703 is positioned at the upper left of the macro block 2701, the original image and the pattern arrangement used for the extraction of the additional information Inf overlap each other only in the shaded areas.

In FIG. 27B is shown the state wherein as a result of the search, the search position completely matches the actual position of the macro block. In this state, the pattern arrangement of the convolution target fully overlaps the macro block.

In FIG. 27C, the search position is located lower and to the right of the macro block in which the additional information Inf is actually embedded. In this state, the pattern arrangement, which is the target convolution, overlaps the macro block only in the shaded areas.

In the examples in FIGS. 27A to 27C, when the pattern arrangement that is the convolution target satisfactorily overlaps the macro block, the correct start bit string Inf1 can be extracted. It should be noted that, since the overlapping dimension size differs in these three examples, the reliability distance d also differs.

The overlapping area can be replaced by the reliability distance d. That is, when the position of the pattern arrangement completely matches the position of the macro block, for the information for each bit, the reliability distance d is very close to $\pm 32c^2$, as is described above.

Therefore, in this embodiment, as is shown in FIG. 28, when at step 2803 the correct start bit string Inf1 is not detected, at step 2807 the search point is moved to the next search point in the raster order. When the correct start bit string Inf1 is detected, at step 2804, a check is performed to determine whether the sum of the reliability distances d, which correspond to the five bits that are regarded as the start bit string Inf1, is greater than the maximum value MAX. If the sum of the reliability distances d is equal to or smaller than the maximum value MAX, at step 2807, the search point is moved to the next point in the raster order. When the sum of the reliability distances d is greater than the maximum value MAX, the maximum value MAX is updated, and at the same time, the current search point is stored as the embedment start point. At step 2806, a check is performed to determine whether all the search points have been processed. When the search has not yet been completed, at step 2807 the search point is moved to the next point in the raster order. When the process has been completed for all the search points, the embedment start point that is currently stored is output. The processing is thereafter terminated.

Through the above described process sequence, the offset adjustment unit 2003 of this embodiment detects the start bits Inf1. And among the coordinates whereat the correct start bits Inf1 are obtained, the coordinate information for which the sum of the reliability distances d, which corresponds to the five bits that are regarded as the start bit string Inf1, is determined as the embedment start point for the additional information Inf. Then, the embedment start point is output to the succeeding stage.

(3-7-5. Use Information Extraction Unit)

The use information extraction unit 2004 receives, from the offset adjustment unit 2003 at the preceding stage, the embedment start coordinates and the image data in which the additional information Inf is embedded. The use information extraction unit 2004 then performs the operation in FIG. 6 and calculates the reliability distance d1 only for the bit information that constitutes the use information Inf2, and outputs the reliability distance d1 to the statistic authorization unit 2006 at the succeeding stage.

The acquisition of the reliability distance d1 that corresponds to the bit information of the use information Inf2 actually corresponds to the extraction of each bit from the embedded use information Inf2. This process will be described later.

In this process, the reliability distance d is merely calculated based on the embedment start coordinates obtained by the search, and is not extracted for the five start bits Inf1.

(3-8. Statistic Authorization Process)

The statistic authorization unit 2006 determines the reliability of the reliability distance d1 obtained by the use information extraction unit 2004 in FIG. 20. For this determination, the reliability distance d2 is generated using the second pattern arrangement, which differs from the first pattern arrangement used for the extraction of the additional information Inf (the use information Inf2), and the reliability index D is generated by referring to the appearance distribution of the reliability distance d2.

In order to extract the use information Inf2, the reliability distance d1 is obtained by the use information extraction unit 2004 by employing the first arrangement pattern (the cone mask is also referred to as the arrangement information), and the reliability distance d2 is obtained by employing the second pattern arrangement, which differs from the first pattern arrangement and which will be described later. Generally, the pattern arrangement shown in FIG. 9 that is used for the embedment of the additional information Inf (the start bits Inf1 and the use information Inf2) is employed as the first pattern arrangement.

The second pattern arrangement and the reliability index D will be described in detail later.

(3-8-1. Extraction Process using the Second Pattern Arrangement)

<<Central Limit Theorem>>

Subsets A and B consist of N elements, respectively A={a1, a2, . . . , aN} and B=(b1, b2, . . . , bN), and ai and bi are pixel values for the elements in the subsets A and B in FIG. 30.

In the reliability distance d(Σ(ai−bi)/N), the value of N is sufficiently great, and when there is no correlation with the pixel values ai and bi, the expectation value of the reliability distance d is 0. Further, according to the central limit theorem, the distribution of the reliability distance d is the independent normal distribution.

The central limit theorem will be briefly explained.

When an arbitrary sample of size nc is extracted from the population (the distribution may not be normal) having the average value mc and the standard deviation σc, the distribution of the sample average value sc approaches that of the normal distribution N(mc, (σc/√nc)^2) as the size nc is increased.

Generally, the standard deviation σc of the population tends to be unknown; however, when a sufficiently large number nc of samples is employed, and when the number Nc of the population is satisfactorily greater than the number nc of samples, substantially, it may be practical to employ the standard deviation sc of the samples instead of σc.

Referring again to the embodiment, the extraction process will be explained. First, the frequency appearance distribution of the reliability distance d1 obtained by the use information extraction unit 2004 differs greatly, depending on whether the use information Inf2 has been correctly extracted.

Figure 25:
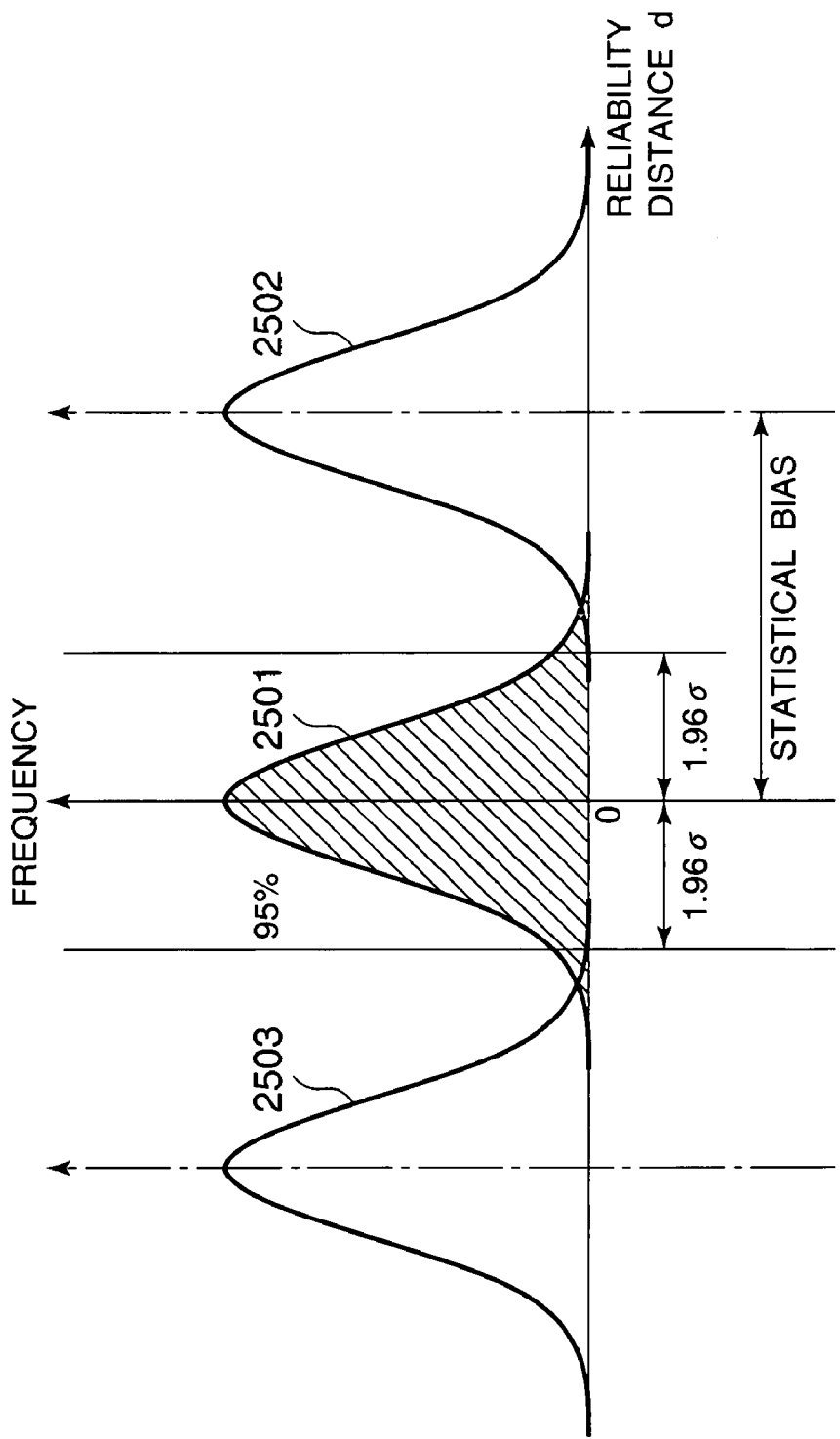
FIG. 25 is a graph for explaining an example distribution of the appearance frequencies for reliability distances d1 and d2 for the first embodiment.

For example, when an error occurs in the detection of the start bits Inf1 (the offset adjustment fails), actually the bit information is not embedded at the location whereat the use information Inf2 should be embedded. Thus, the appearance frequency distribution of the reliability distance d1 is a normal distribution 2501, as shown in FIG. 25.

When the correct use information Inf2 is extracted, the reliability distances d1 that correspond to the bit information "1" of the use information Inf2 are accumulated at the locations in the normal distribution 2502, and the reliability distances d1 that correspond to the bit information "0" of the use information Inf2 are accumulated at the positions in the normal distribution 2503. Thus, in this case, two "crests" are formed. The ratio of the sizes of the two "crests" is substantially equal to the ratio of the bit information "1" and "0" of the use information Inf2.

It should be noted that this is based on the assumption that, when the convolution process is performed by using the first pattern arrangement for the original image in which the additional information Inf has not been embedded, the obtained reliability distance d1 reflects the normal distribution 2501.

Therefore, actually, so long as the state of the original image is unknown, whether the use information Inf2 has been correctly extracted can not be determined.

Therefore, in this embodiment, the normal distribution of the reliability distance d2 is generated by using the second pattern arrangement, with which the state of the original image can be sufficiently identified, even when the additional information is embedded therein. By regarding the obtained normal distribution as the normal distribution 2501, whether the use information Inf2 has been correctly extracted can be determined.

Assume, for example, that the appearance frequency distribution of the reliability distance d1 is present outside the shaded portion (elements up to 95% from the center) that form the normal distribution 2501 prepared for the reliability distance d2. Then, it can be ascertained that statistic biasing occurs in the target image and that the use information Inf2 has been embedded, so that the reliability of the use information Inf2 can be statistically determined. This method will be described in detail later.

An explanation will now be given for the method whereby the image data in which the additional information Inf (use information Inf2) has been embedded is employed to generate a distribution (like the normal distribution 2501 in FIG. 25) that is similar to the appearance frequency distribution of the reliability distance d1 before the embedding of the additional information Inf.

In this embodiment, the extraction unit 2005 employs the second pattern arrangement to obtain the reliability distance d2 that has a distribution similar to the normal distribution 2501.

The extraction unit 2005 calculates the reliability distance d1 by using the second pattern arrangement that is "orthogonal" to the first pattern arrangement employed by the use information extraction unit 2004. The operation of the extraction unit 2005, including the convolution process, is substantially the same as that of the use information extraction unit 2004.

For comparison, the pattern arrangement in FIG. 9, employed by the use information extraction unit 2004, and the cone mask used to refer to the position whereat the pattern arrangement is located are respectively called the "first pattern arrangement" and the "first position reference mask". Further, the pattern arrangement that is "orthogonal" to the first pattern arrangement, and the mask used to refer to the position whereat the pattern arrangement is located are respectively called the "second pattern arrangement" and the "second position reference mask".

First, the extraction unit 2005 receives the embedment start coordinates from the offset adjustment unit 2003, and also performs the reliability distance operation in FIG. 6 to obtain the reliability distance d2.

At this time, the pattern arrangement used for the reliability distance operation in FIG. 6 is not the pattern arrangement 0901 in FIG. 9 that was used for the embedment, but is instead the pattern arrangement 3301 or 3302 that is "orthogonal" to the pattern arrangement 0901.

Figure 33:
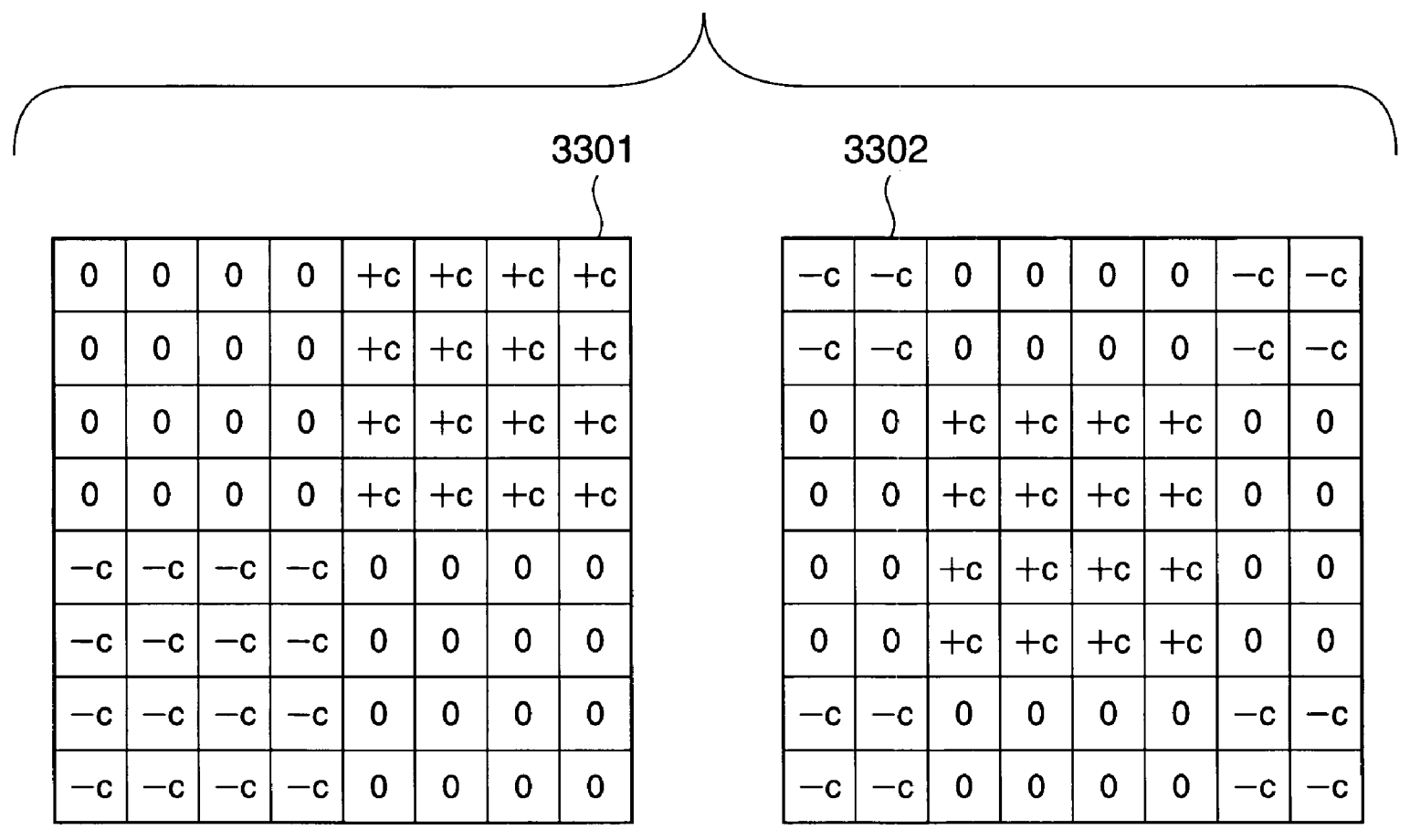

For this reason, the reliability distance d2 obtained by using the pattern arrangement 3301 or 3302 in FIG. 33 is not affected at all by the operation using the pattern arrangement 0901 in FIG. 9 that was employed for the embedment of the additional information Inf.

Figure 34:
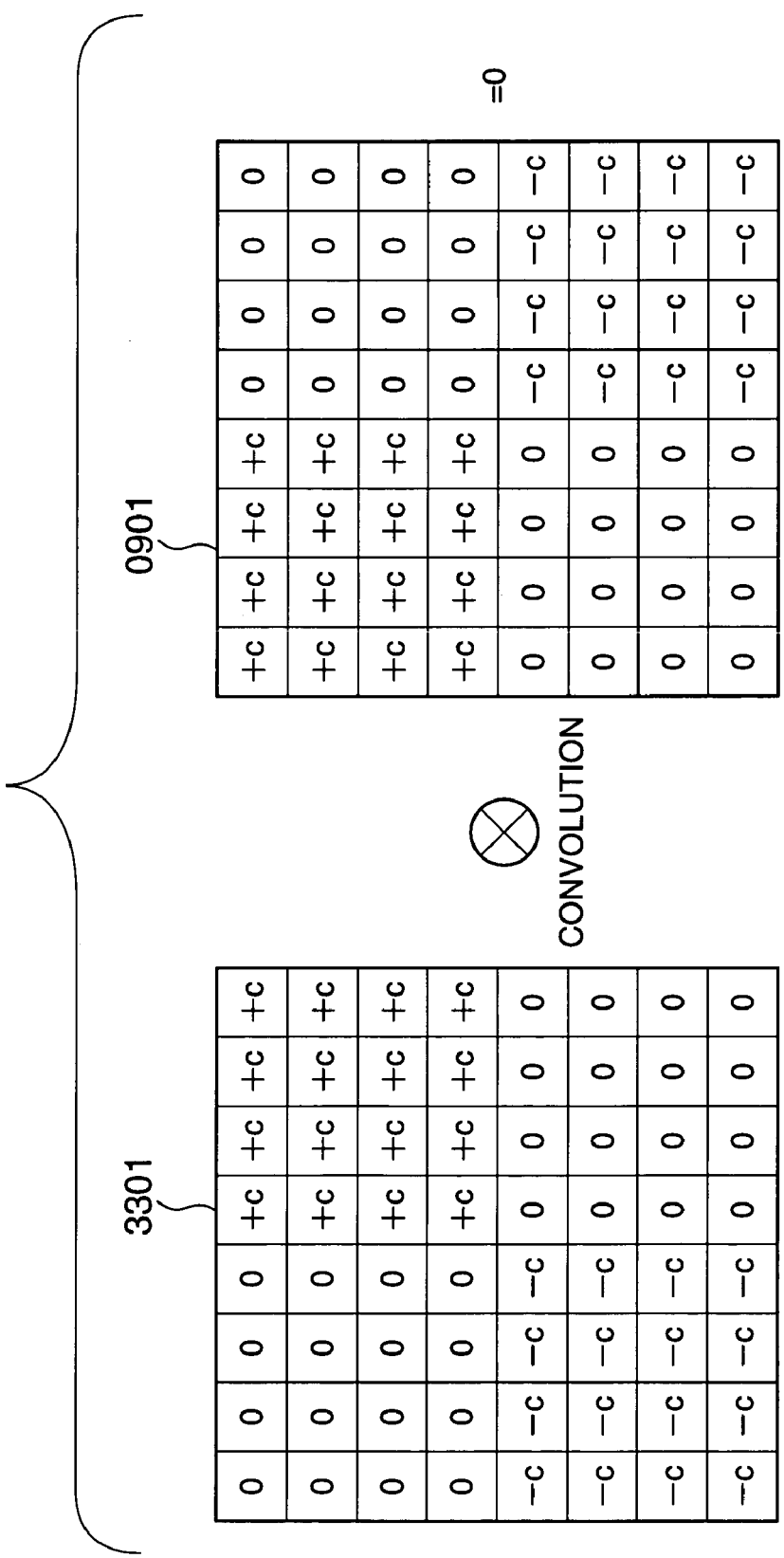
FIG. 34 is a diagram for explaining "perpendicular" pattern arrangements.

When the convolution process is performed for the pattern arrangement 0901 in FIG. 9 and the orthogonal pattern arrangement 3301, the result is 0, as is shown in FIG. 34. The same result is obtained when the pattern arrangement 3302 is used. That is, the result of the convolution of the first and the second pattern arrangements is 0. Therefore, even when the density of the original image is changed by using the first pattern arrangement, this change does not at all affect the reliability distance d that is obtained through the convolution for which the second pattern arrangement was used.

Therefore, when the convolution process is performed using the second pattern arrangement for the image in which the additional information Inf has been embedded, the appearance frequency distribution of the obtained reliability distance d2 is substantially the same as the normal distribution 2501 in FIG. 25. Therefore, the above described appearance frequency distribution is regarded as the normal distribution 2501.

Figure 32:
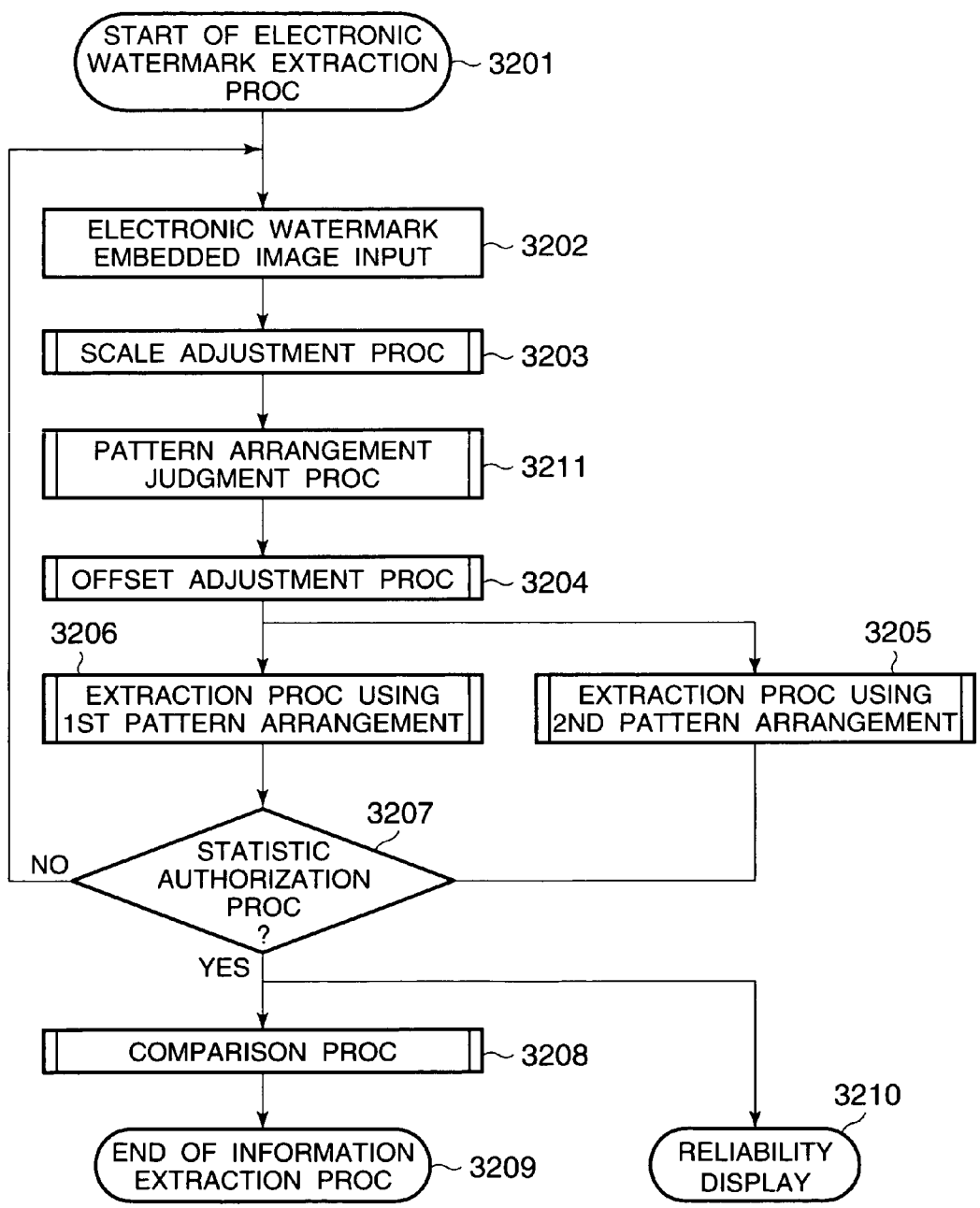
FIG. 32 is a flow chart for explaining the general electronic watermark extraction process.

The normal distribution 2501 is used as the reference required for the statistic authorization process at step 3207 in FIG. 32.

Figure 35:
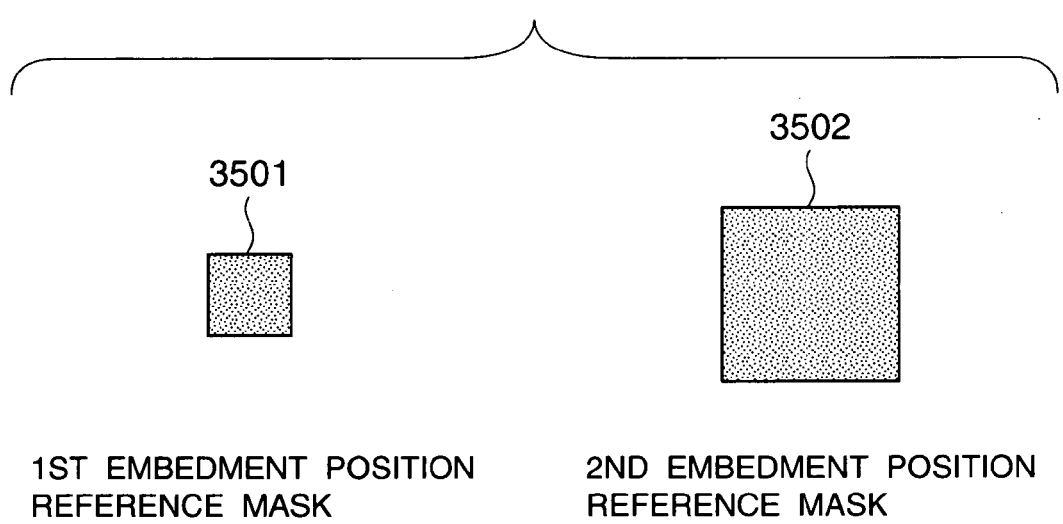
FIG. 35 is a diagram showing first and second position reference masks.

As is described above, the extraction unit 2005 generates the normal distribution of the reliability distance d2 by using a "pattern arrangement orthogonal to the first pattern", such as the pattern 3301 or 3302 in FIG. 33, and the second position reference mask 3502 in FIG. 35.

The conditions for the "pattern arrangement orthogonal to the first pattern" are as follows.

(1) The pattern arrangement, as is shown in FIG. 33, is the same size as the pattern arrangement 0901 in FIG. 9.

(2) The result obtained by the convolution process that is performed using the pattern arrangement 0901 in FIG. 1, and that is used for the embedment of the additional information is 0, the same as is obtained using the pattern arrangement 3301 or 3302.

In addition, the convolution process in FIG. 34 is the same convolution process as is shown in FIGS. 21 and 22.

In this embodiment, the state of the convolution result 0 is called "the pattern arrangements are mutually 'orthogonal'", as in the state wherein the inner products of the vectors is 0 when the vectors are perpendicular to each other. Therefore, the pattern arrangements 3301 and 3302 in FIG. 33 are "pattern arrangements that are 'orthogonal' to the pattern arrangement 0901 in FIG. 9".

The pattern arrangement "orthogonal" to the pattern arrangement used for the embedment of the additional information Inf is employed for the calculation of the reliability distance d1, because statistic biasing does not occur in the distribution of the reliability distance d2, i.e., because the appearance frequency distribution with the center value of 0 is generated.

Furthermore, the "pattern arrangement orthogonal to the first pattern" includes another condition whereby (3) The number of non-zero elements is equal to the number of non-zero elements in the pattern arrangement employed by the use information extraction unit 2004, and the number of positive elements is equal to the number of negative elements. This is because the reliability distances d1 and d2 can be extracted under the same operation condition.

In this embodiment, the "second position reference mask" is the reference mask 3502 in FIG. 35 that has a pattern differing from that of the pattern 3501 used for the embedment of the additional information Inf, and that has a size that also differs from that of the pattern 3501.

When the first and the second pattern arrangements differ from each other, the appearance frequency distribution of the reliability distance d2 is substantially the normal distribution 2501.

However, when the positions of the start bits are not completely detected, statistic biasing may be detected even though the convolution process has been performed using the second pattern arrangement. In this embodiment, while taking this probability into account, different sizes are employed for first position reference mask and the second position reference mask that are prepared, so that the cyclic elements are canceled. Or, a different method is employed for positioning the pattern arrangements of the masks, and the convolution process is not performed in the same areas.

Further, in this case, the coefficients of the "second position reference mask" need only be distributed at random, and a mask other than the cone mask may be employed.

If the "second embedment position reference mask" is so set that it differs from the "first embedment position reference mask", the "second embedment position reference mask" is generated by the embedment position determination unit 2008 in FIG. 20.

Generally, while taking extraction robustness into account, the first position reference mask (cone mask) is not very large relative to the size of the image data in which the additional information Inf is to be embedded. Therefore, a comparatively large "second position reference mask" may be employed. In this embodiment, the second mask used for the calculation of the reliability distance d1 is larger than the first mask used for the embedment of the additional information Inf.

However, the invention is not limited to this, and can provide the same effects when masks of the same sizes are employed. Therefore, the "second position reference mask" may be generated by the embedment position determination unit 2002 in FIG. 20.

The condition that at the least is required for the masks is that the repetition of the bits of the additional information Inf used for the two masks be the same in image areas of the same size.

When satisfactory results can not be obtained in the extraction process while using the second pattern arrangement, the reliability distance d1 is re-calculated using another second pattern arrangement or second position reference mask that includes the above condition. Then, the normal distribution 2501 in FIG. 25, the ideal appearance frequency distribution, may be generated.

The operation of the extraction unit 2005 using the second pattern arrangement will now be specifically explained.

In this embodiment, assume that the first position reference mask is a 32×32 cone mask and that the second position reference mask is a 64×64 cone mask, and that the arrangement of the coefficient for the two masks differs completely.

First, the extraction unit 2005 determines the extraction position in accordance with correlation table 3.

CORRELATION TABLE 3

| Order of bit information | | | | | |
|---|---|---|---|---|---|
| 1 | 2 | 3 | 4 | . . . | 69 |
| Coefficient values in second position reference mask | | | | | |
| 0, 1 | 2, 3 | 4, 5 | 6, 7 | . . . | 136, 137 |

In the second position reference mask, every 16 coefficients have the same value. In the first 32×32 position reference mask, the number of like coefficient repetitions is four, when the mask is referred to by using correlation table 2, which was previously described. That is, in both the first and the second position reference masks, for image data having the same size, the count of the coefficients having like numbers is the same.

In this embodiment, the second pattern arrangement is allocated for positions according to the rule given in correlation table 3, and the convolution process is sequentially performed to obtain the 69 reliability distances d2 that correspond to the individual bits.

(3-8-2. Reliability Index D)

The reliability distance d2, which is generated by the extraction unit 2005 using the second pattern arrangement, appears substantially in the same distribution as the normal distribution 2501. It is well known that, in the normal distribution, 95% of samples (reliability distance d2) appear within the range established by the following expression (25-1).

$$m - 1.96\sigma < d2 < m + 1.96\sigma \quad (25\text{-}1)$$

In the expression, a denotes the standard deviation for the reliability distance d2, and m denotes the average.

The above range is called a "95% reliability interval".

When the reliability distance d2 is obtained by the extraction unit 2005 using the second pattern arrangement, this is used to calculate $m-1.96\sigma$ and $m+1.96\sigma$.

The appearance frequency distribution of the reliability distance d1, which is transmitted by the use information extraction unit 2004 to the statistical authorization unit 2006, is the normal distribution 2501 shown in FIG. 25 when the bit information is "1". When the bit information is "0", the appearance frequency distribution of the reliability distance d1 is the normal distribution 2503. Thus, the probability is very high that a reliability distance d1 corresponding to the use information Inf2 will fall outside the 95% reliability interval (the shaded portion in FIG. 25) that is obtained by the extraction unit 2005 using the second pattern arrangement.

If the use information Inf2 is not present in the object image when the offset adjustment unit 2003 initiates the process, the appearance frequency distribution of the reliability distance d1 is the normal distribution 2501.

The probability that all the 64 reliability distances d1 corresponding to the use information Inf2 do not fall in the reliability interval of expression 25-1, even though the use information Inf2 is embedded in the image, is very small, i.e., $(1-0.95)^{64}$.

Therefore, when the normal distribution 2501 is obtained based on the reliability distance d2, a check need only be performed to determine whether the appearance frequency distribution obtained based on the reliability distance d1 is included in the range that occupies most of the normal distribution, so that whether the additional information Inf (use information Inf2) is embedded can, substantially, be correctly determined.

The statistical authorization unit 2006 employs the above characteristic to determine the reliability of the assumption that the additional information Inf (use information Inf2) is embedded.

In this embodiment, the reliability of the assumption that the use information Inf2 is embedded is employed as the reliability index D.

The reliability index D is defined as the ratio of the number of reliability distances d1 present outside the range of the expression (25-1) to the number of all the reliability distances d1 generated by the use information extraction unit 2004.

When the reliability index D is greater than a threshold value Th, the statistical authorization unit 2006 determines that the total appearance frequency distribution of the reliability distance d1 is artificially biased to a position such as the normal distribution 2502 or 2503 in FIG. 25, i.e., the use information Inf2 is actually embedded in the image.

Therefore, it is assumed that the reliability distance d1 used for this determination is reliable information, and that the transmission of the reliability distance d1 to a comparison unit 2007 at the succeeding stage is permitted.

At the reliability display step 3210 in FIG. 32, the reliability index D of the use information Inf2, or a message based on the index D may be displayed.

When the reliability index D is not greater than the threshold value, the message "the use information Inf2 is not correctly extracted" is displayed, and program control returns from the statistical authorization step 3207 in FIG. 32 to step 3202 for inputting the image again.

(3-9. Comparison Process)

The comparison unit 2007 in FIG. 20 receives the value of the reliability distance d1 via the use information extraction unit 2004 and the statistical authorization unit 2006. Since the reliability distance d1 is very reliable information, a check must be performed simply to determine whether the bit information corresponding to the reliability distance dl is "1" or "0".

Specifically, when the reliability distance d1 of the specific bit information of the use information Inf2 is positive, the bit information is determined to be "1". And when the reliability distance d1 is negative, the bit information is determined to be "0".

The use information Inf obtained by the determination is output as final data that is used as reference information for a user, or as a control signal.

(3-10. Consideration for High-speed Processing)

As is described above, the extraction of the additional information can be implemented. So that, in this embodiment, the entire extraction process of the additional information Inf need not always be performed. In the above embodiment, it is assumed that the electronic watermark information is embedded in the image data pwI' input to the electronic watermark extraction apparatus in FIG. 2. Whereas in this embodiment, there is a case wherein the electronic watermark information is not embedded in the image data pwI' input to the electronic watermark extraction apparatus. Further, there is an application that requests the termination of the electronic watermark extraction process as quickly as possible. As a result, it is preferable that, when it is ascertained that the electronic watermark information is embedded in the input image data pwI', the electronic watermark extraction apparatus terminate the electronic watermark extraction process in order to increase the processing speed. This will be described while referring to the flow chart in FIG. 55.

Figure 55:
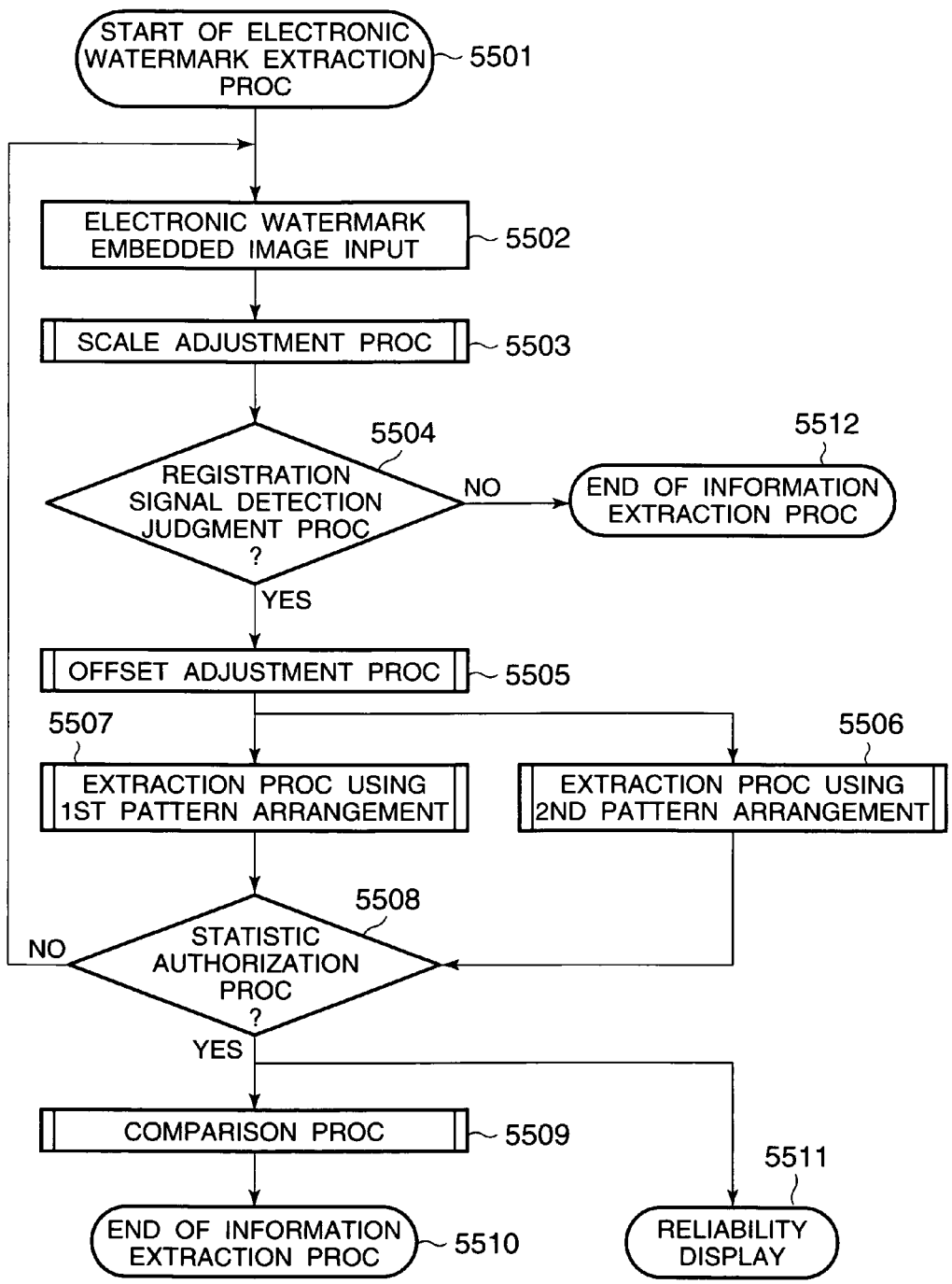
FIG. 55 is a flow chart showing a modification of the electronic watermark extraction process of the first embodiment.

FIG. 55 is a modification of the flow chart for the electronic watermark extraction process in FIG. 32. In the flow chart in FIG. 55, a registration signal detection judgement process 5504 is added to the flow chart in FIG. 32.

In the registration signal detection judgement process 5504, a check is performed to determine whether the registration signal r has been detected in the scaling adjustment process 5503, the pre-process. When the registration signal has not been detected, at that time the information extraction process is terminated. Since the registration signal r should be detected in an image wherein the electronic watermark information has been embedded, if the registration signal r can not be detected, this means that the electronic watermark information has not been embedded. Therefore, the electronic watermark extraction process need not be thereafter continued, and can at that time be terminated.

This completes the explanation of the processing sequence from the embedment of the additional information to the extraction process.

(Modification)

In this embodiment, the additional information Inf (use information Inf2), for which the error correction and encoding has been performed, can also be employed. Thus, the reliability of the extracted use information Inf2 can be increased.

Furthermore, the present invention is not limited to the arrangement where, of the two pattern arrangements in FIG. 49, the optimal one is selected in accordance with the resolution of the input image data or the output (print) resolution of the printer. That is, the present invention can also include the configuration where two or more pattern arrangements of different sizes, each consisting of m×n elements (m and n are integers), are provided, and the optimal pattern arrangement is selected in accordance with the resolution of input image data or the output (print) resolution of the printer.

[Second Embodiment]

A second embodiment of the invention will now be described while referring to the drawings.

Figure 53:
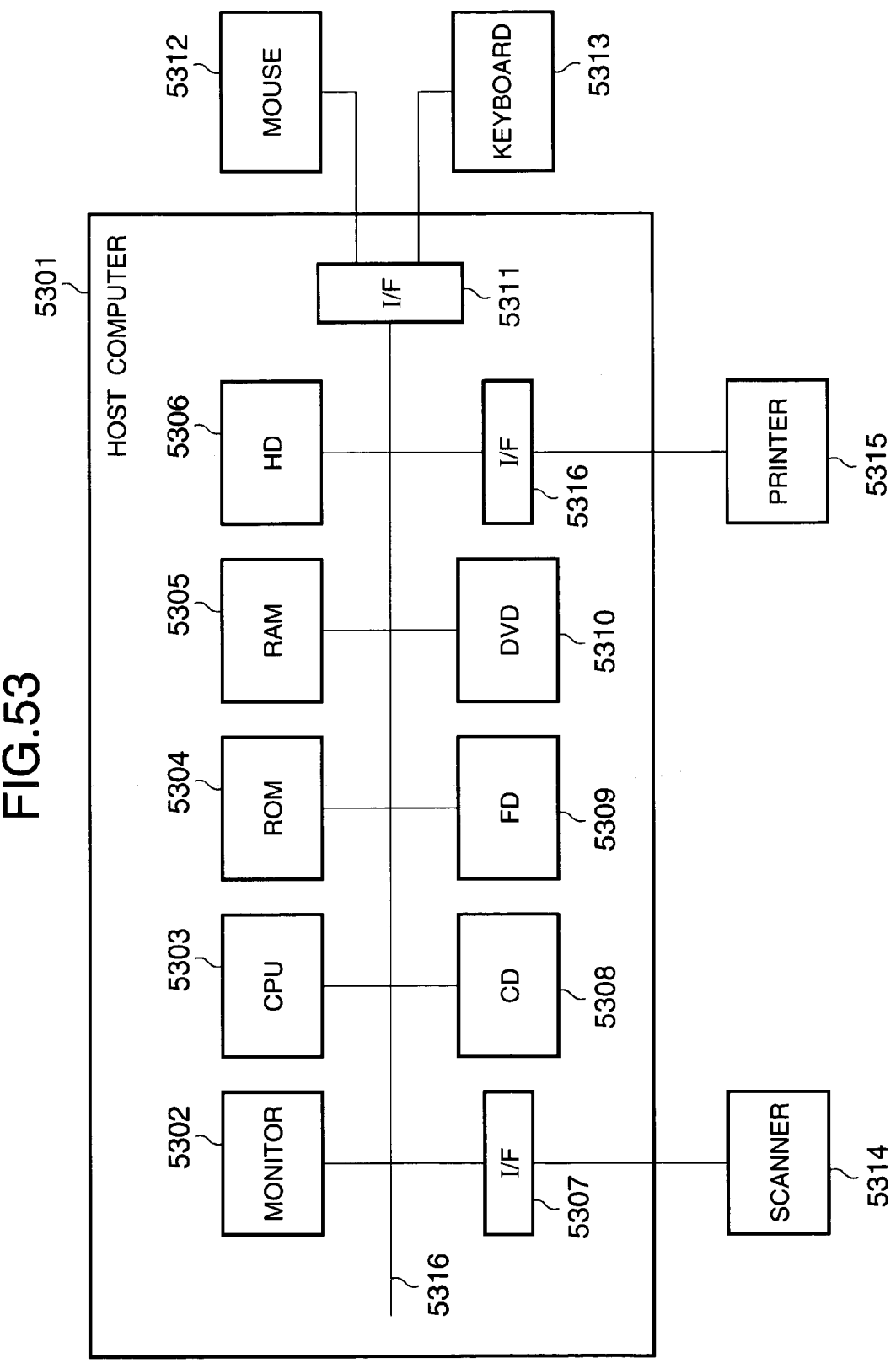
FIG. 53 is a diagram showing an image processing system applicable to the second embodiment.

FIG. 53 is a diagram showing an image processing system that can be applied for the individual embodiments of the invention.

In FIG. 53, a host computer 5301, which is an ordinary personal computer, can receive an image read by a scanner 5314, and can edit or store the image. Further, the host computer 5301 can permit a printer 5315 to print the obtained image. For these purposed, various instructions are entered by a user using a mouse 5312 or a keyboard 5313.

Inside the host computer 5301, the individual blocks, which will be described later, are interconnected by a bus 5316 for the exchange of various data.

A CPU 5303 controls the operations of the individual blocks, or executes an internally stored program.

A ROM 5304 is used for the storage of a specific image for which printing is not permitted, and for the advance storage of a required image processing program.

A RAM 5305 is used to temporarily store the program or object image data to be processed by the CPU 5303.

A hard disk (HD) 5306 is used for the advance storage of a program or for the storage of image data to be transmitted to the RAM 5305, or for the storage of image data acquired through the processing.

A scanner interface (I/F) 5307 is connected to the scanner 5314 that uses a CCD to read a document or a film and that generates image data, so that the image data acquired by the scanner 5314 can be received.

A CD drive 5308 can read data from, or write data to a CD (CD-R), one of the external storage media.

An FD drive 5309, as well as the CD drive 5308, can read data from, or write data to a storage medium, an FD. A DVD drive 5310, also as well as the CD drive 5308, can read data from, or write data to a storage medium, a DVD. When an image editing program or a printer driver is stored on the CD, the FD or the DVD, as needed, the program can be installed on the HD 5306 and transmitted to the RAM 5305.

An interface (I/F) 5311 is connected to the mouse 5312 and the keyboard 5313 to accept input instructions therefrom.

The processing performed by the above system for embedding an electronic watermark in image data will now be described while referring to FIG. 50.

(General Configuration of the Embedding System)

Figure 50:
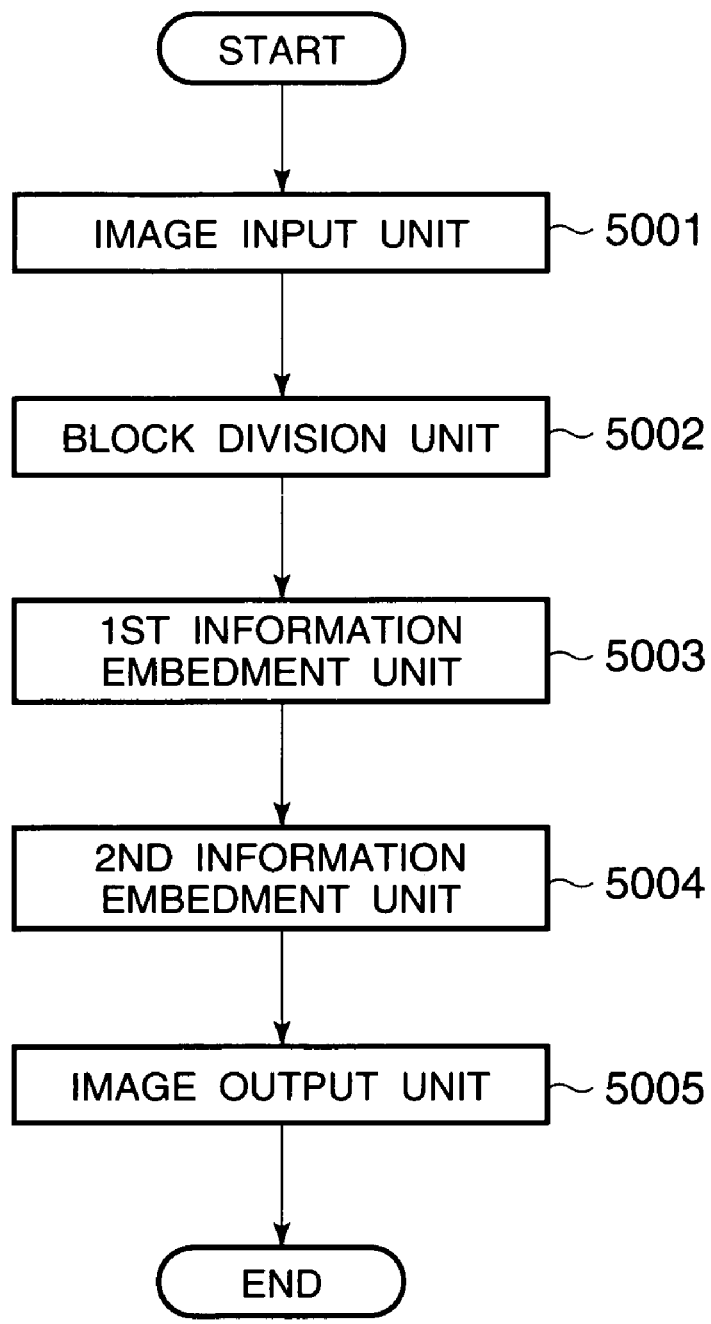
FIG. 50 is a flow chart showing an electronic watermark embedment process for a second embodiment of the invention.

FIG. 50 is a flow chart for the electronic watermark processing according to this embodiment. A computer-executable program, wherein the processing for the flow chart in FIG. 50 is written, is stored in advance in the ROM 5304, or on a HD 5306, a CD 5308, a FD 5309 or a DVD 5310, and after being loaded into the RAM 5305, is executed by the CPU 5303 to carry out this embodiment.

As is shown in FIG. 50, the electronic watermark processing is performed by an image input unit 5001, a block division unit 5002, a first information embedment unit 5003, a second information embedment unit 5004 and an image output unit 5005.

First, the image input unit 5001 will be described. The image data is input by the image input unit 5001. The input image data is multi-valued image data wherein for one pixel a predetermined multiple of bits are allocated. The image processing system for this embodiment can cope with either gray scale image data or color image data that is input. The gray scale image data has one type of element for one pixel, whereas the color image data has three types of elements for one pixel. In this embodiment, the three elements are the red component (R), the green component (G) and the blue component (B). However, the present invention can be applied for combinations that include other color components.

An explanation will be given for a case wherein color image data is input. Paper currency is used in the explanation for this embodiment; however, the present invention is not limited to this, and can use the color image data for securities or for specific items of copyrighted printed materials.

When the color image data is input, one or more color image data elements are selected. In this embodiment, the blue component is selected because, of the red, green and blue components, a human's eyes exhibit the least sensitivity to the blue component. Thus, when the electronic watermark information is embedded in the blue component, image deterioration due to the electronic watermark information is visually less noticeable than it is when the electronic watermark information is embedded in one of the other color components.

The block division unit 5002 will now be described. The block division unit 5002 divides the image data received from the image input unit 5001 at the preceding stage into multiple areas that do not overlap each other. These areas are rectangular areas of, for example, 128×128 pixels. In order to quickly perform the electronic watermark extraction process, it is preferable that the area size be as small as possible, because the smaller the area is, the faster the electronic watermark extraction process can be performed.

The first information embedment unit 5003 will now be described. The first information embedment unit 5003 embeds the first information in the blocks. In this embodiment, the first information is one-bit information that represents a paper currency.

The registration signal r as explained in the first embodiment can be employed as the first information. In the first embodiment, the registration signal r is used to correct geometrical distortion, while in this embodiment, in addition to the object of correcting the geometrical distortion, the registration signal r is used as one-bit information indicating paper currency. That is, the one-bit information (information indicating the input image is a paper currency in this embodiment) is embedded in accordance with the presence or absence of the registration signal r.

Instead of the registration signal r, another electronic watermark may be employed as the first information. Further, the first information may not only be one-bit information indicating that the input image is a paper currency, but also may be two-bit information with which the input image can be identified as a paper currency, securities, a copyrighted image, or others.

The second information embedment unit 5004 will now be described. The second information is embedded in the block by the second information embedment unit 5004. The second information is detailed information for a paper currency for this embodiment. This information is comparatively larger than the first information. An example structure of the second information is shown in FIG. 51. In the example in FIG. 51, the second information consists of eight bits of information for a country that issues the paper currency, and eight bits of information for the monetary value. The additional information Inf, as explained in the first embodiment, can be used as the second information.

The first and the second information has been explained. The characteristics of the first and the second information in this embodiment are as follows.

1) The amount of the first information is smaller than the amount of the second information.

2) The embedment robustness of the first information is greater than the embedment robustness of the second information.

The subject of the invention is to determine whether the second information should be extracted using the first information. Therefore, it is preferable that the first information be extracted more accurately than the second information. Further, generally, a long processing time is required to extract much information. In order to extract the first information within a short processing time, it is preferable that the amount of first information be smaller than the amount of second information.

Finally, the image output unit 5005 outputs the image data in which the first and the second information are embedded.

(Image Copying Process)

In this embodiment, a brief explanation will be given, while referring to FIG. 54, for the processing for editing an image obtained by reading a document and for printing the edited image.

At step 5401, the document is read by the scanner 5314, and the color image data consisting of the R, G and B color components of 8 bits each is generated. Then, at step 5402, the color image data is transmitted via the I/F 5307 to the host computer 5301, and is temporarily stored on the HD 5306.

At step 5403, a check is performed to determine whether an image editing instruction has been issued. When an image editing instruction has been entered using the mouse, it is executed at step 5407. But when no image editing instruction has been entered, program control shifts to step 5404.

At step 5407, the image editing program is executed by the CPU 5303. For this the program must have been transferred, in advance, to the ROM 5304 or the RAM 5305. The program may be transferred, as needed, from the HD 5306 to the RAM 5305. For use, the program may be loaded in the HD 5306 from a CD, an FD or a DVD. The image editing process, enlargement, the reduction or synthesization of data, and the extraction or conversion of color is performed for an image represented by the color image data, and the thus obtained color image data is again stored on the HD 5306.

At step 5404, a check is performed to determine whether a printing instruction has been issued. When a printing instruction has been entered using the mouse, at step 5405, the printer driver is activated. But when no printing instruction has been issued, program control returns to step 5403 and waits until the image editing instruction or the printing instruction is entered. It should be noted that this waiting state may be canceled in accordance with the elapse of or as a result of an interrupt by another process.

At step 5405, the CPU 5303 activates the printer driver, which should have been stored in advance in the ROM 5304 or the RAM 5305. This program may be transferred from the HD 5306 to the RAM 5305, as needed. Further, the program may be loaded into the HD 5306 from a CD, an FD or a DVD and then employed.

The printer driver detects whether the printing of the color image data stored on the HD 5306 is authorized. If the printing is authorized, the color spatial conversion (RGB•YMCK conversion) or the halftone process (binarization) is performed for the image data, and the obtained image data are transmitted via the I/F 5316 to the printer 5315. The present invention includes a case wherein the color image data is divided into print data units (bands), and the data for each band is transmitted to the printer driver and then to the printer.

At step 5406, the color image data received from the host computer 5301 (the I/F 5316) is sequentially printed. The operation of the printer driver will now be described in detail.

(Explanation for Internal Processing Performed by the Printer Driver)

Figure 52:
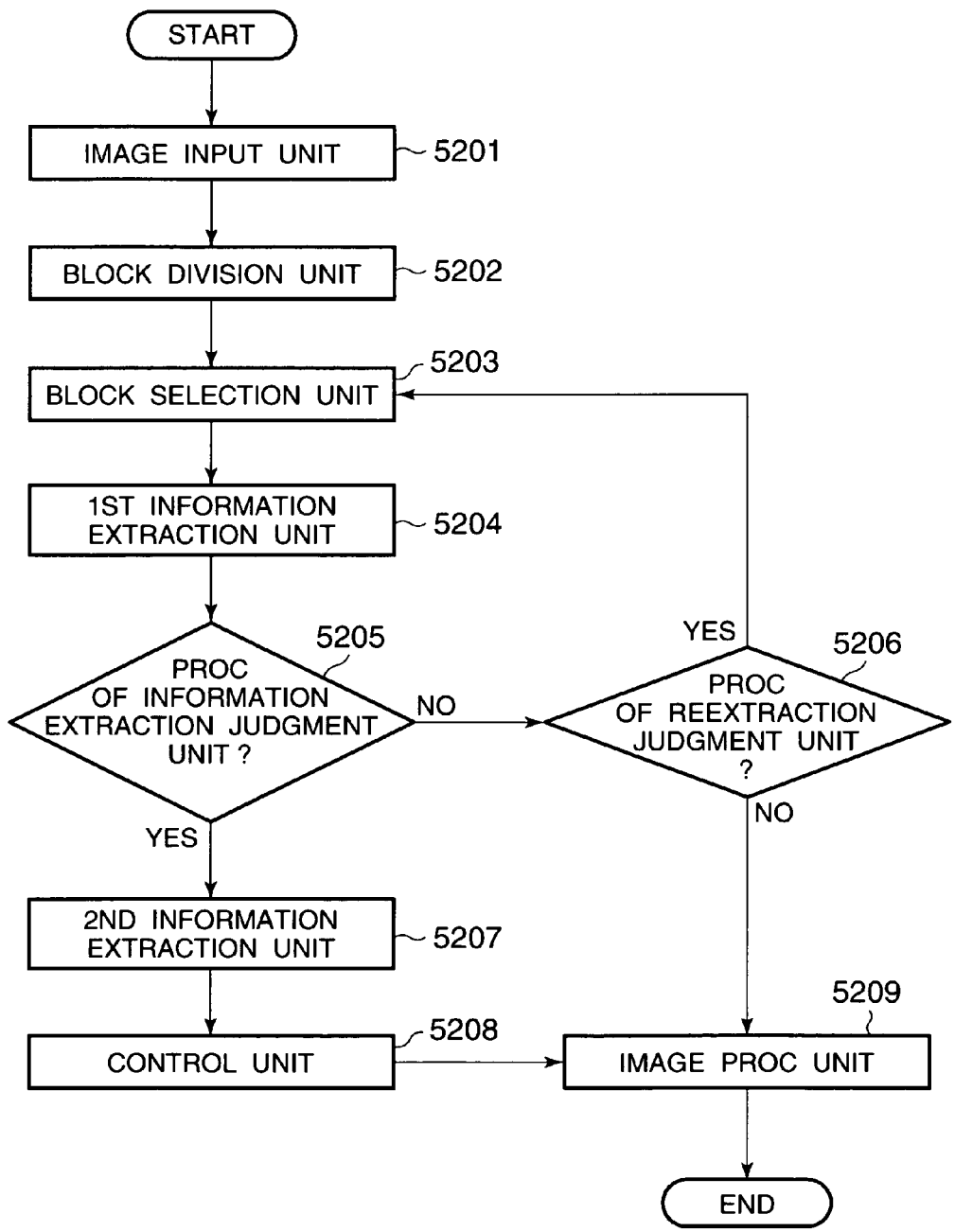
FIG. 52 is a flow chart showing the internal processing performed by a printer driver according to the second embodiment.

FIG. 52 is a flow chart showing the processing performed by the printer driver according to the embodiment. As is shown in FIG. 52, the printer driver for this embodiment comprises: an image input unit 5201, a block division unit 5202, a block selection unit 5203, a first information extraction unit 5204, an information extraction judgement unit 5205, a re-extraction judgment unit 5206, a second information extraction unit 5207, a control unit 5208 and an image process unit 5209.

The image input unit 5201 and the block division unit 5202 perform the same processes as those performed by the image input unit 5001 and the block division unit 5002 in the electronic watermark embedment process.

The block selection unit 5203 will now be described. The block selection unit 5203 selects one or more blocks from among those obtained by the block division unit 5202 at the preceding stage. In the explanation for this embodiment, one block is selected.

Now, the first information extraction unit 5204 will be described. The first information extraction unit 5204 extracts the first information (in this embodiment, one-bit information indicating whether the input image is a paper currency) from the block selected by the block selection unit 5203 at the preceding stage.

In this embodiment, the registration signal r, as explained in the first embodiment, is extracted as the first information. As is explained while referring to FIG. 5, the registration signal r is an impulse signal in the frequency domain, and can be extracted by the impulse detection method explained in the first embodiment.

The information extraction judgement unit 5205 will now be described. The information extraction judgement unit 5205 determines whether the first information has been extracted by the first information extraction unit 5204 at the preceding stage. If the first information has been extracted, it is ascertained that the first information has been embedded (i.e., in this embodiment, it is ascertained that the input image data is a paper currency), and the second information extraction unit 5207 is activated.

When the first information is not extracted, it is ascertained that the first information has not been embedded (i.e., in this embodiment, the input image data is not a paper currency), and the re-extraction judgement unit 5206 is activated.

In this embodiment, the embedment of the information is determined by whether the registration signal r has been extracted. When an impulse is extracted by using a predetermined threshold value 0804, it is ascertained that the first information has been extracted. But when an impulse is not extracted using the threshold value 0804, it is ascertained that the first information has not been extracted.

The re-extraction judgement unit 5206 will now be described. The re-extraction judgement unit 5206 determines whether the extraction of the first information should be performed again. In this embodiment, the first information is extracted from only one block that is selected by the block selection unit 5203.

When the input image is a paper currency, originally, the first information can be extracted from the selected block. However, when various attacks have been mounted against the image data input to the printer driver, first information that has been embedded in the selected block may be lost. Therefore, even when the first information is not extracted from the selected block, the extraction of the first information is attempted from a block other than the selected block. The re-extraction judgement unit 5206 performs a process for determining whether the re-extraction of the first information should be performed.

In this embodiment, the number of times the extraction of the first information is repeated are counted, and when the repetition count is less than a predetermined count, the block selection unit 5203 selects another block from which to again extract the first information. When the repetition count is equal to or greater than the predetermined count, the image process unit 5209 is initiated. When the predetermined count is increased, the first information can be more accurately extracted; however, the processing time required by the printer driver is extended, and accordingly, the printing time is increased. Thus, the predetermined count is set to about "5", for example.

The second information extraction unit 5207 will now be described. The second information extraction unit 5207 extracts the second information from the selected block. The method for extracting the second information will be described later.

Next, the control unit 5208 will be explained. The control unit 5208 performs various control processes based on the second information extracted at the preceding stage. The control processes include, for example, the display of the contents of the second information by an output device, the transmission of "blackout" information to the image process unit 5209 and a change in the medium to be printed to one that is printed only in black.

The image process unit 5209 will now be described. The image process unit 5209 converts the image data into data that can be output by the printer 0109. The image process unit 5209 performs the color conversion process and the tone conversion process.

Through the above processing, when the first information is embedded in the input image, i.e., when the input image is determined to be a paper currency, a warning message is displayed on the screen, and the input image is not printed, or an image is printed only in black. When the first information is not embedded in the input image, i.e., when the input image is determined not to be a paper currency, the input image is printed normally. Since the first information is one-bit information, the extraction of the first information can be performed quickly. Thus, most of image data for the image that is input during the electronic watermark extraction and that is not a paper currency can be printed within a time substantially equivalent to the conventionally required time.

Further, according to the present invention, whether illegal printing is to be performed is detected quickly. When no illegal printing is detected, the normal printing process is performed. Thus, most of the printing processes that are not illegal can be performed substantially in the same period as the conventional case.

[Third Embodiment]

Since the configuration for an image processing system that can be applied for a third embodiment is the same as that shown in FIG. 53, no further explanation for it will be given.

(General Configuration of an Electronic Watermark Embedment System)

Since the electronic watermark embedment process for this embodiment is as explained while referring to FIG. 50, only those processes that are different will be described.

Figure 56:
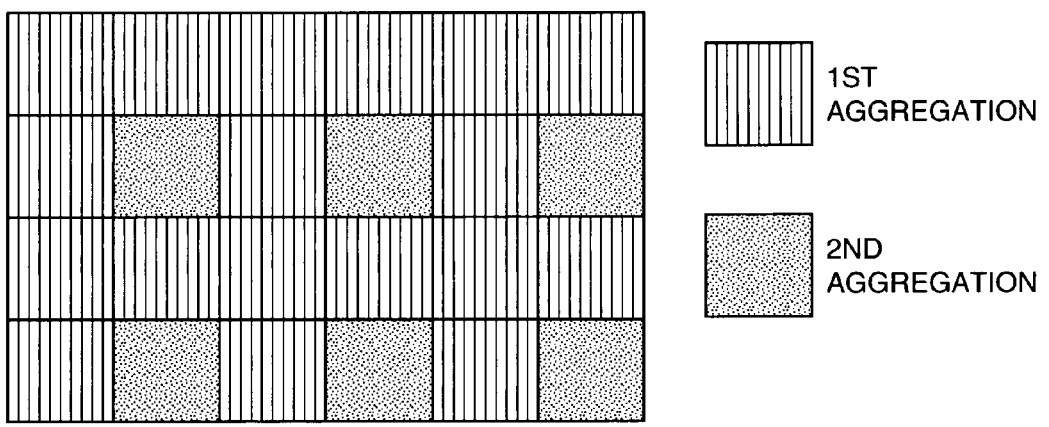
FIG. 56 is a diagram showing example image data generated during the processing performed by a block division unit according to a third embodiment of the invention.

The areas obtained by the block division unit 5002 are divided into two sets. FIG. 56 is a diagram showing example image data generated as the result of the process by the block division unit 5002. In the example in FIG. 56, the image data is divided into rectangular blocks, which are allocated to the first set and the second set. In this example, there are more elements in the first set than there are in the second set. This is because, since the first information is more important than the second information, the information can more accurately be extracted during the electronic watermark extraction process that will be described later. This process will be described in detail later.

The first information is embedded more deeply than the second information. This is because, as described above, the first information is more important than the second information, so that during the electronic watermark extraction process the extraction of the information is more ensured. In order to increase the embedment depth, the operating amount of the pixel value is increased, and/or the dimension for operating the pixel value is increased.

The characteristics of the first information and the second information used for this embodiment are as follows.

1) The amount of first information is smaller than the amount of second information (in this embodiment, the amount of first information is one bit and the amount of second information is 16 bits).

2) The embedment depth of the first embodiment is greater than the embedment depth of the second information (in this embodiment, the operating amount of the pixel value for the first information is greater than that for the second information, and/or the dimension for operating the pixel value is also greater).

(Image Copying Process)

Figure 54:
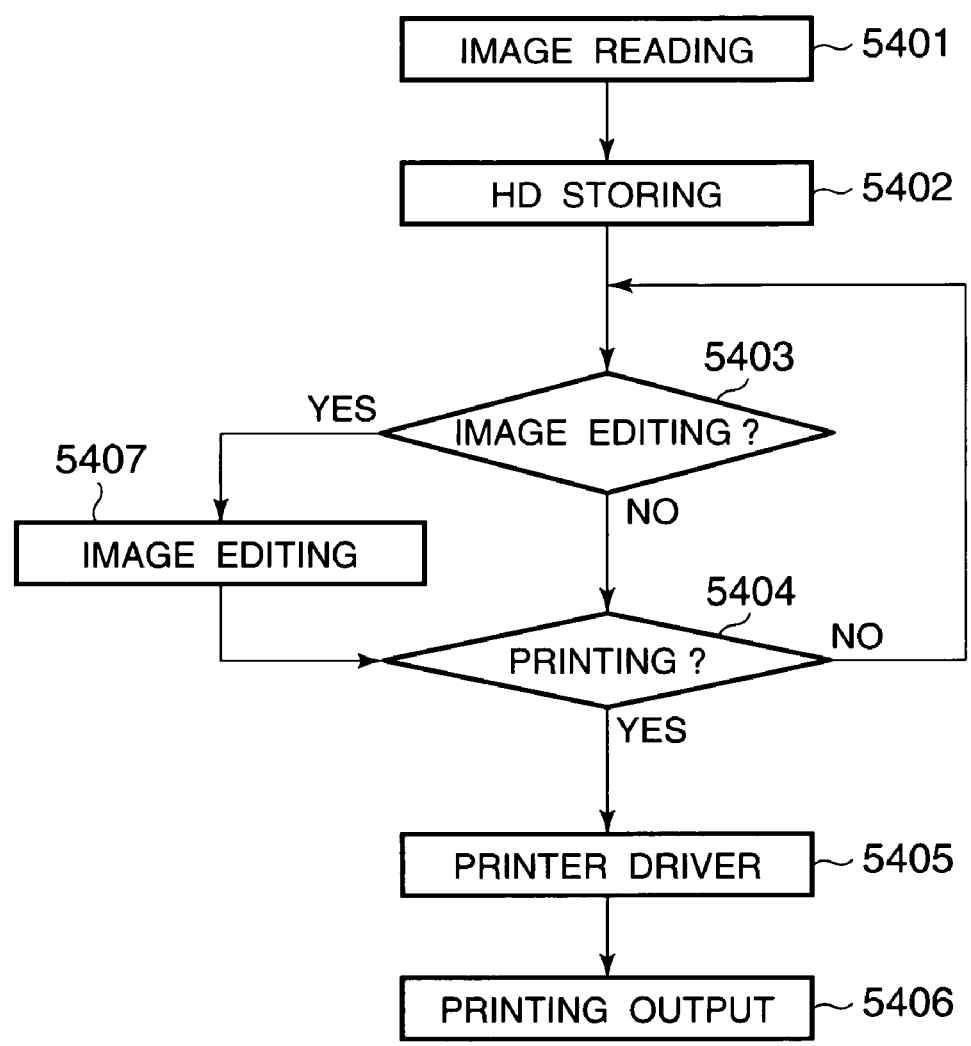
FIG. 54 is a flow chart showing the processing performed by the system in FIG. 53 when copying an original document.

The processing for editing an image obtained by reading a document and for printing the edited image has been explained while referring to FIG. 54.

(Explanation of the Internal Processing of a Printer Driver)

The processing performed by the printer driver for this embodiment has been explained while referring to FIG. 52.

The block selection unit 5203 will now be described. The block selection unit 6203 selects one or more blocks obtained by the block division unit 5202, from the first and the second sets, respectively. In this embodiment, one first block is selected from the first set, and multiple second blocks are selected from the second set.

This is because the first information must be extracted more quickly than the second information. That is, since the time required for the electronic watermark extraction process is extended generally since a large number of elements (the number of blocks in this embodiment) are to be extracted, the first information is extracted from a smaller number of blocks than those for the second information, and the process is completed.

In this embodiment, whether the first information has been extracted is determined based on the reliability of the first information that is obtained by the first information extraction unit 5204. When the reliability of the first information is equal to or higher than a predetermined value, it is ascertained that the first embodiment has been embedded (i.e., in this embodiment, it is ascertained that the input image is a paper currency), and the second information extraction unit 5207 is activated. When the reliability of the first information is less than a predetermined value, it is ascertained that the first information has not been embedded (i.e., in this embodiment, it is ascertained that the input image data is not a paper currency), and the re-extraction judgement unit 5206 is activated.

The second information extraction unit 5207 will now be explained. The second information extraction unit 5207 extracts the second information from the multiple second blocks selected by the block selection unit 5203 at the preceding stage.

The processing of the printer driver of this embodiment has been explained. The characteristics for the extraction of the first and the second information are as follows.

1) The first information can be extracted more quickly than the second information.

2) The first information can be extracted with a higher reliability than the second information.

(Embedment using the Patchwork Method)

The method for the embedment of the first and the second information will now be described in detail.

According to the method for embedding the first and the second information, an electronic watermark should be embedded in a rectangular area of 128×128 pixels that is obtained by the block division unit 5202, and the electronic watermark should be extracted from that rectangular area. The patchwork method used as an example method will now be described.

In this embodiment, the patchwork method is used to embed the first and the second information; however, the present invention is not limited to this method, and various other methods can be employed to embed the first and the second information.

According to the patchwork method, when the statistical bias is generated relative to the blue components in the rectangular blocks that are obtained by the block division unit 5202, the embedment of the electronic watermark information is implemented.

The basic idea of the patchwork method has been explained while referring to FIG. 30.

Figure 57:
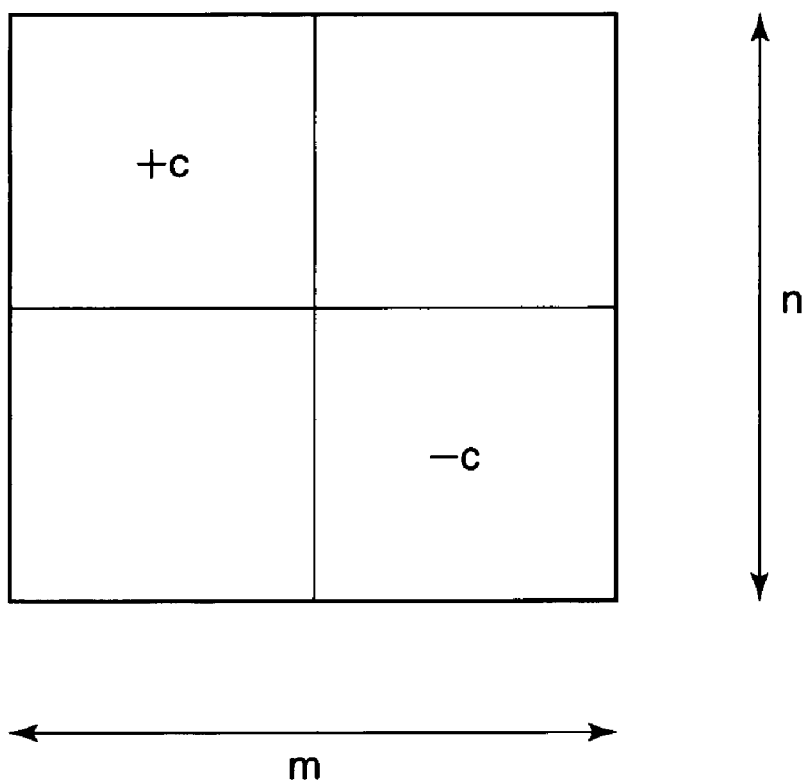
FIG. 57 is a diagram showing an example simple pattern arrangement according to the third embodiment.

An example simple pattern arrangement is shown in FIG. 57. In the pattern arrangement in FIG. 57, the amount of the change in the pixel value for the original image is indicated when m×n pixels are referred to in order to embed one bit.

As is shown in FIG. 57, the pattern arrangement consists of an element having a positive value, an element having a negative value and an element having a value of 0.

In the pattern arrangement in FIG. 57, the position indicated by the element +c is the position whereat the pixel value at a corresponding position is incremented by c, and corresponds to the position of the subset A. The position indicated by the element −c is the position whereat the pixel value at a corresponding position is decremented by c, and corresponds to the position of the subset B. The position indicated by 0 indicates a position other than the positions of the subsets A and B.

In this embodiment, the number of positive elements is equal to the number of negative elements in order to not have to change the density of the entire block. That is, the sum of all the pattern elements in one pattern arrangement is 0. This condition is required for the operation for extracting the electronic watermark information, which will be described later.

When a block is large in this embodiment, the electronic watermark information is repetitively embedded. This is because, since the patchwork method employs the statistical characteristic, a sufficient number of elements is required so that the statistical characteristic will appear.

The first information is embedded using the above method. Upon the receipt of input image data (the paper currency in this embodiment), the pattern arrangement is repetitively embedded in predetermined elements in a block that includes the first information, i.e., the one-bit information indicating whether the input image data is a paper currency. In this embodiment, among the pattern arrangements in FIG. 57, the pattern arrangement of c=12 and m=n=16 is employed in order to embed the first information. Further, since the block of 128×128 elements is employed, the pattern arrangement is repetitively added to one block 8×8=64 times.

Following this, an explanation will be given for the method for embedding multiple bits in one block by using the principle of the patchwork method. In order to embed multiple bits, in this embodiment, the pattern arrangement in FIG. 57 is arranged in the block multiple times. That is, on the assumption that there is not only a combination of subsets A and B, but also multiple combinations of subsets A' and B', or subsets A" and B", the electronic watermark information consisting of multiple bits is embedded in different areas in one block. Furthermore, the elements of the pattern arrangement are not only added to the predetermined elements in the block, but also are subtracted, so that the embedment of the electronic watermark information is carried out. In this embodiment, the pattern arrangement is added to embed bit information "1", and the pattern arrangement is subtracted to embed the bit information "0".

In this embodiment, the relative positions whereat the pattern arrangement is used for mutual bits are determined, so that, when multiple bits are to be embedded, the areas for changing the pixel values using the pattern arrangement do not overlap each other. That is, an appropriate relationship is determined for the position of the pattern arrangement to embed the first bit information of the electronic watermark information, and the position of the pattern arrangement to embed the second bit information. When, for example, the electronic watermark information consists of 16 bits, the positions of the first to the 16-th bits of the 8×8 pattern arrangement are relatively determined, so that the image deterioration is reduced in an the area larger than the 32×32 pixel pattern.

The second information is embedded by using the above method. In this embodiment, among the pattern arrangements in FIG. 57, the pattern arrangement of c=4 and m=n=8 is employed to embed the second information. Further, since the 128×128 pixel block is employed, the pattern arrangement is added or subtracted for all the bit information 16×16=256 times. The electronic watermark information is embedded by the repetition of the pattern arrangement 256/16=16 times for one bit, so that the 16-bit information shown in FIG. 3 can be employed for this embodiment.

As is described above, the patchwork method is employed to embed the first and the second information. A supplemental explanation will be given for the reason for setting the parameters m=n=16 and c=12, used for embedding the first information, and m=n=8 and c=4, used for embedding the second information.

According to the patchwork method, the size (m,n) of the pattern arrangement, the depth c of the pattern arrangement, and the repetition count of the pattern arrangement are related to the robustness of the electronic watermark information to withstand an attack. The robustness is increased when the size, the depth and the repetition count of the pattern arrangement is large. The importance for this invention is that the first information is more important than the second information and that the information for one bit must be embedded more deeply than the second information.

According to the embodiment, the first information is embedded with the pattern arrangement of 16×16 pixels, at the depth of 12 and a repetition count of 64. The second information is embedded with the pattern arrangement of 8×8 pixels, at the depth of 4 and a repetition count of 16 for one bit. As a result, the first information is embedded more deeply than the second information for all the factors concerning robustness.

(Extraction using the Patchwork Method)

The extraction of the first and the second information using the patchwork method will now be described in detail.

An explanation will be given, while referring to FIG. 58, for the processing for calculating the reliability distance d that is required to extract the first and the second information.

The convolution operation performed by a convolution operation unit 5081 has been explained while referring to FIGS. 19 to 22.

In the processing in FIG. 19, the pattern arrangement P(x,y) is employed to embed, in the image data I(x,y), one bit (bit "1" in FIG. 19) from among the first and the second information.

In the processing in FIG. 21, the process for extracting one bit information is initiated for the image data I"(x,y), in which the one bit in the first and the second information is embedded. In FIG. 21, the one-bit information extraction is performed for the image data I"(x,y), in which the one bit is not embedded. In this case, I"(x,y) denotes the image data whereat the one bit of information is embedded, and P(x,y) denotes the pattern arrangement.

In the above explanation, the result of the convolution operation is 0 for the image data in which the first information or the second information is embedded, and this is an ideal case. For normally, it is very rare for the result obtained by convolution to be 0 for the area of the actual image data that corresponds to the 8×8 pattern arrangement.

That is, when the convolution operation shown in FIG. 22 is performed for the area corresponding to the 8×8 pattern arrangement in the original image, unlike an ideal, the value unequal to "0" might be calculated. On the other hand, when the convolution operation is performed for the area corresponding to the 8×8 pattern arrangement in the image (image data wI) in which the first or second information is embedded, the result of the operation might be not "$32c^2$" but "0".

However, generally, the individual bits of the first or the second information are embedded in the original image data multiple times. That is, the first and the second information are embedded multiple times.

Therefore, the convolution operation unit 5801 obtains the sum of multiple convolution results for each bit that constitutes the first and the second information. For example, for the first and the second information of eight bits each, eight sums are obtained. The sum corresponding to the bit information is transmitted to an average calculation unit 5802, and is divided by the number n of all the macro blocks to obtain the average. This obtained average value is the reliability distance d. That is, as is described above, the reliability distance d is a value generated under a majority rule so as to determine whether the distance d is similar to "$32c^2$" in FIG. 21 or "0" in FIG. 22.

The obtained reliability distance d is stored in a storage medium 5803. The convolution operation unit 5801 repetitively generates the reliability distance d for each bit that constitutes the first or the second information, and is sequentially stored on the storage medium 5803.

The operation value has been described in detail while referring to FIGS. 23 to 25.

As is described above, when the first information and the second information (bit information) are to be embedded using the patchwork method, as many bits as possible should be embedded (the pattern arrangement is employed as many times as possible), so that the correct statistical distribution shown in FIGS. 23 and 24 tends to appear. That is, the accuracy is increased so as to detect whether the bit information forming the first and the second information has been embedded, or whether the embedded bit information is a "1" or a "0".

(Statistical Process)

The reliability of the electronic watermark information extracted by the above method will now be described.

The subsets A and B consist of N elements represented by A={a1, a2, . . . , aN} and B={b1, b2, bN}, and ai and bi are pixel values for the elements in the subsets A and B in FIG. 30.

When the value of N in the reliability distance d($\Sigma$(ai−bi)/N) is sufficiently great, no correlation is established between the pixel values ai and bi, and the expectation value of the reliability distance d is 0. Further, according to the central limit theorem, the distribution of the reliability distance d is the independent normal distribution.

The central limit theorem has been explained previously.

The reliability distances d1 that correspond to the bit information "1" of the first and the second information are accumulated at the locations in the normal distribution 2502, and the reliability distances dl that correspond to the bit information "0" of the first and the second information are accumulated at the positions in the normal distribution 2503. Thus, in this case, two "crests" are formed. The ratio of the sizes of the two "crests" is substantially equal to the ratio of the bit information "1" and "0" of the first and the second information.

It should be noted that this is based on the assumption that, when the convolution process is performed by using the first pattern arrangement for the original image in which the first and the second information has not been embedded, the obtained reliability distance d1 reflects the normal distribution 2501.

Therefore, actually, so long as the state of the original image is unknown, whether the use information Inf2 has been correctly extracted can not be determined.

Therefore, in this embodiment, the normal distribution of the reliability distance d2 is generated by using the second pattern arrangement, with which the state of the original image can be sufficiently identified, even when the first and the second information is embedded therein. By regarding the obtained normal distribution as the normal distribution 2501, whether the first and the second information has been correctly extracted can be determined.

Assume, for example, that the appearance frequency distribution of the reliability distance d1 is present outside the shaded portion (elements up to 95% from the center) that form the normal distribution 2501 prepared for the reliability distance d2. Then, it can be ascertained that statistic biasing occurs in the target image and that the first and the second information has been embedded, so that the reliability of the first and the second information can be statistically determined.

An explanation will now be given, while referring to FIG. 59, for the method whereby the image data in which the first and the second information has been embedded is employed to generate a distribution (like the normal distribution 2501 in FIG. 25) that is similar to the appearance frequency distribution of the reliability distance d1 before the embedding of the first and the second information.

In this embodiment, the extraction unit 5902 employs second pattern arrangement to obtain the reliability distance d2 that has a distribution similar to the normal distribution 2501.

The extraction unit 5902 calculates the reliability distance d1 by using the second pattern arrangement that is "orthogonal" to the first pattern arrangement employed by the information extraction unit 5901. The operation of the extraction unit 2005, including the convolution process, is substantially the same as that of the information extraction unit 5901.

For comparison, the pattern arrangement in FIG. 9, employed by the information extraction unit 5901 is called the "first pattern arrangement". Further, the pattern arrangement that is "orthogonal" to the first pattern arrangement is called the "second pattern arrangement".

Figure 58:
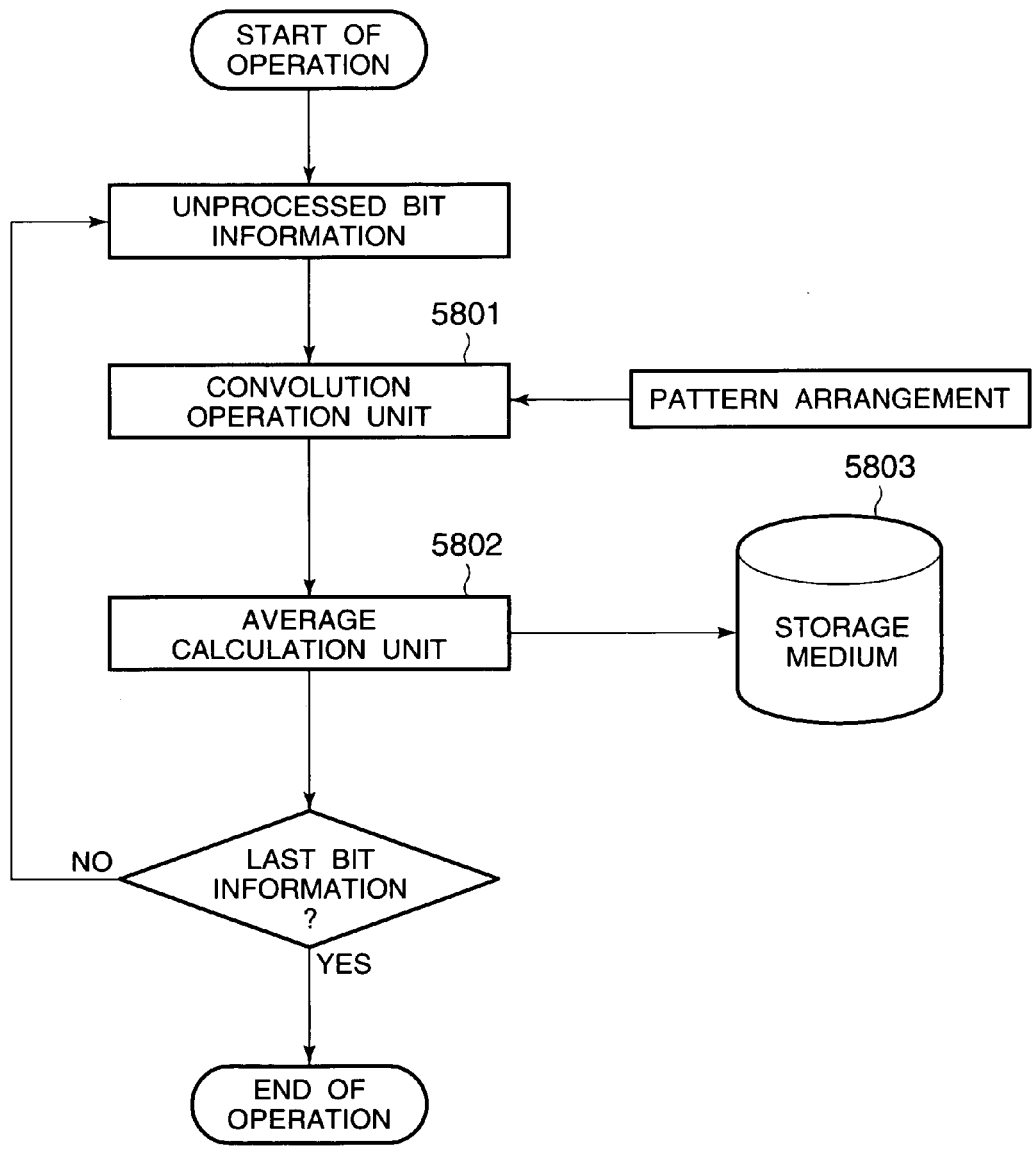
FIG. 58 is a flow chart showing the processing performed for the third embodiment when calculating a reliability distance d, required for extracting first and second information.

First, the extraction unit 5902 receives a target image for extraction, and performs the reliability distance operation in FIG. 58 to obtain the reliability distance d2.

At this time, the pattern arrangement used for the reliability distance operation in FIG. 58 is not the pattern arrangement 0901 in FIG. 9 that was used for the embedment, but is instead the pattern arrangement 3301 or 3302 that is "orthogonal" to the pattern arrangement 0901.

For this reason, the reliability distance d2 obtained by using the pattern arrangement 3301 or 3302 in FIG. 33 is not affected at all by the operation using the pattern arrangement 0901 in FIG. 9 that was employed for the embedment of the first and the second information.

When the convolution process is performed for the pattern arrangement 0901 in FIG. 9 and the orthogonal pattern arrangement 3301, the result is 0, as is shown in FIG. 34. The same result is obtained when the pattern arrangement 3302 is used. That is, the result of the convolution of the first and the second pattern arrangements is 0. Therefore, even when the density of the original image is changed by using the first pattern arrangement, this change does not at all affect the reliability distance d that is obtained through the convolution for which the second pattern arrangement was used.

Therefore, when the convolution process is performed using the second pattern arrangement for the image in which the first and the second information has been embedded, the appearance frequency distribution of the obtained reliability distance d2 is substantially the same as the normal distribution 2501 in FIG. 25. Therefore, the above described appearance frequency distribution is regarded as the normal distribution 2501.

The normal distribution 2501 is used as the reference required for the statistic authorization process at step 3207 in FIG. 32.

As is described above, the extraction unit 5902 generates the normal distribution of the reliability distance d2 by using a "pattern arrangement orthogonal to the first pattern", such as the pattern 3301 or 3302 in FIG. 33.

The conditions for the "pattern arrangement orthogonal to the first pattern" are as follows.

(1) The pattern arrangement, as is shown in FIG. 33, is the same size as the pattern arrangement 0901 in FIG. 9.

(2) The result obtained by the convolution process that is performed using the pattern arrangement 0901 in FIG. 1, and that is used for the embedment of the first and the second information is 0, the same as is obtained using the pattern arrangement 3301 or 3302.

In addition, the convolution process in FIG. 34 is the same convolution process as is shown in FIGS. 21 and 22.

In this embodiment, the state of the convolution result 0 is called "the pattern arrangements are mutually 'orthogonal'", as in the state wherein the inner products of the vectors is 0 when the vectors are perpendicular to each other. Therefore, the pattern arrangements 3301 and 3302 in FIG. 33 are "pattern arrangements that are 'orthogonal' to the pattern arrangement 0901 in FIG. 9".

The pattern arrangement "orthogonal" to the pattern arrangement used for the embedment of the first and the second information is employed for the calculation of the reliability distance d1, because statistic biasing does not occur in the distribution of the reliability distance d2, i.e., because the appearance frequency distribution with the center value of 0 is generated.

Furthermore, the "pattern arrangement orthogonal to the first pattern" includes another condition whereby (3) The number of non-zero elements is equal to the number of non-zero elements in the pattern arrangement employed by the information extraction unit 5901, and the number of positive elements is equal to the number of negative elements. This is because the reliability distances d1 and d2 can be extracted under the same operation condition.

(Reliability Index D)

The reliability distance d2, which is generated by the extraction unit 5902 using the second pattern arrangement, appears substantially in the same distribution as the normal distribution 2501. It is well known that, in the normal distribution, 95% of samples (reliability distance d2) appear within the range established by the following expression (1).

$$m-1.96\sigma < d2 < m+1.96\sigma \quad (1)$$

In the expression, σ denotes the standard deviation for the reliability distance d2, and m denotes the average.

The above range is called a "95% reliability interval".

When the reliability distance d2 is obtained by the extraction unit 5902 using the second pattern arrangement, this is used to calculate m−1.96σ and m+1.96σ.

The appearance frequency distribution of the reliability distance d1, which is transmitted by the information extraction unit 5901 to the statistical authorization unit 5903, is the normal distribution 2501 shown in FIG. 25 when the bit information is "1". When the bit information is "0", the appearance frequency distribution of the reliability distance d1 is the normal distribution 2503. Thus, the probability is very high that a reliability distance d1 corresponding to the first and the second information will fall outside the 95% reliability interval (the shaded portion in FIG. 25) that is obtained by the extraction unit 5902 using the second pattern arrangement.

The probability that all the reliability distances dl corresponding to the first and the second information do not fall in the reliability interval of expression (1) is very small, i.e., $(1-0.95)^{64}$.

Therefore, when the normal distribution 2501 is obtained based on the reliability distance d2, a check need only be performed to determine whether the appearance frequency distribution obtained based on the reliability distance d1 is included in the range that occupies most of the normal distribution, so that whether the first and the second information is embedded can, substantially, be correctly determined.

The statistical authorization unit 5903 employs the above characteristic to determine the reliability of the assumption that the first and the second information is embedded.

In this embodiment, the reliability of the assumption that the first and the second information is embedded is employed as the reliability index D.

The reliability index D is defined as the ratio of the number of reliability distances d1 present outside the range of the expression (1) to the number of all the reliability distances d1 generated by the information extraction unit 5901.

When the reliability index D is greater than a threshold value α, the statistical authorization unit 5903 determines that the total appearance frequency distribution of the reliability distance d1 is artificially biased to a position such as the normal distribution 2502 or 2503 in FIG. 25, i.e., the first and the second information is actually embedded in the image. Therefore, it is assumed that the reliability distance d1 used for this determination is reliable information, and that the transmission of the reliability distance d1 to a comparison unit 2504 at the succeeding stage is permitted.

When the reliability index D is smaller than the predetermined threshold value α, it is ascertained that the entire appearance frequency distribution for the reliability distance d1 is not artificially biased at the position 2502 or 2503 in FIG. 25, i.e., that the first information and the second information have not been embedded in the image. in this case, the statistical authorization unit 5903 outputs information indicating "no information is embedded", and the comparison unit does not perform any process.

The statistical authorization unit 5903 using the two orthogonal pattern arrangement has been explained. In this embodiment, the second information consists of multiple bits (16 bits in FIG. 51), and the first information consists of one bit (whether the input image is a paper currency). That is, the statistical distribution shown in FIG. 25 is obtained as a result of the extraction of the second information, and the statistical distribution in FIG. 25 is obtained as a result of the extraction of the first information. For the extraction of the first information, merely one reliability distance d1 obtained using the first pattern arrangement and one reliability distance d2 obtained by the second pattern arrangement are obtained.

Therefore, in this embodiment, the information extraction judgement unit 5205 calculates a difference between the reliability distances d2 and d2 in order to determine whether the first information has been embedded. When the difference is equal to or greater than a predetermined threshold value, it is ascertained that the first information has been embedded. But when the difference is smaller than the predetermined threshold value, it is ascertained that the first information has not been embedded. Further, to extract the first information, the comparison unit 5904 at the succeeding stage is not always necessary. This is because the first information indicates whether "the input image is a paper currency", and the statistical authorization unit 5903 can obtain this information.

(Comparison Process)

A comparison unit 5904 in FIG. 59 receives the value of the reliability distance d1 via an information extraction unit 5901 and a statistical authorization unit 5903. Since the input reliability distance d1 is very reliable information, a check need only be performed to determine whether the bit information that corresponds to the reliability distance d1 is "1" or "0".

Specifically, if the reliability distance d1 for specific bit information for the second information is positive, it is ascertained that the bit information is "1". But if the reliability distance d1 is negative, it is ascertained that the bit information is "0".

The second information obtained by the determination is output as final data that is used as reference information for a user or as a control signal.

As is described above, according to the present invention, the two types of information are embedded in advance as electronic watermarks in a specific image, such as a paper currency, the first information indicating that the input image is a paper currency is extracted, and thereafter, the second information is extracted only when the input image is determined to be paper currency, so that the process for detecting unauthorized printing can be initiated for the specific image to be printed. Therefore, most non-specified images can be printed within a time that is substantially the same as the conventional time.

The present invention may be applied for one part of a system constituting multiple apparatuses (e.g., a host computer, an interface device, a reader and a printer), or by one part in one apparatus (e.g., a copier or a facsimile machine).

As is described above, the present invention is not limited to an apparatus and a method for carrying out the above embodiments, but also includes a case wherein software program code, for implementing the functions of the above embodiment, are loaded into a computer (a CPU or an MPU) in a system or an apparatus, and various devices are operated by the computer of the system or the apparatus in accordance with the program code.

In this case, the program code read from the memory medium provides the functions for of the embodiments, and the program code, or the portion for supplying the program code to the computer, specifically, the memory medium on which the program code is stored, is included within the scope of the present invention.

A memory medium used to supply such program code can be, for example, a floppy disk, a hard disk, an optical disk, a magneto-optical disk, a CD-ROM, a magnetic tape, a nonvolatile memory card, or a ROM.

In addition, the present invention includes not only a case wherein the functions in the previous embodiments can be performed by controlling the various devices in accordance with the program code that is supplied, but also a case wherein, in an OS (Operating System) running on the computer, or in another software application, the computer interacts with the program code to accomplish the functions in the above embodiment.

Furthermore, the present invention includes a case wherein the supplied program code is stored in a memory that is mounted on a function expansion board connected to a computer or to a function expansion unit connected to a computer, and in consonance with a program code instruction, a CPU mounted on the function expansion board, or in the function expansion unit, performs part or all of the actual processing required to implement the functions in the above described embodiments.

In the above embodiments, the electronic watermark information has been embedded using the cone mask. The present invention is not limited to this, and especially includes a case for employing the blue noise mask to embed the electronic watermark information.

Any configuration including at least one of the above described features of the invention is included in the present invention.

As is described above, since whether the second information should be extracted is determined based on the first information, when the image can be recognized without the extraction of data, the extraction of the second information is not required, and thus, fast processing can be performed. Further, with the fast processing results, the apparatus can be controlled at a high speed.

The present invention is not limited to the above embodiments, and can be variously modified without departing from the contents of the claims.

What is claimed is:

1. An image processing method comprising:
   a first information extraction step of extracting first information from an image;
   a determination step of determining whether or not the first information extracted in said first information extraction step includes a registration signal used to correct the geometrical distortion of the image; and
   a second information extraction step of extracting digital watermark information from the image, wherein said second information extraction step is performed only if said determination step determines that the first information extracted in said first information extraction step includes the registration signal.

2. A method according to claim 1, wherein said first information and said second information are embedded in said image as invisible or less visible electronic watermarks.

3. A method according to claim 1, further comprising:
   a division step of dividing said image into at least one block; and
   a selection step of selecting said block.

4. A method according to claim 1, wherein said first information indicates that said image includes a specific image.

5. A method according to claim 1, wherein said second information is additional information.

6. A method according to claim 1, wherein said first information and said second information are added to components of said image that are less easily discerned by a human's eyes.

7. A method according to claim 1, wherein said first information is information used to identify a paper currency, securities, a copyrighted image or others.

8. A method according to claim 4, wherein said specific image is a paper currency, and said second information indicates at least either an issuance country or the value of said paper currency.

9. A method according to claim 4, further comprising:
   a determination step of determining whether said specific image is included,
   wherein, when said specific image is included, an image process is performed based on said image.

10. A method according to claim 1, wherein said method is performed by a printer driver.

11. A method according to claim 1, wherein the amount of said first information is smaller than the amount of said second information.

12. A method according to claim 1, wherein the embedment depth of said first information relative to said image is greater than the embedment depth of said second information.

13. A method according to claim 1, wherein the time required for the extraction of said first information is shorter than the time required for the extraction of said second information.

14. A method according to claim 1, wherein the number of sets of said first information present in the unit area is greater than the number of sets of said second information.

15. An image processing method comprising:
   a first information extraction step of extracting, from an image, first information;
   a determination step of determining whether or not the first information extracted in said first information extraction step indicates that the image is a specific image; and
   a second information extraction step of extracting digital watermark information from the image, wherein said second information extraction step is performed only if said determination step determines that the first information indicates that the image is a specific image.

16. A method according to claim 15, wherein said first information and said second information are embedded in said image as invisible or less visible electronic watermarks.

17. A method according to claim 15, further comprising:
   a division step of dividing said image into at least one block; and a selection step of selecting at least one block.

18. A method according to claim 15, wherein the amount of said first information is smaller than the amount of said second information.

19. A method according to claim 15, wherein the embedment depth of said first information relative to said image is greater than the embedment depth of said second information.

20. A method according to claim 15, wherein the time required for the extraction of said first information is shorter than the time required for the extraction of said second information.

21. A method according to claim 15, wherein said specific image is an image of a paper currency or securities.

22. A method according to claim 15, wherein said first information and said second information are added to components of said image that are less easily discerned by a human's eyes.

23. A method according to claim 15, wherein said first information is information used to identify a paper currency or securities.

24. A method according to claim 15, wherein said specific image is a paper currency, and said second information indicates at least either an issuance country or the value of said paper currency.

25. A method according to claim 15, further comprising:
a determination step of determining whether said specific image is included,
wherein, when said specific image is included, an image process is performed based on said image.

26. A method according to claim 15, which is performed by a printer driver.

27. A method according to claim 15, wherein the number of sets of said first information present in the unit area is greater than the number of sets of said second information.

28. An image processing apparatus comprising:
first extraction means for extracting first information from an image;
determination means for determining whether or not the first information extracted by said first extraction means includes a registration signal used to correct the geometrical distortion of the image; and
second extraction means for extracting digital watermark information from the image, wherein said second extraction means performs extraction only if said determination means determines that the first information extracted by said first extraction means includes the registration signal.

29. An image processing method comprising:
a first information extraction step of extracting first information from an image;
a determination step of determining whether or not the first information extracted in said first information extraction step includes a registration signal used to correct the geometrical distortion of the image;
a correction step of correcting the geometrical distortion of the image based on the registration signal extracted in said first information extraction step, if said determination step determines that the first information includes a registration signal; and
a second information extraction step of extracting digital watermark information from the image corrected in said correction step, if said determination step determines that the first information includes a registration signal.

* * * * *

UNITED STATES PATENT AND TRADEMARK OFFICE
CERTIFICATE OF CORRECTION

| | | |
|---|---|---|
| PATENT NO. | : 7,142,689 B2 | |
| APPLICATION NO. | : 09/771983 | |
| DATED | : November 28, 2006 | |
| INVENTOR(S) | : Junichi Hayashi et al. | |

It is certified that error appears in the above-identified patent and that said Letters Patent is hereby corrected as shown below:

Title Page
    Item (54), "APPARATUS" should read --METHOD--.
    Item (56) References Cited, Other Publications,
        After "Lee": "Watermaking" should read --Watermarking--.

Page 2, Other Publications
    Line 1, after "Fridrich", "Watermaking" should read --Watermarking--.
    Line 3, "Fridricj" should read --Fridrich--.

Col. 1, line 1, "APPARATUS" should read --METHOD--.

Col. 3, line 45, "is" should read --in--.

Col. 7, line 47, "{" should be deleted.

Col. 17, line 26, "m n" should read --m×n--.

Col. 19, line 21, "bees" should read --been--.

Col. 22, line 21, "and" should read --an--.

Col. 32, line 27, delete "is", second occurrence.

Col. 32, line 29, "is output" should read --output is--.

Col. 47, line 14, "a" should read --σ--.

Col. 49, line 32, "purposed" should read --purposes--.

Col. 58, line 44, "B={b1, b2, bN}," should read --B={b1, b2, . . . bN},--.

Col. 58, line 58, "dl" should read --d1--.

Col. 60, line 65, "a" should read --σ--.

Col. 61, line 16, "dl" should read --d1--.

Col. 61, line 54, "in", second occurrence, should read --In--.

Col. 64, line 46, "a" should read --¶a--.

UNITED STATES PATENT AND TRADEMARK OFFICE
CERTIFICATE OF CORRECTION

PATENT NO.       : 7,142,689 B2
APPLICATION NO.  : 09/771983
DATED            : November 28, 2006
INVENTOR(S)      : Junichi Hayashi et al.

It is certified that error appears in the above-identified patent and that said Letters Patent is hereby corrected as shown below:

Col. 66, line 1, "perfonns" should read --performs--.

Signed and Sealed this

Fourteenth Day of August, 2007

JON W. DUDAS
*Director of the United States Patent and Trademark Office*